US007811165B2

(12) United States Patent
Slomiany et al.

(10) Patent No.: US 7,811,165 B2
(45) **Date of Patent: *Oct. 12, 2010**

(54) MULTI-STAGE MULTI-BET DICE GAME, GAMING DEVICE, AND METHOD

(75) Inventors: Scott D. Slomiany, Streamwood, IL (US); Lawrence E. DeMar, Winnetka, IL (US); Duncan F. Brown, Grayslake, IL (US)

(73) Assignee: Case Venture Management, LLC, Northbrook, IL (US)

( * ) Notice: Subject to any disclaimer, the term of this patent is extended or adjusted under 35 U.S.C. 154(b) by 1367 days.

This patent is subject to a terminal disclaimer.

(21) Appl. No.: 11/182,407

(22) Filed: Jul. 15, 2005

(65) Prior Publication Data

US 2005/0250578 A1 Nov. 10, 2005

Related U.S. Application Data

(62) Division of application No. 10/435,650, filed on May 9, 2003, now Pat. No. 6,926,607, which is a division of application No. 09/709,922, filed on Nov. 10, 2000, now Pat. No. 6,612,927.

(51) Int. Cl.
*G06F 17/00* (2006.01)
*G06F 19/00* (2006.01)

(52) U.S. Cl. ............................ 463/16; 463/20; 463/25; 273/146

(58) Field of Classification Search ............ 463/16–20, 463/25; 273/138.1, 146
See application file for complete search history.

(56) References Cited

U.S. PATENT DOCUMENTS 3,628,259 A 12/1971 Kahn (Continued)

FOREIGN PATENT DOCUMENTS

EP 753 331 A2 1/1997

(Continued)

OTHER PUBLICATIONS

Supplementary European Search Report from Related Application No. EP 01 99 3494, dated Mar. 19, 2007.

(Continued)

*Primary Examiner*—Peter D. Vo
*Assistant Examiner*—Milap Shah
(74) *Attorney, Agent, or Firm*—McDonnell Boehnen Hulbert & Berghoff LLP

(57) ABSTRACT

A game is comprised of a plurality of stages. Each operation of the game begins with the operation of a first stage. Depending on the outcome of the first stage the game may be over, or there may be an operation of a second stage. Depending on the outcome of the second stage, the game may be over or there may be an operation of another stage. This sequence continues until the game ends or until the final ($n^{th}$) stage has been operated, at which time the game ends. Wagers are made on successive stages of the multi-stage game. Each stage of the game may typically have its own paytable or payout scheme, and its own expected return. A bet made on a stage of the game which is not played is lost in the preferred form of the invention. One embodiment is a three stage, multi-line, multi-coin video slot machine. The same game format (slots) with the same paytable is operated on three stages, with increasing payout multipliers at each stage providing an increasing amount to win at the higher stages. The "spin" at each stage is independent of the previous stages. The second embodiment is a multi-stage Five-Card Stud poker game. Each stage is again independent of the previous stage. A variation of this game is also shown which uses the same paytable on each stage, but combined with a mechanism to increase the "hit" rate. A third embodiment is a Draw poker game that combines the concepts of the Stud poker embodiment with the decisions and optimal play analysis that are integral to Draw poker. The fourth embodiment is a dice game which has been adapted to provide a high dependency between the first stage and the next stages.

10 Claims, 35 Drawing Sheets

U.S. PATENT DOCUMENTS

| | | | | |
|---|---|---|---|---|
| 4,156,976 | A | 6/1979 | Mikun | |
| 4,448,419 | A | 5/1984 | Telnaes | |
| 5,011,159 | A | 4/1991 | Fortunato et al. | |
| 5,100,137 | A | 3/1992 | Fulton | |
| 5,167,413 | A | 12/1992 | Fulton | |
| 5,224,706 | A | 7/1993 | Bridgeman et al. | |
| 5,294,120 | A | 3/1994 | Schultz | |
| 5,294,128 | A | 3/1994 | Marquez | |
| 5,350,175 | A * | 9/1994 | DiLullo et al. | 273/146 |
| 5,356,140 | A | 10/1994 | Dabrowski et al. | |
| 5,401,023 | A | 3/1995 | Wood | |
| 5,489,101 | A | 2/1996 | Moody | |
| 5,511,781 | A | 4/1996 | Wood et al. | |
| 5,513,851 | A * | 5/1996 | Harris | 273/274 |
| 5,531,448 | A | 7/1996 | Moody | |
| 5,570,885 | A | 11/1996 | Ornstein | |
| 5,584,486 | A | 12/1996 | Franklin | |
| 5,593,161 | A | 1/1997 | Boylan et al. | |
| 5,678,001 | A | 10/1997 | Nagel et al. | |
| 5,700,010 | A * | 12/1997 | Mimier | 273/292 |
| 5,707,285 | A | 1/1998 | Place et al. | |
| 5,711,715 | A | 1/1998 | Ringo et al. | |
| 5,718,431 | A | 2/1998 | Ornstein | |
| 5,722,891 | A | 3/1998 | Inoue | |
| 5,732,950 | A | 3/1998 | Moody | |
| 5,775,692 | A | 7/1998 | Watts et al. | |
| 5,791,987 | A | 8/1998 | Chen et al. | |
| 5,806,847 | A * | 9/1998 | White et al. | 273/309 |
| 5,816,916 | A | 10/1998 | Moody | |
| 5,823,873 | A | 10/1998 | Moody | |
| 5,823,874 | A | 10/1998 | Adams | |
| 5,848,932 | A | 12/1998 | Adams | |
| 5,868,619 | A | 2/1999 | Wood et al. | |
| 5,882,258 | A | 3/1999 | Kelly et al. | |
| 5,954,335 | A | 9/1999 | Moody | |
| 5,976,016 | A | 11/1999 | Moody et al. | |
| 6,004,207 | A | 12/1999 | Wilson et al. | |
| 6,007,066 | A | 12/1999 | Moody | |
| 6,007,424 | A | 12/1999 | Evers et al. | |
| 6,012,720 | A | 1/2000 | Webb | |
| 6,012,981 | A | 1/2000 | Fujioka et al. | |
| 6,059,289 | A | 5/2000 | Vancura | |
| 6,062,980 | A | 5/2000 | Luciano | |
| 6,098,985 | A | 8/2000 | Moody | |
| 6,120,378 | A | 9/2000 | Moody et al. | |
| 6,126,541 | A | 10/2000 | Fuchs | |
| 6,126,542 | A | 10/2000 | Fier | |
| 6,149,521 | A | 11/2000 | Sanduski | |
| 6,186,894 | B1 | 2/2001 | Mayeroff | |
| 6,190,255 | B1 | 2/2001 | Thomas et al. | |
| 6,196,547 | B1 | 3/2001 | Pascal et al. | |
| 6,203,429 | B1 | 3/2001 | Demar et al. | |
| 6,210,275 | B1 | 4/2001 | Olsen | |
| 6,270,412 | B1 | 8/2001 | Crawford et al. | |
| 6,312,334 | B1 | 11/2001 | Yoseloff | |
| 6,354,593 | B1 * | 3/2002 | Frommer et al. | 273/274 |
| 6,569,015 | B1 | 5/2003 | Baerlocher et al. | |
| 6,575,467 | B1 * | 6/2003 | Kal | 273/292 |
| 6,612,927 | B1 | 9/2003 | Slomiany et al. | |
| 7,267,611 | B2 * | 9/2007 | Slomiany et al. | 463/16 |

FOREIGN PATENT DOCUMENTS

| | | | |
|---|---|---|---|
| EP | 874 337 | A1 | 10/1998 |
| EP | 0 945 837 | A2 | 9/1999 |
| EP | 945 837 | A2 | 9/1999 |
| EP | 0 984 407 | A2 | 3/2000 |
| EP | 984 407 | A2 | 3/2000 |
| EP | 989 531 | A2 | 3/2000 |
| EP | 0 997 857 | A2 | 5/2000 |
| WO | WO 97/32285 | A | 9/1997 |
| WO | WO 99/19037 | A | 4/1999 |
| WO | WO 99/53454 | A | 10/1999 |

OTHER PUBLICATIONS

"A Salute to Game Shows", The Price is Right-Pricing Games. Retrieved from the Internet of Aug. 16, 2000. URL: http://www.benschumin.simplenet.com/game-shows/price-is-right/pricing-games.htm>.

Play It Again Poker Brochure, IGT, 1999.

Bunco Dice History and Rules, website article, http://worldbunco.com/history.html, May 22, 2000.

Super Bonus Poker by Bally Gaming, described in Strictly Slots, Apr. 2000, p. 51.

Multi-Play Poker by Bally Gaming, described in Strictly Slots, Dec. 2000, p. 62.

Multi-Play Poker by Bally Gaming, website article, http://ballygaming.com/products/multi-play-poker.html, Apr. 25, 2001.

Wheel of Madness Game, described in AC Coin & Slot brochure, 2000, p. 9.

Steemroller Dice Game, described in brochure of Steehn Gaming Systems, Inc., date unknown.

Monopoly Blackjack Edition Game, described in Mikohn brochure, 2000.

Multi-Action Blackjack, website article, http://conjelco.com/faq/bj.html, Apr. 25, 2001, printed on Jul. 30, 2001.

* cited by examiner

GAME START SEQUENCE

GAME OVER SEQUENCE

GAME OVER SEQUENCE

20/35

GAME START SEQUENCE

GAME OVER SEQUENCE

GAME START SEQUENCE

MAIN GAME PLAY SEQUENCE

MAIN GAME PLAY SEQUENCE (cont.)

GAME OVER SEQUENCE

MULTI-STAGE MULTI-BET DICE GAME, GAMING DEVICE, AND METHOD

This application is a divisional of U.S. Ser. No. 10/435,650, filed May 9, 2003, issued as U.S. Pat. No. 6,926,607, which is a divisional of U.S. Ser. No. 09/709,922, filed Nov. 10, 2000, issued as U.S. Pat. No. 6,612,927.

FIELD OF THE INVENTION

This invention relates to games in general, and particularly to gaming machines allowing wagers to be placed on a game, and more particularly to an innovative casino-type gaming machine which allows wagers on a plurality of game levels.

DISCUSSION OF THE PRIOR ART

There are many ways in which multiple wagers may be placed on different gaming machines. In one of the simplest forms, a player may make a variable wager on a specific bet. On a single line slot machine for example, as the player inputs additional coins into the machine (per play) the payouts for the single payline is multiplied by the number of coins bet. Often the higher awards increase beyond the given multiple, offering a bonus for betting more coins on this single payline. The same type of multiple coin bet is also well known in video poker, where a typical bet is one to five coins on each hand played. In such a video poker game, the paytable is multiplied by the number of coins bet with a substantial bonus being given for a Royal Flush when five coins are bet.

In other gaming machines, there are multiple bets that can be made on different outcomes. In a multiline slot machine for example, a wager can be made on each of a plurality of paylines. Typically, each payline is paid according to a paytable (also referred to as a "payout table") that is similar for each payline. A single spin of the reels yields a result on each payline which is paid if it matches a winning combination on the paytable.

The above two techniques have been combined, providing multiple paylines and multiple coins per payline. The pay for each payline is multiplied by the number of coins bet on that payline with certain bonuses available when a higher number of coins per payline are wagered.

Additionally, there have been games such as Double-Down Stud poker which allow a player to place an additional bet on a game that is already in progress. There have been games such as Play-It-Again poker which allow a player to make a new bet on a re-play of a starting hand.

Thus, it can be appreciated that there have been poker games, for instance, which allow a player to bet on multiple hands where each of the plurality of hands is generated from a single initial deal, followed by independent draws or re-deals for each hand that received a bet. In each case, the bets that are made are considered to be made on a game of chance, and paid if there is a winning result.

SUMMARY OF THE INVENTION

In broad overview, the present invention in one aspect allows the placing of multiple bets on different stages of a game. The game is comprised of a plurality of stages. Each operation of the game begins with the operation of a first stage. Depending on the outcome of the first stage the game may be over, or there may be an operation of a second stage. The second stage operation may be totally independent of the first stage, or may have dependencies on first stage events or data, e.g., the achievement of a "winning" first stage. As will be understood throughout this invention disclosure, "winning" is just one form of possible advancement to the next level. For example, one aspect of the invention includes a "special card" (Free Ride) which permits advancement even if a "losing" condition is presented at a level.

Depending on the outcome of the second stage, the game may be over or there may be an operation of a third stage. This sequence continues until the game ends or until the final ($n^{th}$) stage has been operated, at which time the game ends.

It should be appreciated that not every stage will operate in each game, and that the lowest stages will operate the most often while the highest stages will operate the least often.

As noted above, the present invention furthermore allows the player to place wagers on different stages of the multi-stage game. Each stage of the game may typically have its own paytable or payout scheme, and its own expected return. A bet made on a stage of the game which is not played is lost in one contemplated form of the invention. Thus, at the highest stages the bets made are lost very often, without even playing that stage of the game, because most games will end before getting to the highest stage bet. Due to this architecture, there is much greater opportunity for large wins in games which get to the highest stages. This makes for a more exciting gaming experience, because as the players watch the game successfully continue through the various stages, the expectation of what may be won at each stage usually increases.

Embodiments shown herein are generally constructed such that the player specifies at the outset of the game the number of stages or levels to bet on. For instance, bets are made on a first level, a second level, and up to the number of levels specified by the player. While this is one preferred embodiment which gives the player action at all levels up to the highest level bet, it is envisioned that the player could be allowed to arbitrarily choose which levels to bet without departing from the invention. So too, it is contemplated that the game could allow for a new bet as stages are achieved.

Certain contemplated embodiments also have a structure that any "Win" on a given stage advances the game to the next stage. Other contemplated embodiments have different game rules for continuing from stage to stage, and operate under those rules for a given stage.

In one aspect of the invention, it is a principal objective to provide a method of playing a game, where a player is initially provided with a first stage game of chance upon which a first wager is placed by the player, and a second stage game of chance upon which a second wager is placeable. As previously noted, the game stages can be the same type of game (e.g., slots), or different games (e.g., slots, cards, dice, roulette, etc.).

Each stage has a "winning" condition and a "losing" condition. That is, there is an established criterion or criteria whereby the player may advance from one stage to the next, or may not. As used throughout this disclosure, and in the claims, "winning" and "losing" are to be considered synonymous with advancing or terminating, unless otherwise stated.

The first stage game is played, with a determination of whether a winning/advancement or losing/terminating condition is presented. If a winning condition is presented by the first stage game as played, then the player advances to the second stage game, assuming a bet has been previously placed for that stage. If a losing condition is presented by the first stage game as played, however, the game is over and any second wager (or higher) is lost. It will be understood that in some embodiments a loss condition could be presented by simply achieving a condition where only part of a wager placed on a given level may be returned, i.e., a player wagered 5 on a level but only achieved a return of 3. So too, all of the bet need not be lost as a terminating/losing condition.

In the event that the first stage presents a winning condition and there is a wager for the second stage, then the second stage game is played. There follows a determination as to which of the winning and losing conditions is presented by the second stage game as played. These steps are repeated for as many stages as are provided by the game if all have been bet upon, or as many stages as have actually been bet upon if fewer than all, again assuming a winning/advancement condition has been met for each preceding stage.

In a preferred form the foregoing method of playing a game includes the step of providing a payout for a winning condition at the second stage, or more preferably providing a payout for a winning condition at each stage. The payout can be based upon the amount of a respective wager at a respective stage, and advantageously includes an increase by a multiplier for a payout at a respective stage, with the multiplier increasing for each successive stage.

In another aspect of the invention, the foregoing method is adapted for operating a processor-controlled gaming machine. In this application of the invention, gameplay elements are provided in a manner that can be visualized by a player, such as on a video display screen, or in some three dimensional format where the gameplay elements can be tracked (such as on a board with an electronic interface), just to name two ways of such visualization. In this form of the invention, a mechanism for a wager input from the player is also provided, along with a mechanism for game operational input from the player, such as to start play.

There is a first stage game of chance upon which a first wager is placed by the player, and at least a second stage game of chance upon which a second wager is placeable. Each stage has a winning/advancement condition and a losing/terminating condition. In the preferred form of the invention, all wagers are placed before play begins at the first stage level.

This gaming machine displays at least the first stage game using at least some of the gameplay elements. For instance, using a video monitor as an example, a first slot machine may be displayed (or first display of cards, or dice, etc.). More than one stage may be displayed at a time (e.g., a plurality of slot machine representations stacked one on top of another on the display). The first stage game is then played, with the previously described determination of which of the winning and losing conditions is presented by the first stage game as played. Again, if a winning condition is presented, the player advances to the second stage game, but if a losing condition is presented by the first stage game as played, the game is over and at least some (and most preferably all) of the second (and any subsequent) wager is lost.

If not already displayed, and assuming there has been an advancing condition met at the first stage and a bet placed on the second stage, the second stage game of chance is displayed (or, for instance, activated if already displayed). This second stage is played, with a determination of which of the winning and losing conditions is presented by the second stage game as played. If there is a winning condition, this form of the invention provides a payout for the second stage, as well as for any subsequent consecutive stage for which there is a winning condition, and a wager placed thereon.

One embodiment of this method as applied to a gaming machine provides a set of differing gameplay element indicia, such as facets of a die. A subset of at least one match indicia against which a set of dice are to be matched in the course of play is established, such as a random selection of die faces (e.g., three die numbers against which tossed dice are to be matched. In a preferred form of this dice gaming machine, first, second, third and successive stages up to said nth stages are displayed together as discrete arrays on a visual display.

The dice are initially tossed in one embodiment, and beginning with at least the second stage game, a determination is made as to whether any match is made between the match indicia and the dice tossed. At least one match comprises a winning condition for a stage being played, in this embodiment. If a match is not made, then the unmatched indicium is removed from further play. The game ends when no matches are made at a given level, again assuming that a wager has been made up to and including that level.

Yet another aspect of the invention is providing a feature which is subject to random allocation to a stage in the course of play, with the feature if allocated enabling a next stage to be played regardless of whether a winning condition has otherwise been presented. The feature, referred to herein as a "Free Ride," therefore constitutes or comprises a so-called winning/advancement condition. Of course, a wager still needs to have been placed on the next stage which is subject to being so enabled for play by the Free Ride feature.

A video card game comprises yet another form of the invention. Here, a video display device is driven by a cpu having a program. A wager input mechanism registers a wager placed by a player, with the wager including an ability to register bets upon successive stages of the game. A first deck of playing cards comprised of cards of suit and rank is generated by the program, with the program establishing a first array for display of a subset of the deck (i.e., a hand) of cards randomly selected from the deck.

A first stage hand of cards is dealt. The card game could be one in which the hand as so dealt is not subject to a draw, or the player can select cards to discard, with a new card taking the place of any discarded. In either event, the hand ultimately becomes set, and a determination is made as to whether the hand of cards presents a winning/advancement condition based upon a preset hierarchical ranking of card arrangements relating to suit and rank. As in the situations noted above, subsequent hands of cards are dealt if a winning condition is presented by the previous hand, provided a bet has been registered for each successive stage. If a losing condition is presented by a stage, or a stage is reached upon which no wager has been made, the game is over. Bets on any higher stage are lost if a losing condition is presented, as is the bet on the stage for which the losing condition is registered. A payout output based upon the wager and predetermined values for a stage is preferably provided according to a preset hierarchical ranking of card arrangements relating to suit and rank. The payout output can include payout tables which are different for at least some of the stages, and may further include a multiplier for at least some of the stages, with the multiplier increasing for successively higher stages.

In a video slot machine version of the invention, a plurality of rotatable reels is generated by the computer program, each of the reels being comprised of a plurality of different indicia. Each of the reels is caused by the program to appear to rotate and then randomly stop to thereby yield a display of certain indicia as a spin. If an advancement condition is presented on the first stage spin, a second stage spin occurs if a bet has been registered for that second stage spin, and so forth. The first stage spin can be visually displayed as a first set of reels in a first array, with the second stage spin likewise visually displayed as a second set of reels in a second array, and successive stage spins each so displayed as further sets of reels in successive respective arrays, with a plurality of arrays being displayed together on the visual display. Alternatively, one set of reels could be repeatedly spun for each stage. Payouts and multipliers can be provided in like manner to that described above for the card game embodiment, or as otherwise may be desired. One variant of the slot machine version of the invention has the multiplier for the games nth stage spin (the last possible level) randomly selected by the program from a predetermined table of multipliers, where at least most of the multipliers are greater than a multiplier for any previous stage. This random multiplier can advantageously be displayed, or physically embodied, as a wheel having segments with the multipliers displayed in respective segments of the wheel. The wheel is caused to rotate and come to a stop with the random multiplier at a designated stop point.

Of course, the foregoing invention as described in a video slot machine embodiment could be readily embodied in a standard mechanical slot machine. Likewise, the video dice game is readily adapted to a table-type game format, as is the video card game contemplated above.

In the same vein, a gaming machine coming within the scope of one aspect of the invention broadly comprises a gaming unit having at least first and second stages of play, each stage having an advancement condition and a non-advancement condition. Some kind of interface mechanism with the gaming unit allows gameplay input for a player, with the gameplay input including wagering input allowing the player to register a bet upon one or more stages of play.

An operational device operates the gaming unit, upon player input including an operational command. The operational device determines which of the conditions is presented by a first stage as played, and if an advancement condition is presented, then advancing the gaming unit to the second stage, but if a non-advancement condition is presented, the game is over and at least a portion, and preferably all, of any second stage bet registered is lost. Play continues for a successive stage up to a predetermined nth stage if an advancement condition is determined for that next stage to be reached, and a bet has been previously registered for that successive stage. Again, the stages of play can be games which are of the same type of game, or different types of games. These can also be games that have not yet been invented.

These aspects of the invention, along with other aspects, advantages, objectives and accomplishments of the invention, will be further understood and appreciated upon consideration of the following detailed description of certain present embodiments of the invention, taken in conjunction with the accompanying drawings, in which:

DETAILED DESCRIPTION OF PREFERRED EMBODIMENTS

Figure 1:
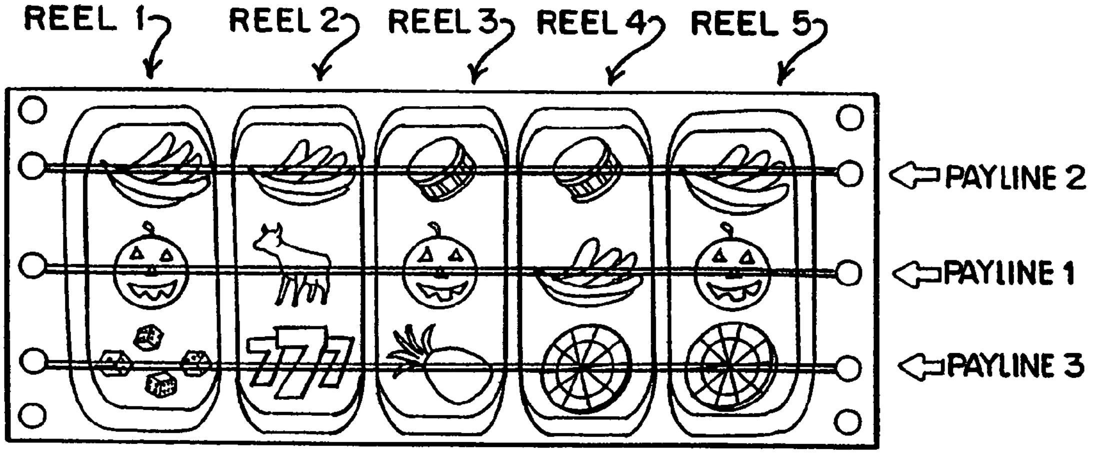
FIG. 1 is a video screen representation highlighting three paylines of a stage of a video slot machine embodiment of the present invention.

Four different embodiments of the present invention are described herein, with some noted variations in certain cases. The first embodiment is a three stage, multi-line, multi-coin video slot machine. The same game format (slots) with the same paytable is operated on three stages, with increasing payout multipliers at each stage providing an increasing amount to win at the higher stages. The "spin" at each stage is independent of the previous stages.

The second embodiment is a multi-stage Five-Card Stud poker game. Each stage is again independent of the previous stage. However, a separate paytable is used for each stage in this embodiment. A variation of this game is also shown which uses the same paytable on each stage, but combined with a mechanism to increase the "hit" rate.

The third embodiment is a Draw poker game that combines the concepts shown in the Stud poker game with the decisions and optimal play analysis that are integral to Draw poker. The final embodiment is a dice game which has been adapted to provide a high dependency between the first stage and the next stages.

While each of these embodiments uses a single game format, or type, to play from stage to stage, as noted above, it is clearly anticipated that the invention may be used with a first game type as a first stage, with a subsequent stage or stages being of a different game type, e.g., a single line slot stage, then a multi-line slot stage, then a Stud poker stage, etc. Thus, it should be appreciated that similar or different games of chance may be staged together, and the invention is not limited to the types of games shown here, and would encompass any conceivable other game, such as roulette, craps, baccarat, keno, and so on. It will also be apparent to one of skill in the art how to use the invention in live games with dealers (i.e., table games), notwithstanding the particular embodiments described herein relating to gaming machines.

Triple-Strike Slots

A first embodiment of this invention takes the form of a multi-stage slot machine. This may be done on a video screen with the presentation of a video slot machine, or may be accomplished with mechanical spinning reels, for instance. In a mechanical embodiment, the stages may be played sequentially on the same reels, or on physically separate reels. It is also adaptable for combinations of video slots and mechanical spinning reel slots, where some stages are played on the video slots and some stages are played on mechanical spinning reels.

In this first embodiment, there are three video slot machines (stages) vertically disposed on a video screen (although it will be apparent how to adapt this technique to any number of desired stages). In this embodiment, each machine has the same symbols, symbol frequency, hit rate and payout percentage. Of course, other embodiments may use different hit rates and frequencies, if not entirely different symbols and game themes from stage to stage.

In this first embodiment, the criterion for advancing from one stage to the next is any win on the current stage. It is envisioned that other criteria may be used in other embodiments, such as a special symbol, which while only paying in certain configurations, would advance a player to the next level anytime it appeared in the game.

Turning now to FIG. 1, the first embodiment has each stage as a five-reel, five-line video slot machine. This is of a type of slot machine often called "Australian style." This machine allows the player to make a wager on one to five paylines, and allows a bet from one to nine coins bet on each payline for a maximum of forty-five coins bet per game. FIG. 1 shows the first three paylines, with payline 1 drawn horizontally across the center symbols, payline two drawn across the upper symbols and payline three drawn across the lower symbols.

Figure 2:
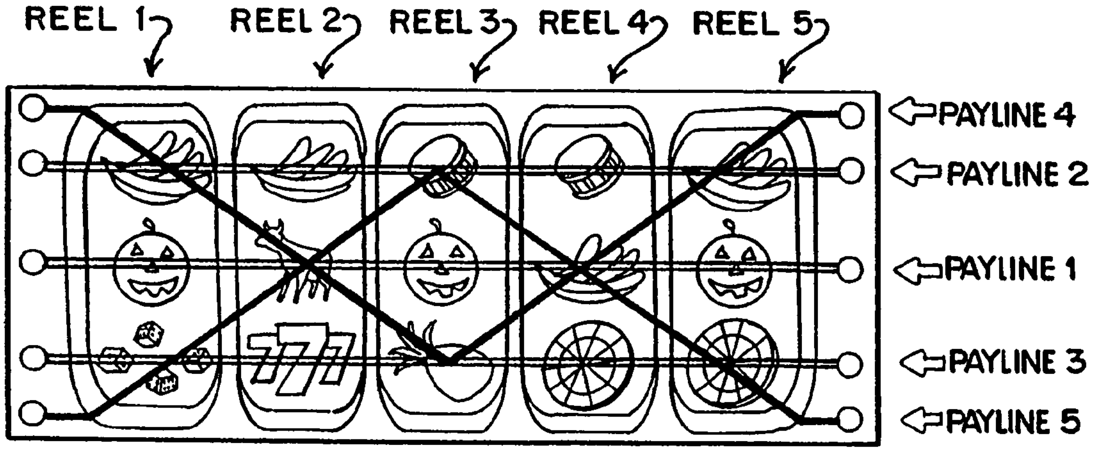
FIG. 2 is a video screen representation similar to FIG. 1 highlighting five paylines.

FIG. 2 is the same as FIG. 1, with fourth and fifth paylines added. The fourth payline is in the shape of the letter "V" while the fifth payline is an inverted "V". It is well known by those skilled in the art how to design such a machine with more or fewer paylines, and more or fewer coins per line. It is also well known in the art, and envisioned for this type of game, to include special bonuses or bonus rounds for certain symbol combinations. Certain combinations have been included for this purpose in the present description, but the special bonuses and bonus rounds have been replaced by fixed awards for clarity of presentation.

Figure 3:
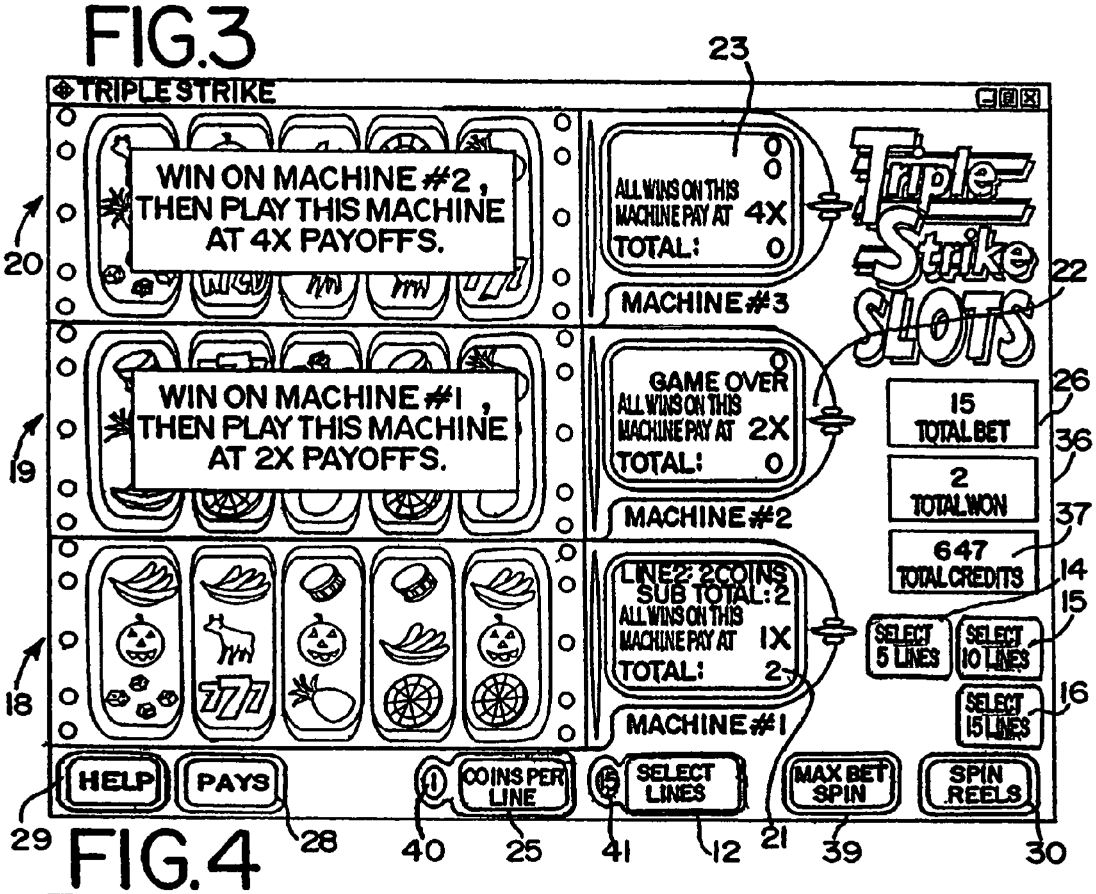
FIG. 3 is a video screen representation of a three stage slot machine embodiment of the present invention.

FIG. 3 shows a screen with three stages displayed. For each game played, the player selects from one to fifteen paylines (i.e., five paylines times three stages) to play or "activate". The player operates the machine by pressing (actuating) buttons through the use of a touchscreen display, some pointing device, or through the use of corresponding mechanical push-button switches. The player may repeatedly press the "Select Lines" button 12 in FIG. 3 to select one to fifteen lines. One may also press the "Select 5 Lines", "Select 10 Lines" or "Select 15 Lines" buttons (14, 15 and 16, respectively) to select all lines of the first, first and second or all three machines respectively. As used herein, "machine" refers to each separate slot display 18, 19, 20 (which will variously be referred to as machine, stage and level). Selecting from one to five lines will activate the lines on the lower machine 18 and allow a "spin" (play) on the lower machine 18. Selecting from six to ten lines will activate the five lines on the lower machine and one to five lines on the second machine 19. This will then allow a spin on the first machine 18; if there is any winner on the first machine 18, a spin on the second machine will then follow. All amounts won on the second machine 19 are multiplied by two (2×) in this version (see window 22).

Selecting from eleven to fifteen lines will activate the five lines on the first machine 18, the five lines on the second machine 19 and from one to five lines on the third machine 20. This will then allow a spin on the first machine 18, and if there is a winner on the first machine, then a spin on the second machine 19 (with 2× payout following). If there is any winner on the second machine 19, that will allow a spin on the third machine 20. All amounts won on the third machine 20 are multiplied by four (4×) in this version (see window 23).

In this particular embodiment, the "hit rate" (percentage of games that have any win) is carefully set just over 50%. This allows each stage (18, 19 and 20) to have a multiplier that is twice that of the previous stage, and result in a reasonable expected payout for the player and reasonable expected return for the operator (e.g., gaming establishment). More stages could be added in a manner described without departing from the invention. Also, vastly different hit rates and multipliers could be used, separate paytables for each stage that do not scale evenly may be used, and other variations thereon will be readily apparent to those of skill in this art.

It should be noted that bets on the second machine 19 (lines six through ten) and the third machine 20 (lines eleven through fifteen) will be lost if a machine at a stage (level) below it does not result in a win, in this embodiment. This is considered offset in the mind of the player by game multipliers (2× and 4× respectively) when these machines do get a chance to spin. This increased opportunity for winnings when these upper stage machines get to spin adds a great deal of excitement and anticipation for the player.

Once the player has selected the number of lines, he or she specifies how many coins are to be wagered for each of the selected lines. As is well known in the art, all payouts are multiplied by the number of coins bet per payline. The player may repeatedly press the "Coins Per Line" button 25 (FIG. 3) to select one to nine coins-per-line. The total bet is the product of the number of lines selected (button 12) and the number of coins-per-line, and is shown in the "Total Bet" meter 26.

Figure 4:
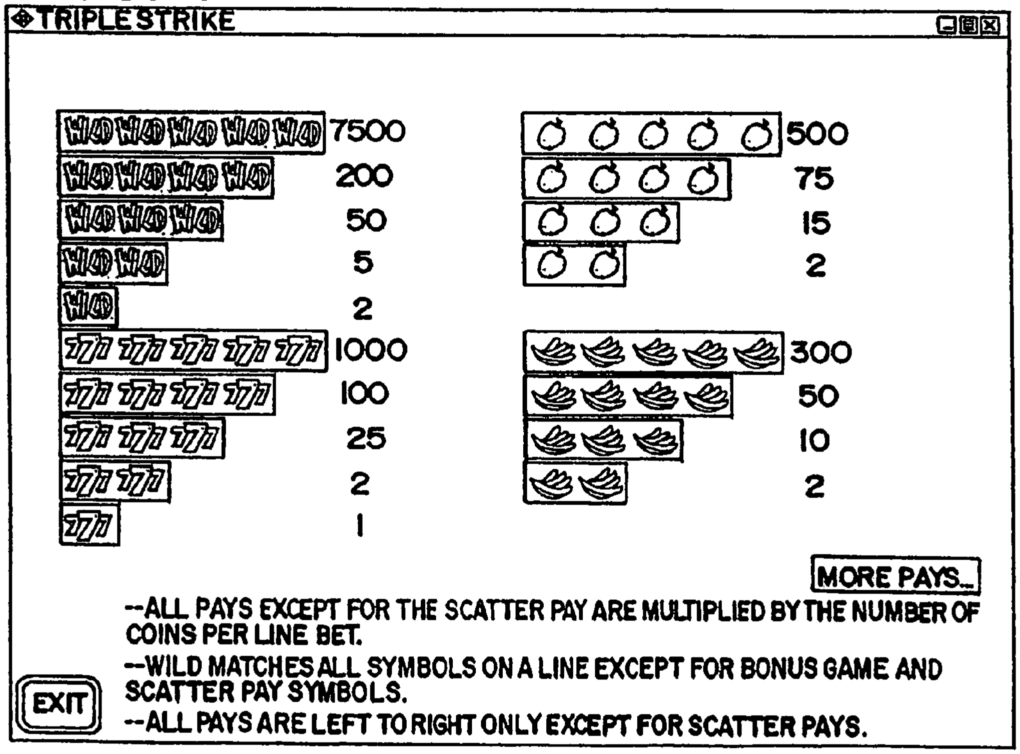
FIG. 4 is a representation of a paytable of winning combinations for the slot machine presented in FIG. 3.
Figure 5:
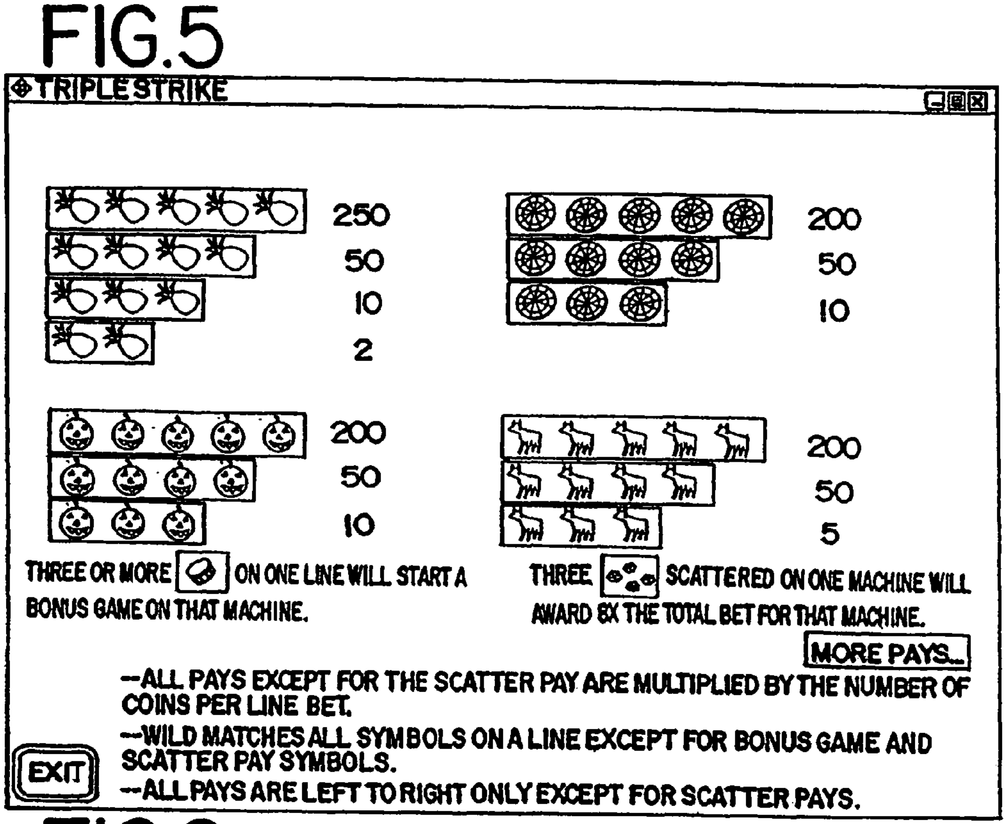
FIG. 5 is a representation of a continuation of the paytable of FIG. 4.

FIG. 4 and FIG. 5 show the paytables indicating the available winning combinations and rules governing those combinations. These paytables may be displayed at any time by pressing the "Pays" button 28 (shown, e.g., in FIG. 3). The "Help" button 29 may be pressed at any time for an overall description of the rules of the game and its operation. Again, these buttons, their operation and related programming, are well known.

Once the specifics of the bet are selected as described above, the player presses the "Spin Reels" button 30, which will initially spin the reels on the first slot machine 18. If there is no winning combination on any active (bet) payline then the game is over and the entire bet is lost, including any amount bet on the other machines 19, 20. If there is any winning combination on an active payline of the first machine 18, then the machine display will first show all winning paylines followed by a pattern of cycling through the individual winning combinations.

Figure 6:
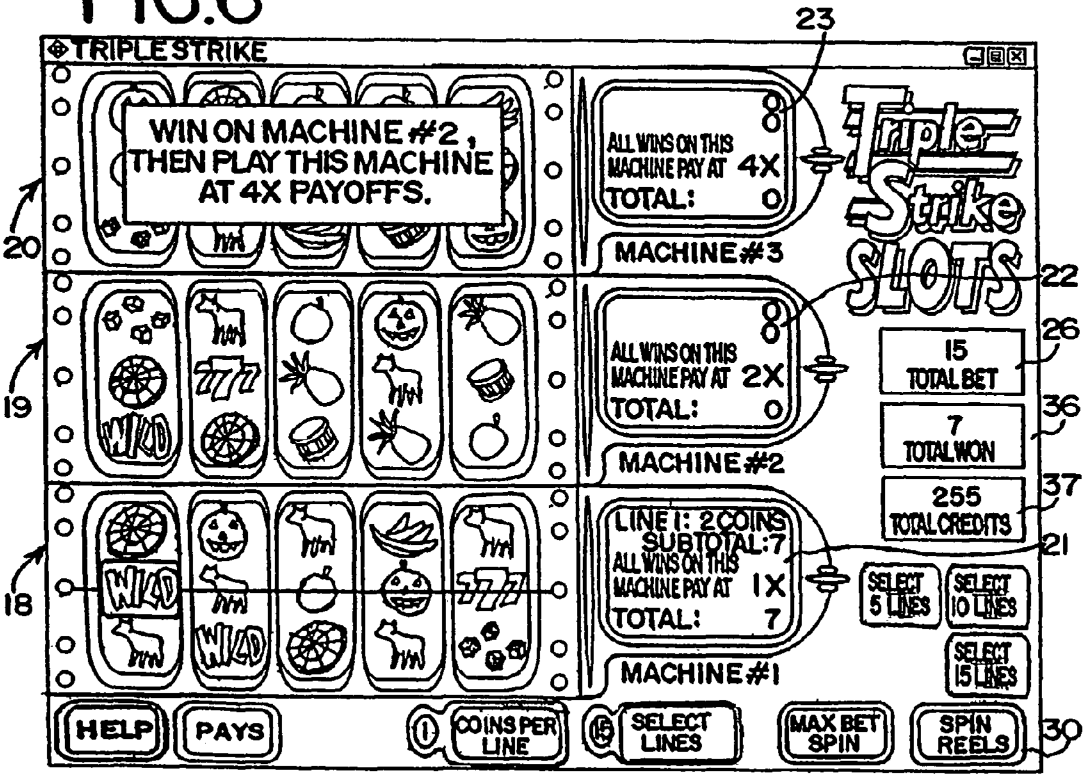
FIG. 6 is another video screen representation of the slot machine embodiment of FIG. 3 of the present invention.
Figure 7:
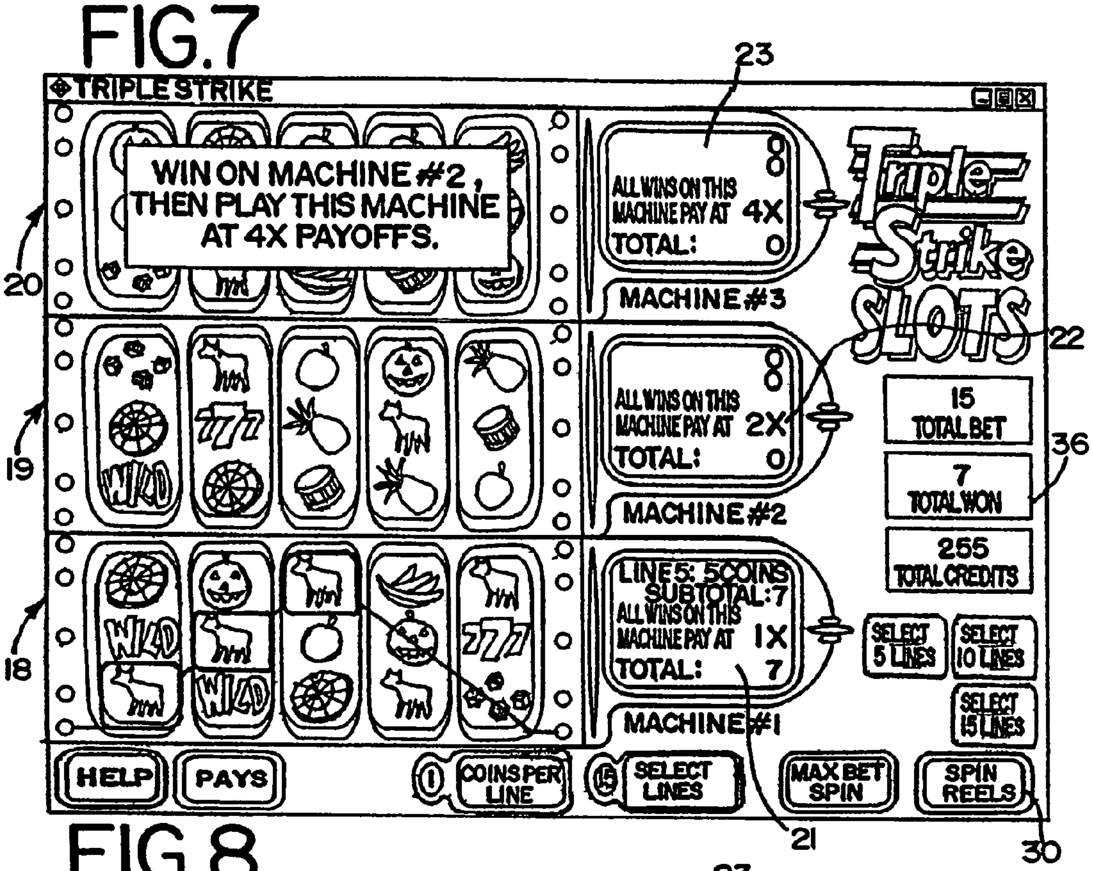
FIG. 7 is another video screen representation of the slot machine embodiment of FIG. 3.

FIGS. 6 and 7 show how the game cycles through multiple winning combinations of the first machine 18. In FIG. 6, the single "WILD" symbol is shown as a winner on payline 1. The machine draws boxes, for instance, around the winning symbols on the payline. In the payout information window 21 to the right of the first machine 18, the top line calls out "Line 1: 2 Coins". This indicates the two coins awarded for one "WILD" symbol on payline 1, as confirmed by the paytable in FIG. 4. After showing the display of FIG. 6 for a few seconds, the machine shows the display of FIG. 7, which calls out the next winning combination. FIG. 7 shows three cow symbols on payline 5 (in boxes). The top line of the payout information window 21 now calls out "Line 5: 5 Coins" in recognition of the five coins won for the three cows on the fifth payline (confirmed by the paytable in FIG. 5).

For both FIG. 6 and FIG. 7, the second line of the payout information window 21 shows the total number of coins from all pays of the first machine (in this case "SubTotal: 7" consisting of the two coins from the first payline and the five coins from the fifth payline). The lower half of the payout information window 21 then shows the total pay of the machine, times the machine multiplier, which for the first machine is one (1×).

This results in a "Total" of seven coins for the lower machine. The "Total Won" meter 36 on the right edge of the screen shows this seven coin figure in FIG. 7. FIG. 6 and FIG. 7 show the second machine 19 "lit up" and ready to spin as a result of the win on the first machine 18.

As a result of winning on machine 18, the player is now allowed to spin the reels of the second machine 19, provided that a bet was placed on at least one of lines six through ten. The reels on the second machine 19 are spun by again pressing the "Spin Reels" button 30. If there is no winning combination on the reels of the second machine 19, then the game is over. In that case, any bet made on the third machine 20 (lines eleven through fifteen) is lost, and the winnings from the first machine 18 are paid to the player. The game pays the awarded credits from first machine 18 then restarts, becoming ready to take another bet.

Figure 8:
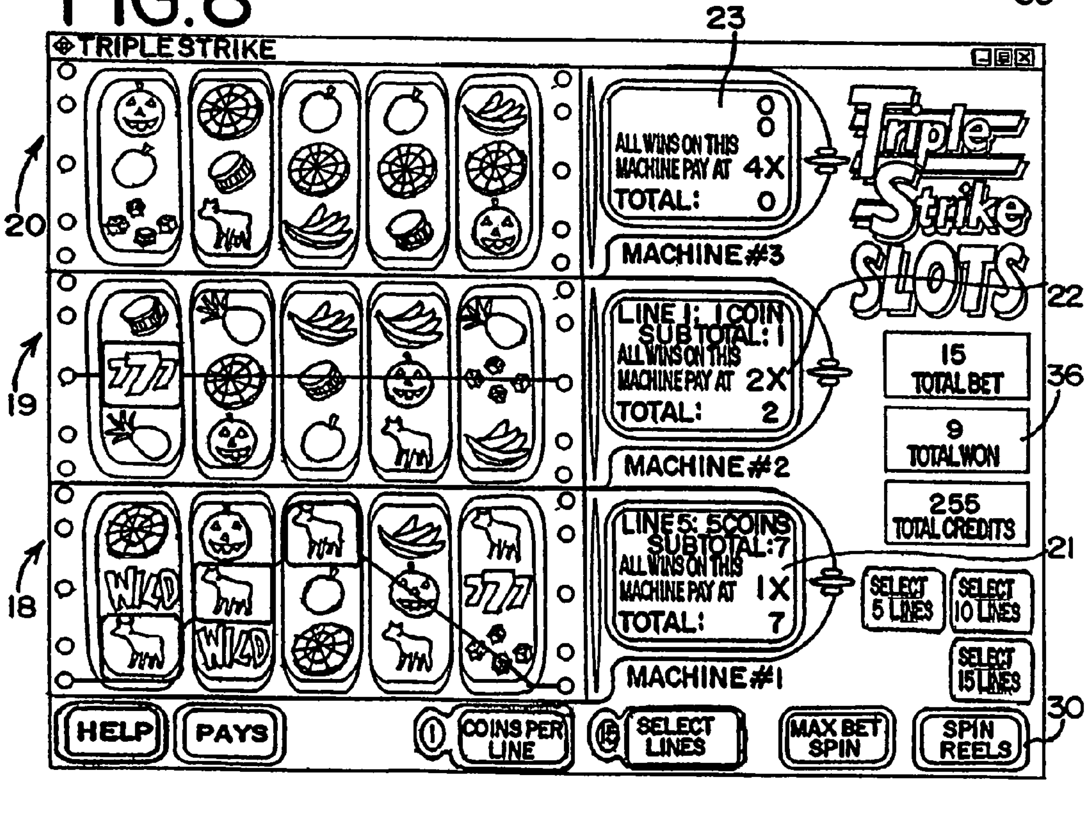
FIG. 8 is another video screen representation of the slot machine embodiment of FIG. 3.

In the case of a winning combination on the second machine 19, then it may have an overall display similar to FIG. 8. With only a single winning combination on the second machine, the machine boxes the "7's" symbol on its first payline, and shows in the second stage, payout information window 22 that one coin was won for a "SubTotal" of one coin on the second machine 19. Since all pays on the second machine are multiplied by two in this version (multiplier 2×), this results in a total pay of two coins on the second machine 19. The "Total Won" meter 36 is now updated to nine coins, which comprises the seven coins won from the first machine 18, plus the two coins won from the second machine. Since the player bet five coins on the second machine 19 (one each on lines six through ten), this second machine result is actually a net loss of three coins. However, because it was not a total loser (zero coins won), the player is now entitled to spin the third machine 20 if a bet was placed on any of lines eleven through fifteen. FIG. 8 shows the third machine 20 lit up and ready to spin as a result of the two coin win on the second machine.

Once again, the reels on the third machine are spun by pressing the "Spin Reels" button 30. If there is no winning combination on the reels of the third machine 20, then the game is over. In that case, the winnings from the two other machines are paid to the player, and the game recycles for a new bet.

Figure 9:
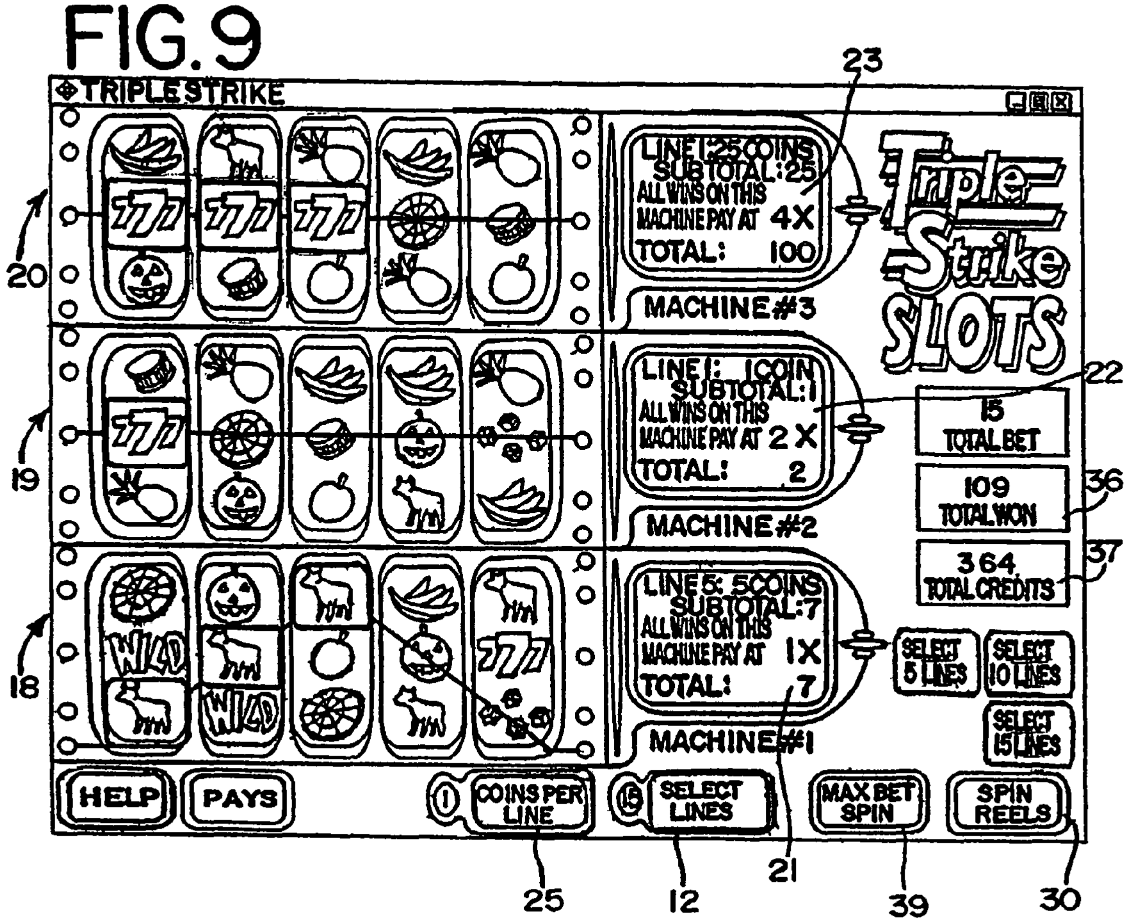
FIG. 9 is another video screen representation of the slot machine embodiment of FIG. 3.

A winning combination is shown on the third machine 20 in FIG. 9. With only a single winning combination on the third machine 20, the machine boxes the three "7's" symbols on its first payline, and shows in the third stage payout information window 23 that twenty-five coins were won, for a "SubTotal" of twenty-five coins on the third machine 20. Since all "pays" on the third machine are multiplied by four (multiplier 4× for this version), this results in a total pay of one hundred coins on the third machine 20. The "Total Won" meter 36 is now updated to 109 coins, to include the 100 coins won from the third machine. With the third and final machine having been played, the total winnings of 109 coins are now added to the total credits meter 37, and the game is ready to restart and receive another bet.

The "Max Bet Spin" button 39 (shown in FIGS. 3 through 9) provides a one touch solution which will cause all fifteen lines to be selected with nine coins bet per line and spin the reels on the first machine 18, assuming enough credits are available. It is the same as pressing the "Select Lines" button 12 until "15" is selected, then pressing the "Coins Per Line" button 25 until "9" is selected, then "Spin Reels" button 30.

Figure 10A:
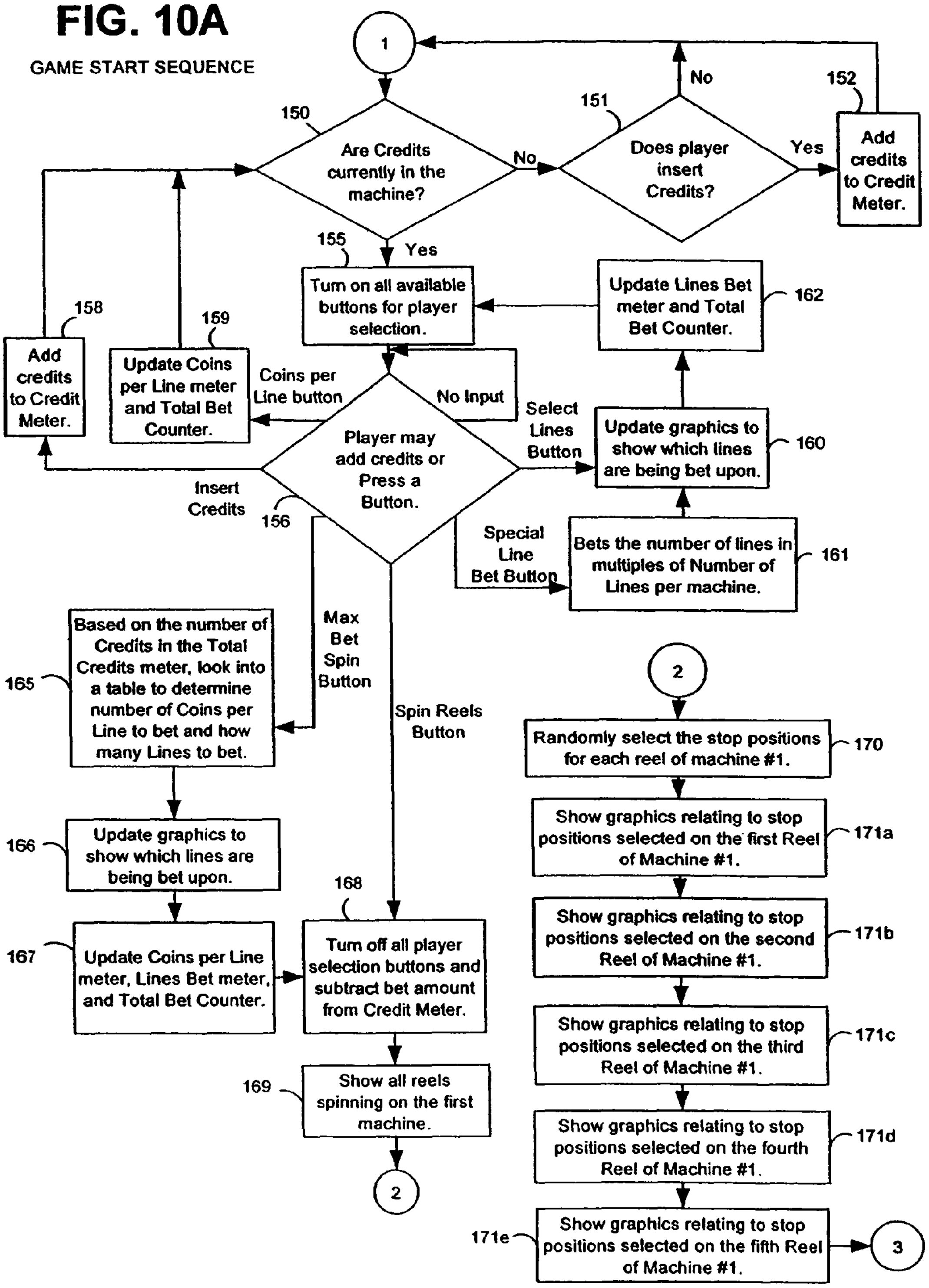
FIGS. 10*a*-10*e* present a flow chart of a method of operating a three stage video slot machine gaming machine of the type of embodiment of FIG. 3.

The above-described embodiment of a gaming slot machine is operationally summarized in the flow charts of FIGS. 10A-E. FIG. 10A generally describes the start-up of the Triple-Strike Slots game. First, an assessment of whether credit(s) are present is undertaken beginning at step 150. If none is present, then a check is made as to whether the player has inserted the relevant coin, credit card, etc., for the necessary credit(s) at step 151. If so, then at step 152 the credit(s) are registered and displayed at the "Total Credits" meter 37 (e.g., FIG. 3). All available player buttons are then activated for initiation of play at 155.

At this stage, the player enters a set-up loop where the player may choose to add more credits or proceed with play at step 156. If credits are added, these are registered (on the meter display 37) at step 158, and the program loops back to step 156 (via 155).

The "Coins Per Line" button 25 can alternatively be engaged from step 156, causing the coins-per-line setting to be modified (as indicated at meter 40, FIG. 3), as well as updating the value of the "Total Bet" window 26, as indicated at step 159. Once again, the program loops back to step 156.

Back at step 156, the player then can choose the lines upon which to bet through operation of general "Select Lines" button 12. This causes the graphics program to highlight the lines being designated at step 160. Alternatively, the special "Select Lines" buttons 14 through 16 could be used out of step 156, also resulting in a registration of the line group selected (at step 161), then an update of the graphics at step 160.

From step 160, the number of lines bet is registered on lines-bet meter 41 (e.g., FIG. 3), and updated if the lines bet has been modified up or down, as indicated at step 162. The "Total Bet" window 26 is also updated in view of the lines being bet. The player is then returned to step 156.

Once the player has input the parameters of the wager, then the "Spin Reels" button 30 is engaged. It should be noted that the foregoing selection sequence as to coins and lines to bet need not follow the order indicated.

The player has the option of skipping all of the line and coins-per-line selections, through resort to the "Max Bet Spin" button 39. A subroutine will then execute at step 165 to assess the total credits the player has provided, and determine the maximum number of coins per line and the maximum number of lines (per an embedded look-up table) which can be played for the credit quantity shown in total credits meter 37, up to a fixed maximum for the game. The graphics are updated accordingly at step 166 to show the lines being bet (as at step 160), with a similar update of the coins-per-line meter 40, lines-bet meter 41 and "Total Bet" meter 26, all as indicated at step 167.

From either the actuation of the "Spin Reels" button 30 or the "Max Bet Spin" button 39, the selection buttons for player input are then deactivated and the amount bet is subtracted at step 168, with the remaining credits updated on the "Total Credits" meter 37. The display graphics then shows the reels spinning at the first stage/level/machine 18 (step 169). The reel stop positions are selected in a random manner (step 170), with the graphics displaying the final symbols coming into view for each reel in sequence (steps 171*a* through 171*e*).

Figure 10B:
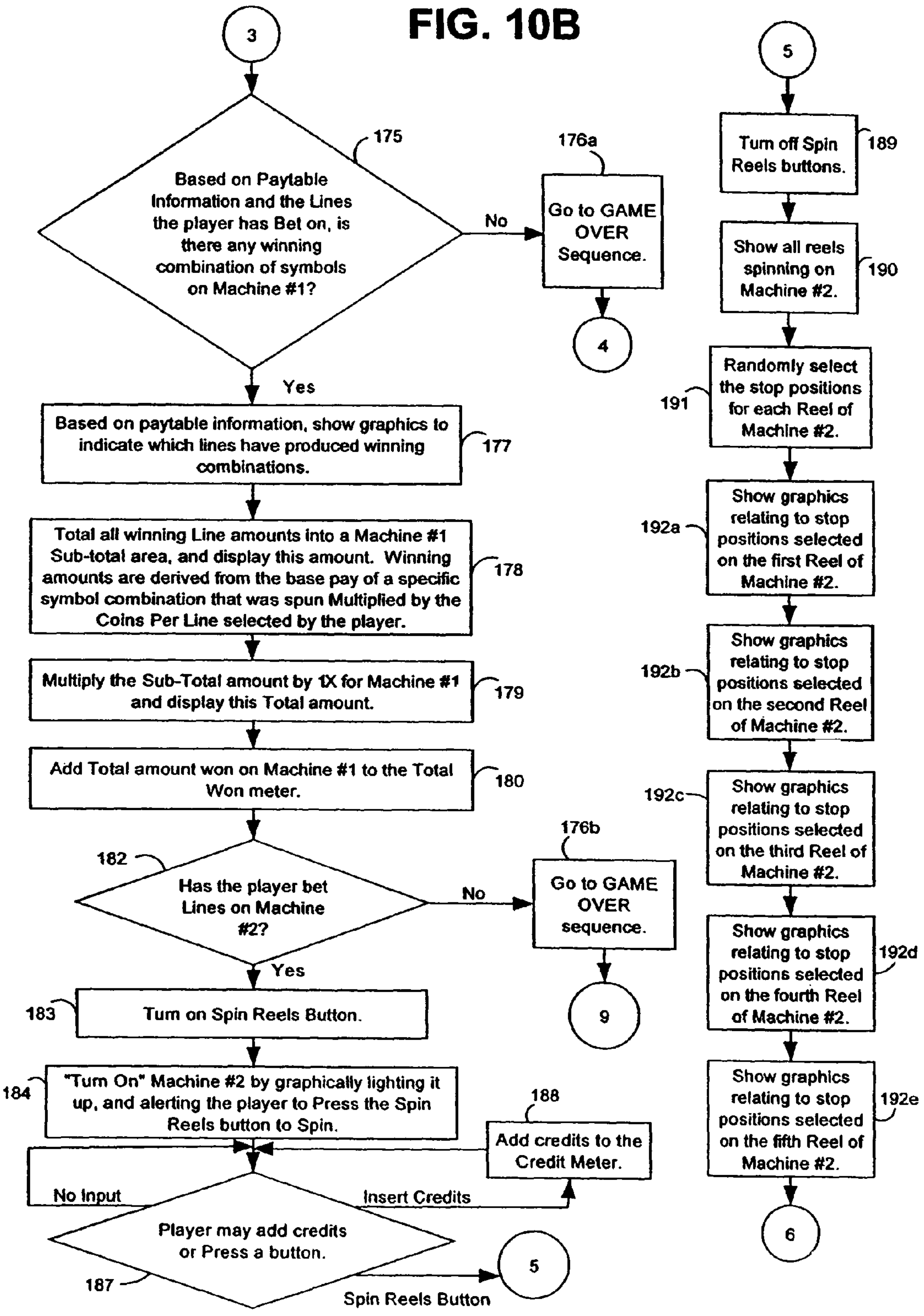

Turning now to FIG. 10B, the program then assesses whether there is any winning combination presented by the reels in their stop positions, taken in view of the paytable (FIGS. 4 and 5) and the lines bet, as indicated at step 175. If there is no winner, the game goes to a "Game Over" sequence (step 176*a*), described hereafter. If there is a winner, then the winning line(s) are graphically highlighted on the display (step 177), the amount won is totaled and shown in the "Sub-Total" area of the first stage payout information window 21 (step 178), and the "SubTotal" amount is increased by the applicable multiplier (step 179), which in this first embodiment is 1× for stage one. This total for machine one is displayed in payout information window 21. The "Total Won" meter 36 is accordingly updated (step 180).

An assessment is then made as to whether the player has bet on any lines of the second stage/level/machine 19, as noted at step 182. If not, then the game goes to the "Game Over" sequence (step 176*b*). If a stage-two bet has been registered, then the player "Spin Reels" button 30 is reactivated at step 183. Machine two 19 is graphically highlighted on the display (e.g., see FIG. 6), which may include flashing the button 30 or the like to alert the player to continue play (step 184).

While waiting for the player to spin the second stage (machine two 19), like all other points that the program waits for input, a check is made at 187 to see if additional credits have been purchased by the player. If more credits are input, they are registered on the "Total Credits" meter 37 (step 188), and the player is looped back to step 187. Ultimately, the "Spin Reels" button 30 is actuated by the player at step 187, and play on the second machine 19 commences.

The button 30 is then deactivated (step 189), the second machine reels are graphically shown spinning (step 190), and the sequence of steps 170 and 171*a* through 171*e* described with respect to the first machine 18 is repeated, except now as related to the second machine 19, as shown in steps 191 and 192*a* through 192*e*.

Figure 10C:
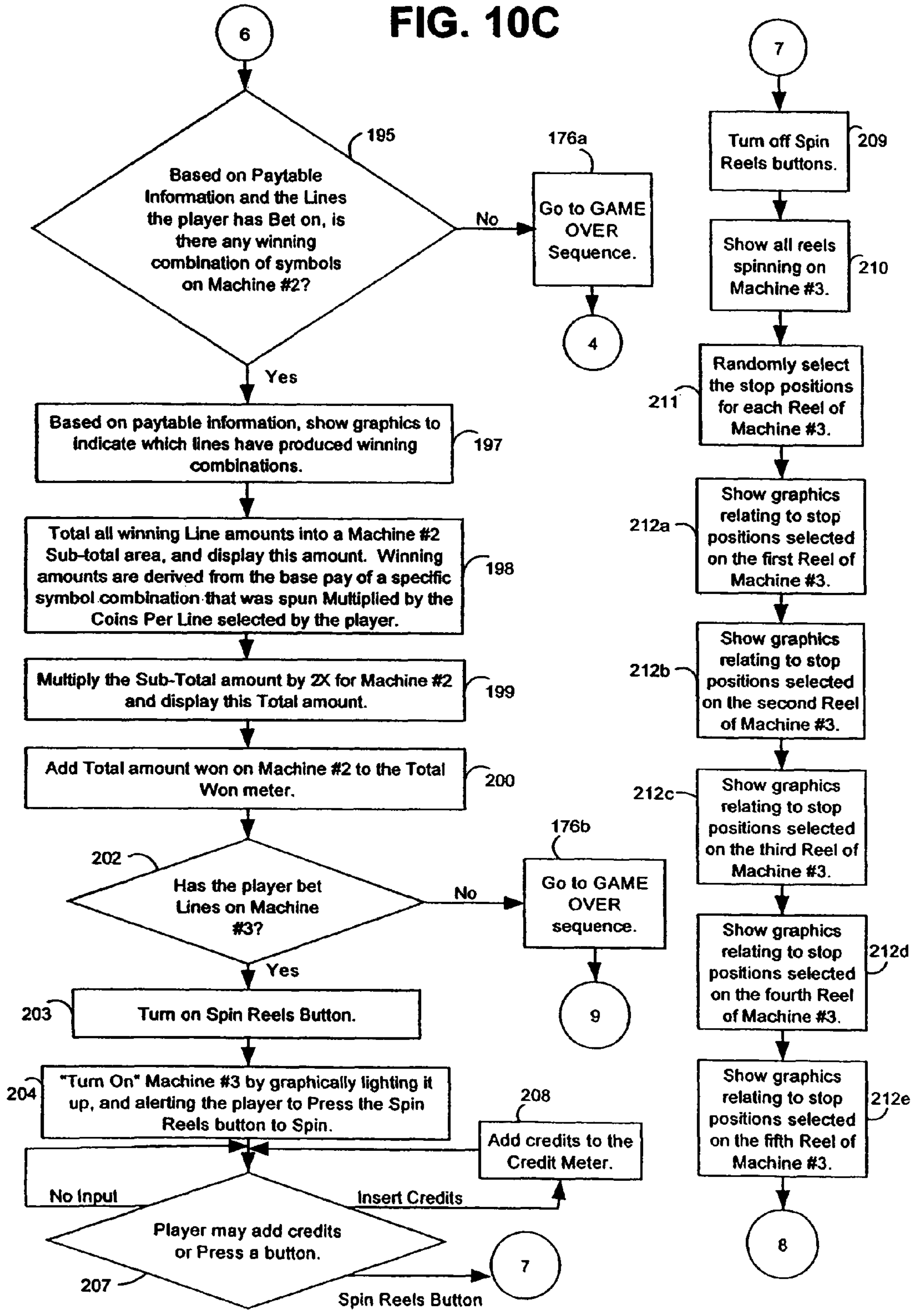

As shown in FIG. 10C, steps 195 and 197 through 200 then repeat the process for the second machine described in steps 175 and 177 through 180, respectively, with regard to the first machine. Note that step 199 increases the "Sub-Total" by 2× in this version, and the payout information window 22 is utilized.

If a bet has been registered for lines on the third machine 20 (step 202), the "Spin Reels" button 30 is again activated (step 203), machine 20 is graphically highlighted on the display (e.g., see FIG. 8), which may include flashing the button 30 or the like to alert the player to continue play (step 204), and the player is again given the option of adding more credits, or alternatively simply advancing to play the third stage (step 207). If more credits are input, they are registered on the "Total Credits" meter 37 (step 208), and the player is looped back to step 207. Ultimately, the "Spin Reels" button 30 is actuated by the player at step 207, and play on the third machine 20 commences.

The "Spin Reels" button is once more deactivated (step 209), and steps 210, 211 and 212*a* through 212*e* repeat steps 169, 170 and 171*a* through 171*e*, respectively, this time for the third machine 20.

Figure 10D:
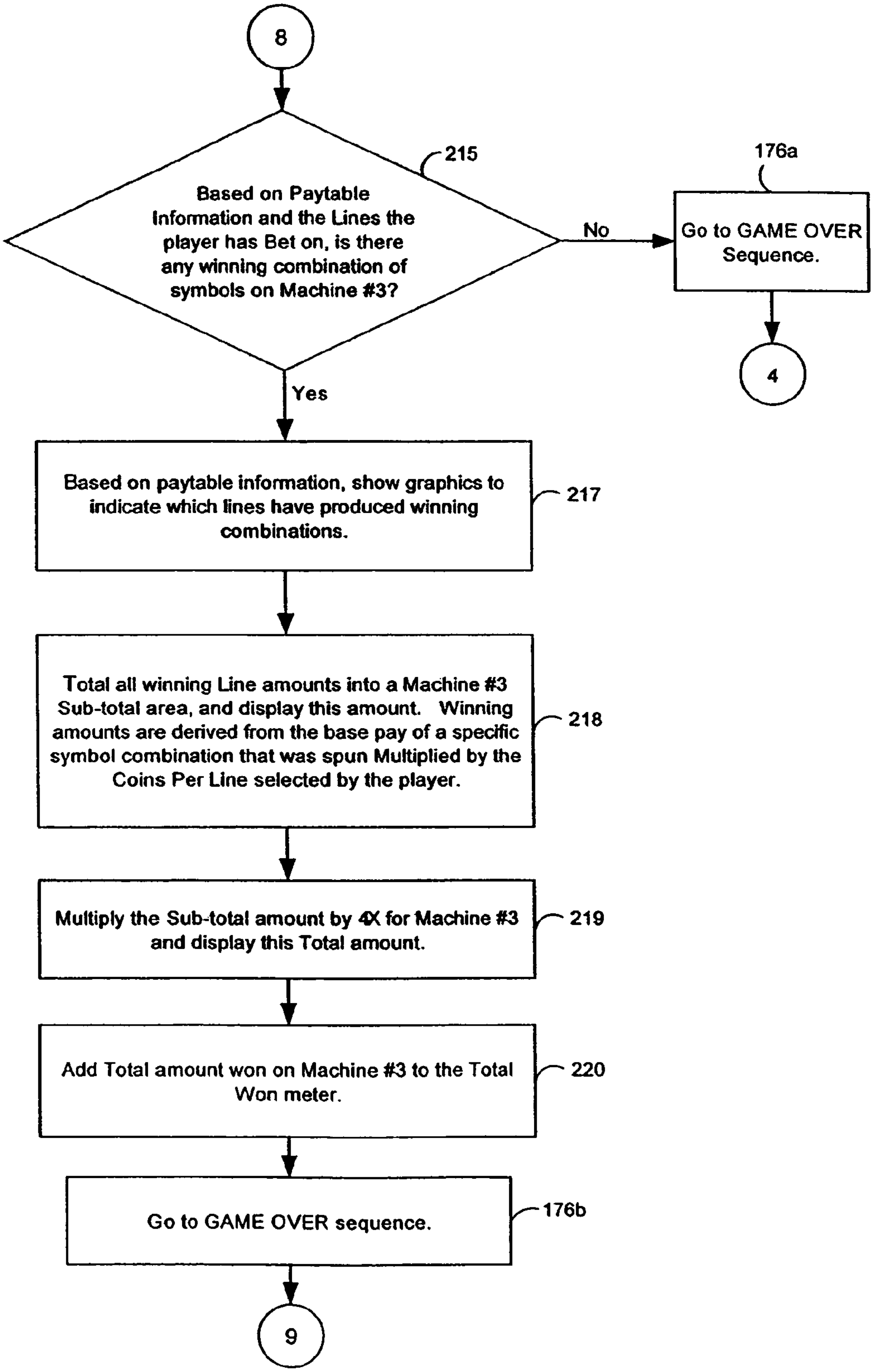

As shown in FIG. 10D, steps 215 and 217 through 220 then repeat the process for the third machine 20 described in steps 175 and 177 through 180, respectively, with regard to the first machine 18. Note that step 219 increases the "Sub-Total" by 4× in this version, and the payout information window 23 is utilized (e.g., see FIG. 9).

Figure 10E:
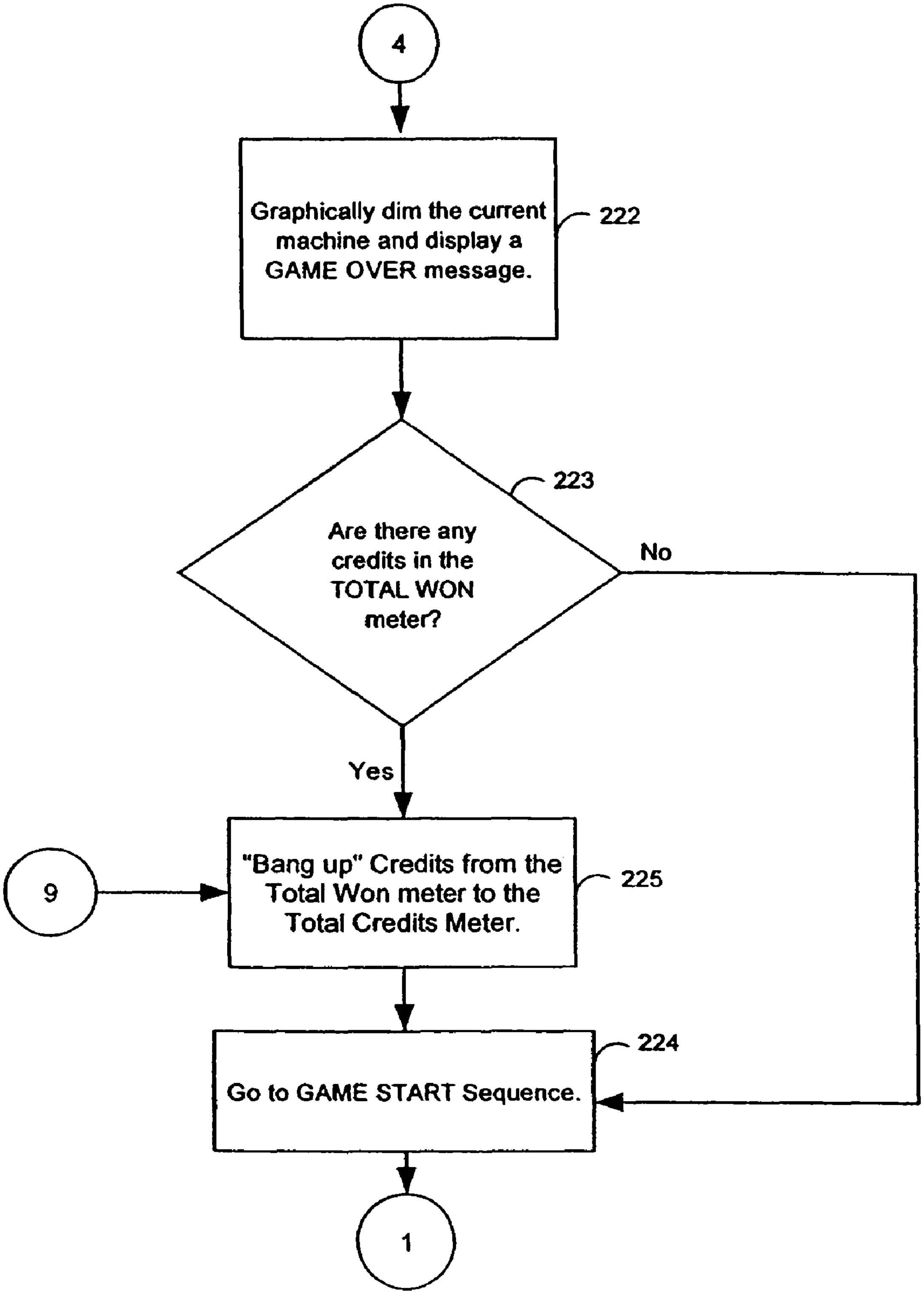

FIG. 10E depicts the "Game Over" sequence out of either step 176*a* or 176*b*. If out of step 176*a*, the program "dims" the game display with a "GAME OVER" message (step 222). An assessment is made as to whether there are any credits in the "Total Won" meter 36 at step 223. If not, the player is returned to the start up sequence step 150 from step 224.

If there are credits won, then the "Total Won" credits are added to the "Total Credits" meter 37, accompanied by a bang, knocker or other exciting sound, as indicated at step 225. If the "Game Over" sequence is engaged out of step 176*b*, then the program cycles through step 225 then 224, and returns to step 150.

Analysis of Certain Architecture of the Triple-Strike Slots Game

The multi-stage slot machine gaming machine embodiment being described has, as a base component, a single slot machine which is then adapted for a plurality of stages. The first step in the construction of the single machine of the game is to select the paying combinations for the stage, and then to lay out the symbols on the five reels in a manner to achieve the desired hit rate. The "hit rate" (percentage of games with at least one winning combination) in this embodiment is of importance, because getting a hit (or any win) is the criterion used to advance to the subsequent stage. In this first embodiment, it was decided to use the same machine at each stage with a doubling of the rewards for each successive level. If the "hit rate" for such a configuration was set at exactly 50%, then the expected return percentage would be the same for each level. If the "hit rate" was less than 50%, then the player would get a lower expected return at each successive level, which is not desirable in general. Moreover, certain gaming jurisdictions require that each additional coin bet on a game have the same or greater expected return than the previous coin.

If the "hit rate" is set at just over 50%, then each successive stage will have a slightly greater return than the previous stage, which is desirable to provide the player with an incentive to play more coins per game. While it is easy to mathematically determine that the "hit rate" of any payline will be 18.64% in the described first embodiment, a more thorough analysis is needed to determine the "hit rate" when five lines are played. This is due to multiple winners on different lines on certain spins. While the single line "hit rate" may be mathematically determined using the quantities of each symbol on each reel, the five-line "hit rate" requires knowledge of the actual layout of each reel strip to take into account which pays will occur.

The first embodiment described above uses reel strips with thirty stop positions laid out as shown in Table 1.

24,300,000 combinations of the five reels result in a win, providing a 51.73% "hit rate."

Table 2 shows the number of times each symbol appears on each of the five reels. This frequency data is used in combination with Table 3 to determine the payout percentage.

TABLE 2

| Symbol | Reel 1 | Reel 2 | Reel 3 | Reel 4 | Reel 5 |
|---|---|---|---|---|---|
| WILD | 1 | 1 | 1 | 1 | 1 |
| 7's | 3 | 4 | 2 | 1 | 2 |
| Apple | 2 | 1 | 5 | 2 | 2 |
| Banana | 5 | 1 | 5 | 4 | 4 |
| Pineapple | 3 | 2 | 6 | 4 | 4 |
| Pumpkin | 2 | 4 | 2 | 5 | 4 |
| Dart Board | 2 | 6 | 1 | 6 | 5 |
| Cow | 4 | 6 | 2 | 4 | 4 |
| Bonus (Drum) | 3 | 5 | 4 | 3 | 2 |
| Scatter (Dice) | 5 | 0 | 2 | 0 | 2 |
| | 30 | 30 | 30 | 30 | 30 |

TABLE 1

| Reel Stop # | Reel 1 | Reel 2 | Reel 3 | Reel 4 | Reel 5 |
|---|---|---|---|---|---|
| 1 | Scatter (Dice) | Pumpkin | Pumpkin | Cow | Dart Board |
| 2 | Dart Board | Cow | Pineapple | Pineapple | Cow |
| 3 | Wild | Wild | Wild | Wild | Wild |
| 4 | Cow | Dart Board | Banana | Dart Board | Banana |
| 5 | Banana | Bonus (Drum) | Cow | Pumpkin | Dart Board |
| 6 | 7's | Cow | Pineapple | Apple | Pineapple |
| 7 | Pumpkin | 7's | 7's | Dart Board | Bonus (Drum) |
| 8 | Apple | Bonus (Drum) | Apple | Bonus (Drum) | Apple |
| 9 | Scatter (Dice) | Dart Board | Banana | Banana | Cow |
| 10 | Cow | Banana | Pineapple | Pumpkin | Banana |
| 11 | Banana | Cow | Cow | Cow | Pumpkin |
| 12 | Bonus (Drum) | 7's | Apple | Dart Board | Cow |
| 13 | 7's | Dart Board | Dart Board | Pineapple | 7's |
| 14 | Pineapple | Pineapple | Banana | Pumpkin | Scatter (Dice) |
| 15 | Scatter (Dice) | Bonus (Drum) | Scatter (Dice) | Bonus (Drum) | Pineapple |
| 16 | Apple | 7's | Pumpkin | Banana | Cow |
| 17 | Dart Board | Cow | 7's | Dart Board | 7's |
| 18 | Bonus (Drum) | Pumpkin | Scatter (Dice) | Apple | Pumpkin |
| 19 | Banana | Dart Board | Pineapple | Cow | Dart Board |
| 20 | Pumpkin | Apple | Apple | Banana | Pineapple |
| 21 | Scatter (Dice) | Bonus (Drum) | Bonus (Drum) | Dart Board | Bonus (Drum) |
| 22 | Banana | Pumpkin | Banana | Pineapple | Banana |
| 23 | Cow | Cow | Apple | Bonus (Drum) | Dart Board |
| 24 | Bonus (Drum) | 7's | Bonus (Drum) | 7's | Pumpkin |
| 25 | Pineapple | Dart Board | Pineapple | Dart Board | Apple |
| 26 | Banana | Pumpkin | Banana | Pumpkin | Dart Board |
| 27 | Scatter (Dice) | Bonus (Drum) | Bonus (Drum) | Pineapple | Pineapple |
| 28 | 7's | Cow | Apple | Cow | Scatter (Dice) |
| 29 | Cow | Pineapple | Pineapple | Banana | Banana |
| 30 | Pineapple | Dart Board | Bonus (Drum) | Pumpkin | Pumpkin |

With thirty stops on each of five reels, there are a total of $30^5$ or 24,300,000 possible combinations. To determine the "hit rate" for this set of reel strips, a computer analysis well known to the art is used to evaluate each of the 24,300,000 combinations of the five reels. For each combination, the symbols are analyzed across each of the five paylines in comparison with the paytables and rules shown in FIG. 4 and FIG. 5. For each of the 24,300,000 combinations, if one or more of the paylines has a winning combination or if a scatter pay is present, then a hit counter is incremented. The analysis shows that for the reel strips of Table 1 with the paytable information provided in FIG. 4 and FIG. 5, 12,569,760 of the Table 3 shows a table of the available "pays" along with the necessary information to determine the payout percentage of the game. To provide the correct analysis, it should be clear that all "pays," except the "Scatter" pay of three "Scattered Dice" symbols, will only pay left to right. That is, the indicated combination must be shown on successive reels starting with Reel 1 (see FIG. 1). The "WILD" symbol may substitute for any symbol except the "Bonus (Drum)" symbol and the "Scatter (Dice)" symbol. The "Scatter" pay will pay for three dice symbols anywhere in the fifteen symbol visible display area. The "Scatter" pay will pay all paylines in addition to the highest pay on each line. On each payline, only the highest combination is paid. For the purposes of the math table of Table 3, if there are two ways to make the same highest pay value, then the combination using more symbols is used (e.g. "WILD-WILD-WILD-Banana-Any" is counted as four bananas instead of three "WILDs", both of which pay 50 coins).

The "Occurrences" column of Table 3 is created using the Table 2 frequency data and enumerating each way to create that combination. Some examples are shown for clarity:

5 "WILD" 1×1×1×1×1=1

One "Wild" symbol on each reel results in one Occurrence of five "WILD."

4 "WILD" 1×1×1×1×(2+2)=4

One "WILD" symbol on each of the first four reels and either a Drum or a Dice symbol on the fifth reel (any other symbol will result in five of that symbol instead of four wild).

3"WILD" 1×1×1×3×30=90

One "WILD" symbol on each of the first three reels and a Drum on the fourth reel and any symbol on the fifth reel (any other symbol but a Drum on the fourth reel results in four or five of that symbol).

5 "7's" ((1+3)×(1+4)×(1+2)×(1+1)×(1+2))−1=359

Either a "WILD" or "7" on each reel, not counting the number of ways (one) to have five "WILDs."

4 "7's" ((1+3)×(1+4)×(1+2)×(1+1)×(30−1−2))−(1×1×1×1×(30−1−2))=3213

The first component is the number of combinations with either a "WILD" or a "7" on each of the first four reels with any symbol except "WILD" or "7" on the fifth reel. This component includes combinations that have four "WILDs" which either pay as four "WILDs" or five of some other symbol, which need to be subtracted off. The second component is the number of combinations that have four "WILDs" on the first four reels that were part of the first component.

3 Bananas ((1+5)×(1+1)×(1+5)×(30−1−4)×30)−((1×1×1×(30−1−4)×30))=53250

The first component is the number of combinations with either a "WILD" or banana on each of the first three reels, with any symbol except a "WILD" or banana on the fourth reel and any symbol on the fifth reel. This component includes combinations that begin with three "WILDs," which will pay as three "WILDs" or, four of some other symbol or five of some other symbol. The combinations with three "WILDs" are subtracted off in the second component which includes the number of combinations that contain "WILD" on the first three reels, any symbol but "WILD" or Banana on the fourth reel, and any symbol on the fifth reel.

3 Scattered Dice (5×3)×30×(2×3)×30×(2×3)=486,000

Each of the five Dice on the first reel qualifies for the "Scatter" pay in any of three positions (upper position, center position and lower position). This is multiplied by the thirty stops representing any position on the second reel, multiplied by the two Dice times three positions on the third reel, multiplied by the thirty stops of the fourth reel, multiplied by the two Dice times three positions on the fifth reel.

All other counts in the "Occurrences" column are calculated in a similar manner.

The "Probability" column for each row of Table 3 is computed by dividing the "Occurrences" in that row by the total number of combinations which is 24,300,000.

The EV or "Expected Value" for each row is computed by multiplying the "Pay" amount times the "Probability" for that row. The return from a single stage of this machine is computed by taking the sum of all EV entries, which is 0.906239712, or a 90.62% return. The payout percentage can be modified by modifying the Column 2 "Pay" values and the corresponding paytable, as is well known in the art. The payout percentage may also be modified by changing the symbol frequencies shown in Table 2, and corresponding reel strips of Table 1. Care must be taken to keep the "hit rate" at the desired level while changing the payout percentage. This is also well known in the art, and is often the preferred method used to alter payout percentage, because when this method is used, the player cannot tell from the paytable which machine has a higher return, or for that matter know for sure that machines are set at different payout percentages.

TABLE 3

| Pay Symbols | Pay | Occurrences | Probability | EV |
|---|---|---|---|---|
| 5 WILD | 7500 | 1 | 4.11523E−08 | 0.000308642 |
| 4 WILD | 200 | 4 | 1.64609E−07 | 3.29218E−05 |
| 3 WILD | 50 | 90 | 3.7037E−06 | 0.000185185 |
| 2 WILD | 5 | 5,400 | 0.000222222 | 0.001111111 |
| 1 WILD | 2 | 529,200 | 0.021777778 | 0.043555556 |
| 5 7's | 1000 | 359 | 1.47737E−05 | 0.014773663 |
| 4 7's | 100 | 3,213 | 0.000132222 | 0.013222222 |
| 3 7's | 25 | 49,560 | 0.002039506 | 0.050987654 |
| 2 7's | 2 | 461,700 | 0.019 | 0.038 |
| 1 7's | 1 | 2,025,000 | 0.083333333 | 0.083333333 |
| 5 Apples | 500 | 323 | 1.32922E−05 | 0.006646091 |
| 4 Apples | 75 | 2,889 | 0.000118889 | 0.008916667 |
| 3 Apples | 15 | 28,350 | 0.001166667 | 0.0175 |
| 2 Apples | 2 | 108,000 | 0.004444444 | 0.008888889 |
| 5 Bananas | 300 | 1,799 | 7.40329E−05 | 0.022209877 |
| 4 Bananas | 50 | 8,975 | 0.000369342 | 0.018467078 |
| 3 Bananas | 10 | 53,250 | 0.002191358 | 0.02191358 |
| 2 Bananas | 2 | 237,600 | 0.009777778 | 0.019555556 |
| 5 Pineapples | 250 | 2,099 | 8.63786E−05 | 0.02159465 |
| 4 Pineapples | 50 | 10,475 | 0.00043107 | 0.021553498 |
| 3 Pineapples | 10 | 62,250 | 0.002561728 | 0.025617284 |
| 2 Pineapples | 2 | 227,700 | 0.00937037 | 0.018740741 |
| 5 Pumpkins | 200 | 1,349 | 5.55144E−05 | 0.011102881 |
| 4 Pumpkins | 50 | 6,725 | 0.000276749 | 0.013837449 |
| 3 Pumpkins | 10 | 31,680 | 0.001303704 | 0.013037037 |
| 5 Dart Boards | 200 | 1,763 | 7.25514E−05 | 0.014510288 |
| 4 Dart Boards | 50 | 7,032 | 0.000289383 | 0.014469136 |
| 3 Dart Boards | 10 | 28,290 | 0.001164198 | 0.011641975 |
| 5 Cows | 200 | 2,624 | 0.000107984 | 0.021596708 |
| 4 Cows | 50 | 13,100 | 0.000539095 | 0.026954733 |
| 3 Cows | 5 | 78,000 | 0.003209877 | 0.016049383 |
| 5 Bonus (Drum) | 1000 | 360 | 1.48148E−05 | 0.014814815 |
| 4 Bonus (Drum) | 150 | 5,040 | 0.000207407 | 0.031111111 |
| 3 Bonus (Drum) | 50 | 48,600 | 0.002 | 0.1 |
| 3 Scatter (Dice) | 8 | 486,000 | 0.02 | 0.16 |
| Losing Spin | | 19,771,200 | 0.81362963 | |
| | | 24,300,000 | 1 | 0.906239712 |

Building now upon the single stage machine so described, Table 4 shows how the return for the multi-stage version of the game is computed. The first column shows the "Stage" for which the return is being computed. The second column shows the probability of a hit on the specified stage. In this first embodiment, this is the "hit rate" of a single stage of the machine, which is the criterion for moving up to the next stage. The third column shows the probability of playing the specified stage (as opposed to losing all bets on that stage without play). This is "1" for the first stage (the first stage is always played), and for the other stages is computed by multiplying the probability of playing the previous stage (third column, one line above) times the probability of a hit on the previous stage (second column, one line above). For Stage 2, this is 1×0.51727=0.51727. For the third stage this is 0.51727×0.51727=0.26757.

The fourth column shows the multiplier for all "pays" on the specified stage. This multiplier provides a reward that more than offsets the losses for the times that the stage is not played. The fifth column shows the EV for the machine on the specified stage, which is the same for each identical machine in this embodiment. The sixth column shows the overall EV of the specified stage, and is computed by multiplying the third through fifth columns together. This is because the EV of a stage (fifth column) has to be scaled up by the payoff multiplier (fourth column) and reduced by taking into account the probability of playing that stage (third column). The seventh column shows the cumulative EV when one, two or three stages are played. This is the average of the sixth column of the specified level and all levels above it. When only one stage is played the cumulative EV is the same as the EV of that stage. When two stages are played, the cumulative EV is the average of the EV of the first stage and the second stage. When all three stages are played, the cumulative EV is the average of the EV of the first stage, second stage and third stage. This results in an overall expected return of 93.79% when all three stages (fifteen lines) are played.

TABLE 4

| Stage | Probability of hit on this stage | Probability of Playing This Stage | Multiplier For Pays on this Stage | EV of Machine | EV of This Stage | Cumulative EV of All Stages up to this Level |
|---|---|---|---|---|---|---|
| 1 | 0.517274074 | 1 | 1 | 0.906239712 | 0.906239712 | 0.90624 |
| 2 | 0.517274074 | 0.517274074 | 2 | 0.906239712 | 0.937548616 | 0.921894 |
| 3 | 0.517274074 | 0.267572468 | 4 | 0.906239712 | 0.969939184 | 0.937909 |

A Variation on Triple-Strike Slots

In a modification to the first embodiment above, a fourth stage is added allowing the player to wager on one to twenty lines. Instead of offering a fixed 8× multiplier on the fourth stage, however, after any win on the fourth stage the multiplier is randomly selected from a range of 4× to 50×, with weighted frequencies selected such that the overall value of the multiplier is about 8×. Each time that a spin on the fourth stage results in any win, the game goes through a selection process that presents a multiplier of 4× to 50× to the player. One method of presentation is to select the multiplier and show it on the screen to the player. Table 5 shows a table of weighted entries that are used for this purpose. After a win on the fourth stage of this game, the machine uses its RNG (random number generator) to select an integer from 1 to 29. This number is "looked up" in the second column of Table 5 (titled "Values"), and the corresponding value in the first column (titled "Multiplier") is used as the stage multiplier for that spin. The third through fifth columns of Table 5 are used to determine the EV of the fourth stage multiplier in the same manner used in Table 3.

TABLE 5

| Multiplier | Values | Occurrences | Probability | EV |
|---|---|---|---|---|
| 50 | 1 | 1 | 0.03448276 | 1.724138 |
| 25 | 2 | 1 | 0.03448276 | 0.862069 |
| 10 | 3-5 | 3 | 0.10344828 | 1.034483 |
| 8 | 6-7 | 2 | 0.06896552 | 0.551724 |
| 6 | 8-12 | 5 | 0.17241379 | 1.034483 |
| 5 | 13-25 | 13 | 0.44827586 | 2.241379 |
| 4 | 26-29 | 4 | 0.13793103 | 0.551724 |
| | | 29 | 1 | 8 |

Table 6 is a modified version of Table 4, with the fourth stage added showing the overall payout percentage of this modified game is 95.43% with all twenty lines played. Also note that the payout percentage on the fourth stage is 100.34%. A bet on this particular stage has a positive expectation for the player. This bet (on lines sixteen through twenty) is only allowed in conjunction with the negative-expectation bets (i.e., less than 100%) on the first fifteen lines, thus resulting in an overall negative expectation of a 95.43% return.

TABLE 6

| Stage | Probability of hit on this stage | Probability of Playing This Stage | Multiplier For Pays on this Stage | EV of Machine | EV of This Stage | EV of All Stages up to this Level |
|---|---|---|---|---|---|---|
| 1 | 0.517274074 | 1 | 1 | 0.906239712 | 0.906239712 | 0.906239712 |
| 2 | 0.517274074 | 0.517274074 | 2 | 0.906239712 | 0.937548616 | 0.921894164 |
| 3 | 0.517274074 | 0.267572468 | 4 | 0.906239712 | 0.969939184 | 0.937909171 |
| 4 | 0.517274074 | 0.1384083 | 8 | 0.906239712 | 1.003448787 | 0.954294075 |

Figure 11:
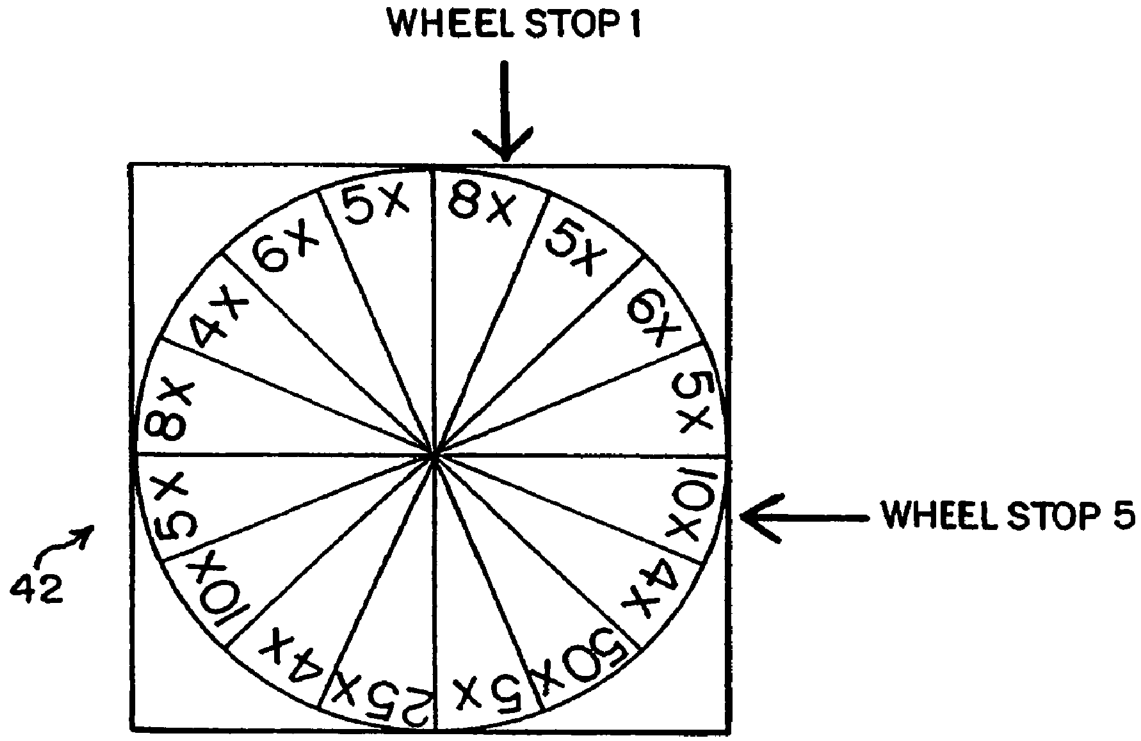
FIG. 11 is a representation highlighting a bonus multiplier wheel for use in a video slot machine embodiment of the present invention.

To add even more excitement to the presentation of the foregoing fourth stage, another variation of this four stage game adds a mechanical wheel for selection of the multiplier for wins on the fourth stage. Adams, U.S. Pat. No. 5,823,874 and U.S. Pat. No. 5,848,932, and Telnaes, U.S. Pat. No. 4,448,419, may be referred to for detail on such bonus sequences and indicia. The wheel 42 shown in FIG. 11 has sixteen sections, although any number of visible sections may be used. Table 7 uses the same multiplier values as shown in Table 5, but allocates these values to the sixteen sections of the mechanical wheel of FIG. 11.

Figure 12A:
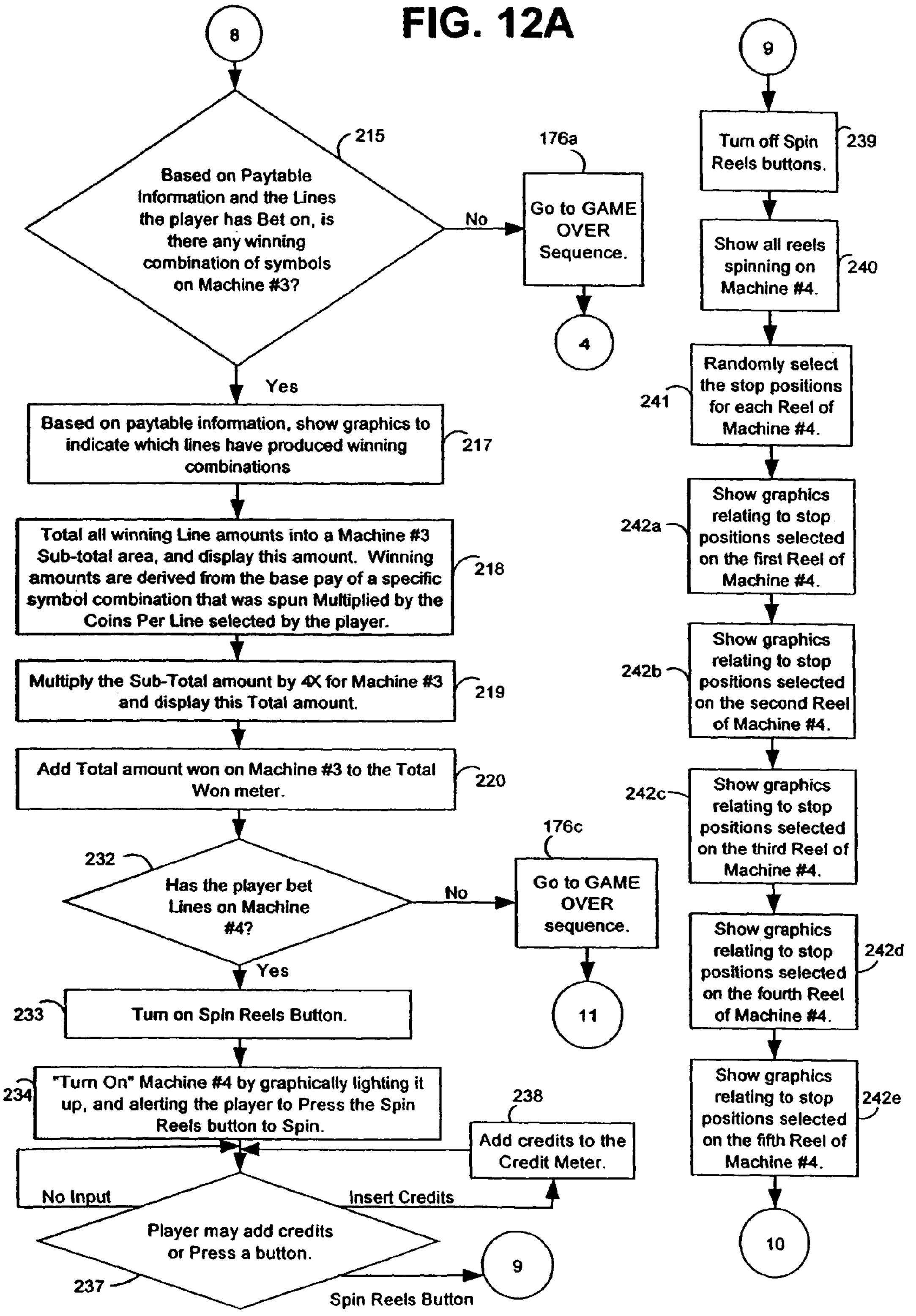
FIGS. 12*a*-12*c* present flow charts of a method of operating a video slot machine gaming machine embodiment of the present invention using the bonus multiplier wheel of FIG. 11.
Figure 12B:
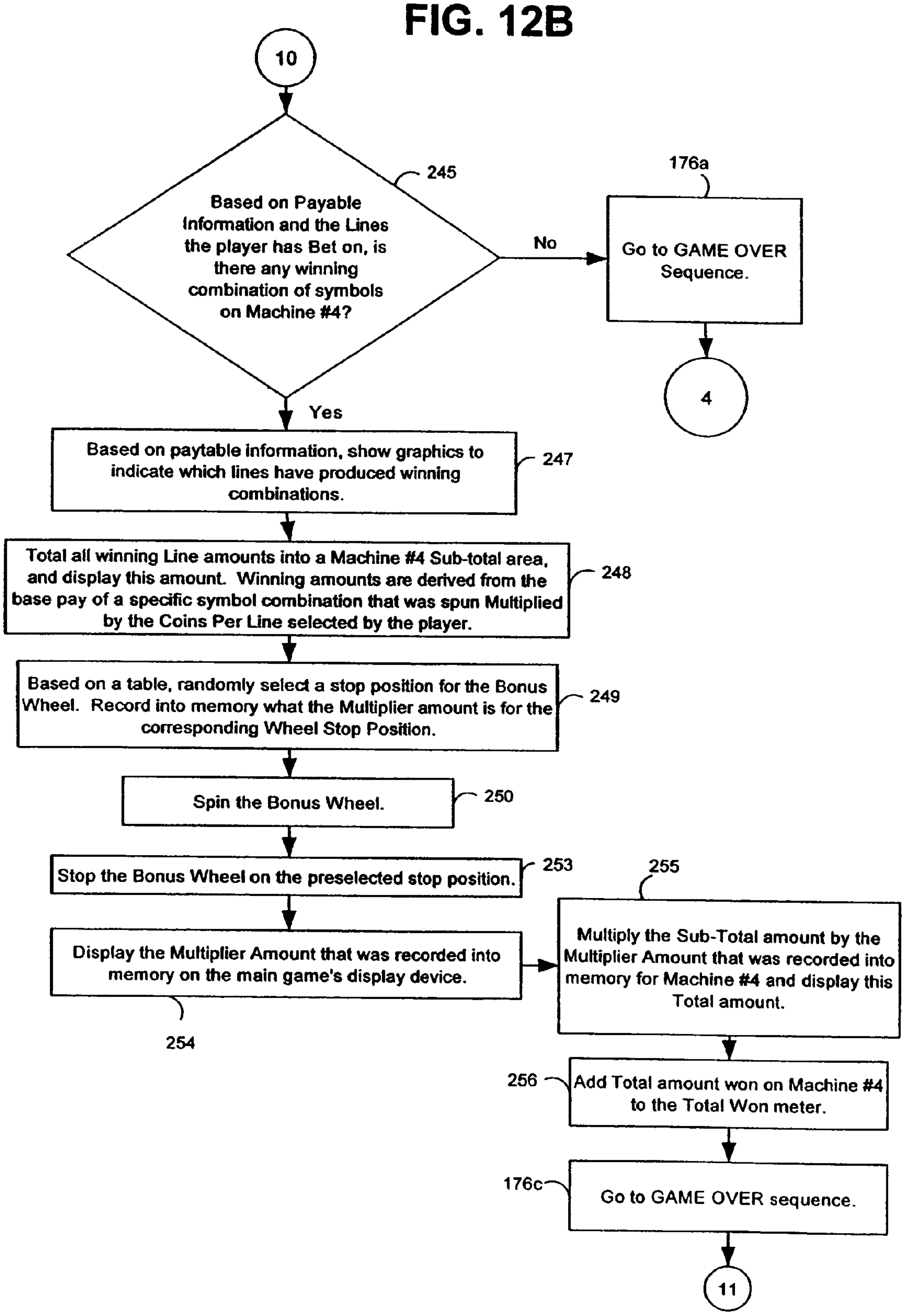
Figure 12C:
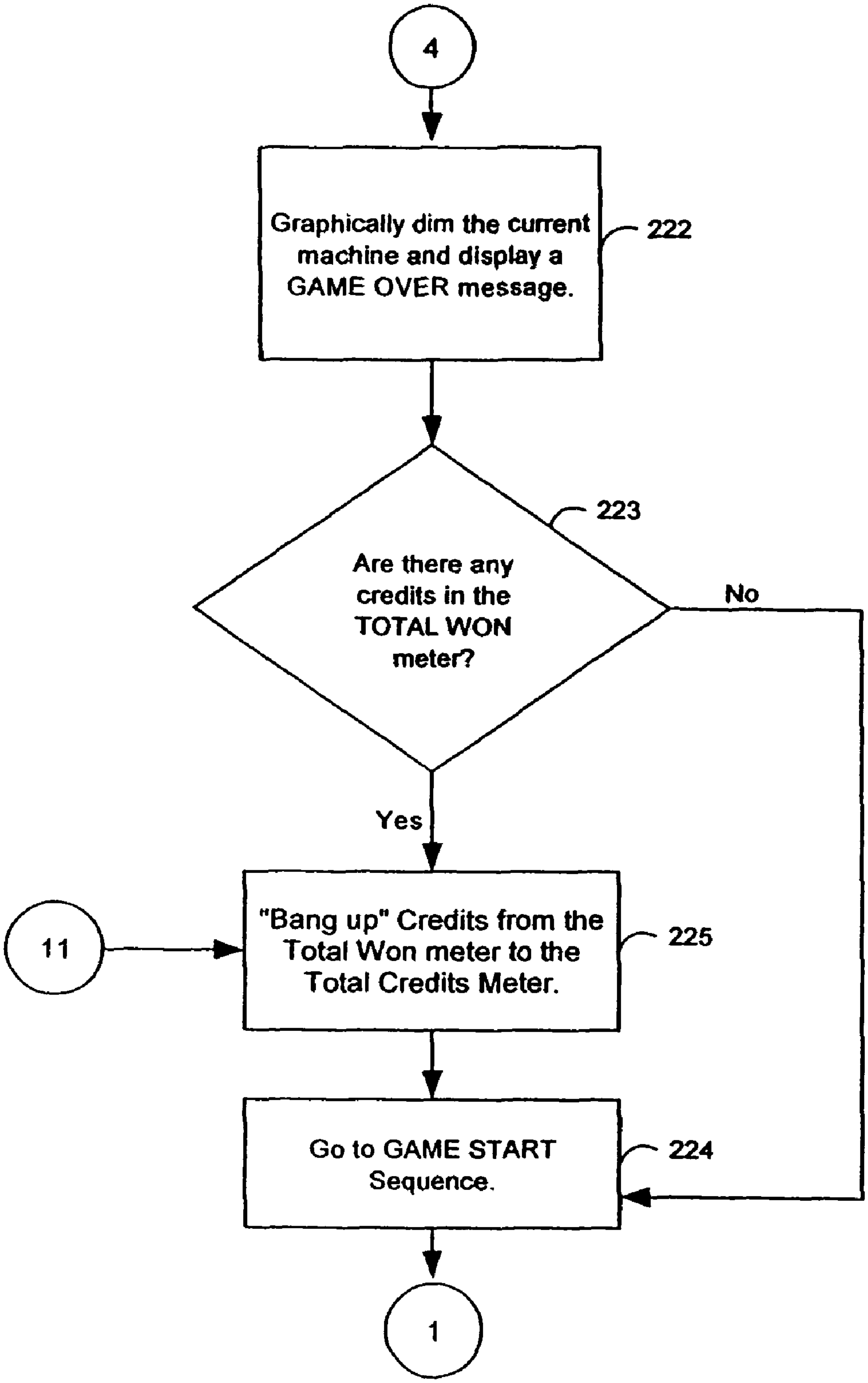

The above-described embodiment of a gaming slot machine having four stages and a random number multiplier on the fourth stage is operationally summarized in the flow charts of FIGS. 12A-12C. The program for this Multi-Strike Slots variation embodiment is substantially the same as that previously described with respect to FIGS. 10A through 10E. Accordingly, and keeping with the same convention used throughout this application, like numbers are used to describe like steps. The changes made to the previously-described program will therefore only be discussed as to this version.

Turning first to FIG. 12A, Multi-Strike Slots follows the same programming as set forth in the flow charts of FIGS. 10A through 10C for Triple-Strike Slots, and up through step 220. Step 232 begins a sequence for a fourth stage/level/machine, with steps 233, 234, 237 and 238 corresponding to steps 183, 184, 187 and 188, respectively, except as now related to a fourth machine. Note that in the event of no bet on the fourth machine (step 232), a "Game Over" sequence is then engaged at step 176*c*.

As in the other levels, the "Spin Reels" button is once more deactivated (step 239), and steps 240, 241 and 242*a* through 242*e* repeat steps 169, 170 and 171*a* through 171*e*, respectively, this time for the fourth machine. Turning to FIG. 12B, steps 245, 247 and 248 then repeat the process for the fourth machine described in steps 175, 177 and 178, respectively, with regard to the first machine 18.

Step 249 will now initiate a sequence for a multiplier to be applied to the fourth level in this version. First, a number is randomly selected from a table provided for the fourth level multiplier at step 249. The bonus wheel 42 (FIG. 11) may then be graphically "spun" at step 250, and stopped on the previously selected number from step 249, as indicated at step 253. A mechanical wheel of the type disclosed in U.S. Pat. Nos. 5,823,874 and 5,848,932 can likewise be advantageously employed. This multiplier factor is then displayed (step 254), and the "Sub-Total" amount for the fourth level is then increased by this factor and displayed as a "Total" for the fourth machine (step 255), with the latter sum then added to the "Total Won" meter 36 amount for display, as shown in step 256. The game then proceeds from step 256 to "Game Over" sequence 176*c*. The "Game Over" sequence shown at FIG. 12C for this version is the same as that previously described, except for reflecting the path from point 11 (rather than from point 9 in the previous version).

TABLE 7

| Wheel Stop | Multiplier | Values | Occurrences | Probability | EV |
|---|---|---|---|---|---|
| 1 | 8 | 1 | 1 | 0.034482759 | 0.275862069 |
| 2 | 5 | 2-3 | 2 | 0.068965517 | 0.344827586 |
| 3 | 6 | 4-6 | 3 | 0.103448276 | 0.620689655 |
| 4 | 5 | 7-9 | 3 | 0.103448276 | 0.517241379 |
| 5 | 10 | 10-11 | 2 | 0.068965517 | 0.689655172 |
| 6 | 4 | 12-13 | 2 | 0.068965517 | 0.275862069 |
| 7 | 50 | 14 | 1 | 0.034482759 | 1.724137931 |
| 8 | 5 | 15-17 | 3 | 0.103448276 | 0.517241379 |
| 9 | 25 | 18 | 1 | 0.034482759 | 0.862068966 |
| 10 | 4 | 19 | 1 | 0.034482759 | 0.137931034 |
| 11 | 10 | 20 | 1 | 0.034482759 | 0.344827586 |
| 12 | 5 | 21-23 | 3 | 0.103448276 | 0.517241379 |
| 13 | 8 | 24 | 1 | 0.034482759 | 0.275862069 |
| 14 | 4 | 25 | 1 | 0.034482759 | 0.137931034 |
| 15 | 6 | 26-27 | 2 | 0.068965517 | 0.413793103 |
| 16 | 5 | 28-29 | 2 | 0.068965517 | 0.344827586 |
| | | | 29 | 1 | 8 |

Triple-Like Stud Poker

Another embodiment uses this multi-stage game technique for the play of video poker. This second embodiment adapts a Five-Card Stud game with hit rates under 50% and over 50%. The invention may also be used to adapt many other poker games, including Five-Card Draw poker, Double Down Stud poker (see e.g., U.S. Pat. Nos. 5,100,137 and 5,167,413) and Big Split poker (disclosed by the inventors herein in a pending U.S. patent application) among others.

In this second embodiment, there are three stages of Five-Card Stud poker. This game pays on any hand that is one pair or better. It will be seen that about 49.88% of hands in Five-Card Stud poker rank as one pair or higher. For this game with a "hit rate" under 50%, it would be undesirable to use 2× and 4× multipliers on the second and third stages respectively, since this would make the return of these stages lower than the first stage. This means that a player wagering more money would get a lower expected return, which is undesirable to the proprietor of the game who wants to encourage as high a wager as possible, but may also run afoul of regulations in certain gaming jurisdictions, which require equal or higher return for each coin wagered on a single game. There are many ways that the game may be modified to cause the higher stages to have a higher payout, of which two will be shown here.

Figure 13:
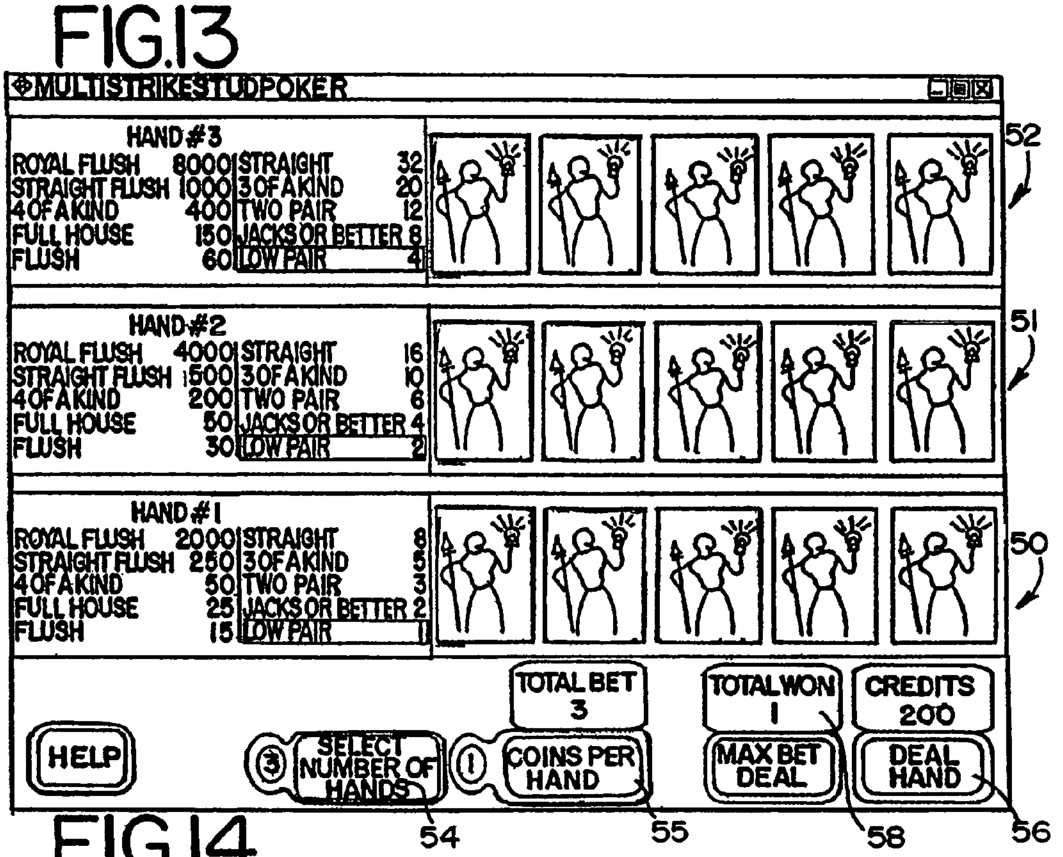
FIG. 13 is a video screen representation highlighting a multi-stage poker gaming machine embodiment of the present invention.

In the first version of this poker embodiment, a separate paytable is used for each stage of the game, as shown in FIG. 13. In FIG. 13, it is clear that the Hand #2 (51) paytable has all pays from the Hand #1 (50) paytable multiplied by 2×, except for the "4 of a Kind" which goes from 50 to 200, thus providing additional return that will more than offset the "hit rate" being under 50%. Likewise, the Hand #3 (52) paytable has all pays from the Hand #2 paytable multiplied by 2× except for the "Full House", which goes from 50 to 150, which again more than offsets the "hit rate" being under 50%. This will become clear in the analysis shown below, if not already evident.

Referring still to FIG. 13, the player uses the "Select Number of Hands" button 54 to select a bet on one to three hands (stages) 50, 51 and 52. The game may be configured with more or less stages (number of hands) without departing from the invention. The "Coins per Hand" button 55 is then used to wager from one to five coins per hand. This range of coins may be modified to any acceptable range, as is well known in the art. The "Deal Hand" button 56 will cause the game to deal out Hand #1 (50) from a standard fifty-two card deck of playing cards. While this game uses a standard deck of cards of rank and suit, other embodiments may use one or more "Jokers." Still other embodiments may use certain cards, such as Deuces, as wild cards. Even more broadly, while this second embodiment is a poker game, other card games or different games of chance will be readily adaptable to use with the overall inventive concept, as previously noted.

Figure 14:
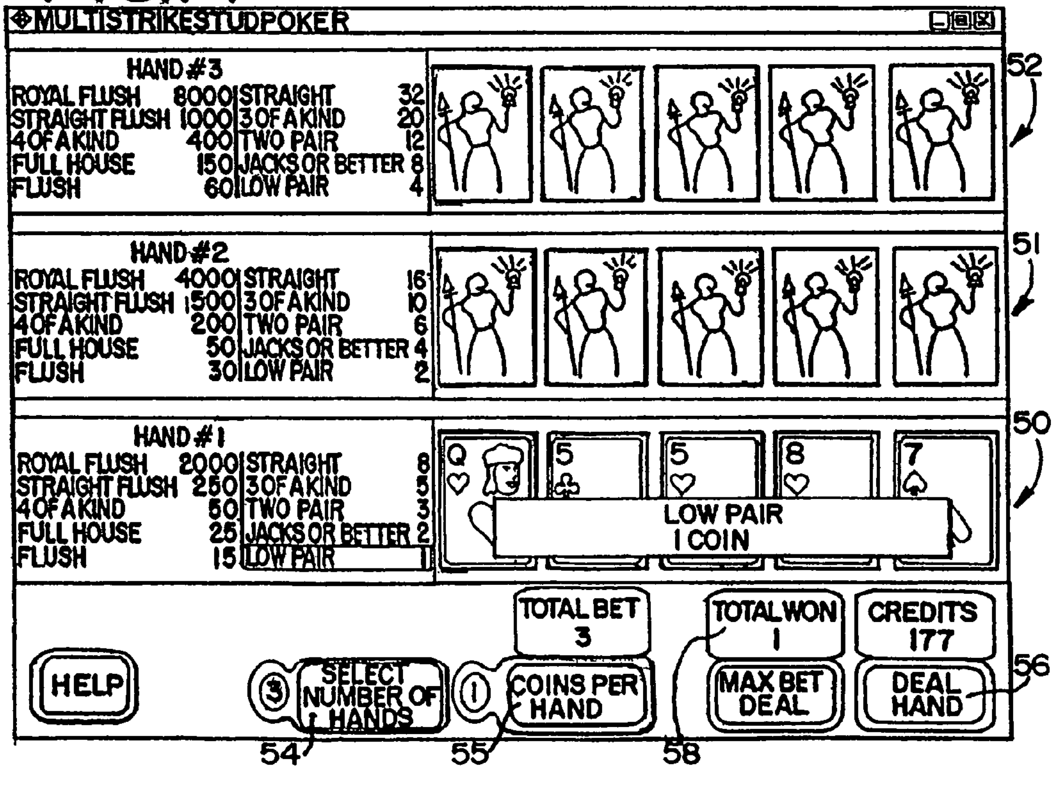
FIG. 14 is a video screen representation highlighting a first stage result on the poker machine embodiment of FIG. 13.

FIG. 14 shows the game screen after one coin was bet on three hands, and a first stage hand has been dealt. The hand shown contains a pair of 5's, which pays one coin for a "Low Pair" (highlighted on the Hand #1 (50) paytable). The one coin won is shown in the "Total Won" meter 58. As a result of achieving any win on Hand #1, Hand #2 (51) may now be played. If Hand #1 (50) was a loser (less than one pair), then the game would be over and the wagers on Hand #2 (51) and Hand #3 (52) would be lost without playing those stages.

Figure 15:
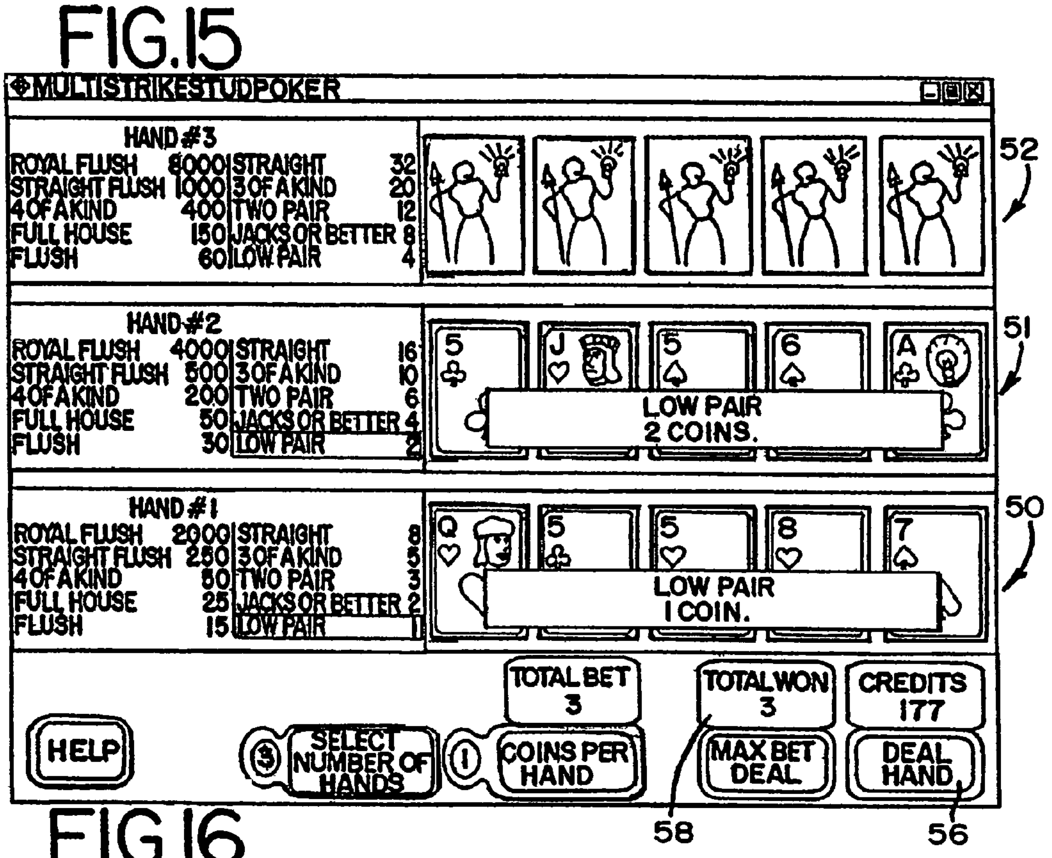
FIG. 15 is a video screen representation highlighting a second stage of the poker machine embodiment shown in FIG. 13.

Having won Hand #1 (50), however, the player presses the "Deal Hand" button 56 and a second hand is dealt as is shown in FIG. 15. In this hand 51, the player has received another pair of 5's, which now pays two coins as called out in the Hand #2 (51) paytable. The "Total Won" meter 58 is updated to three (one coin from Hand #1 plus two coins from Hand #2). As a result of a win on Hand #2, Hand #3 (52) may now be played. If Hand #2 (51) had been a loser (less than one pair), then the game would be over and the wager on Hand #3 lost.

Figure 16:
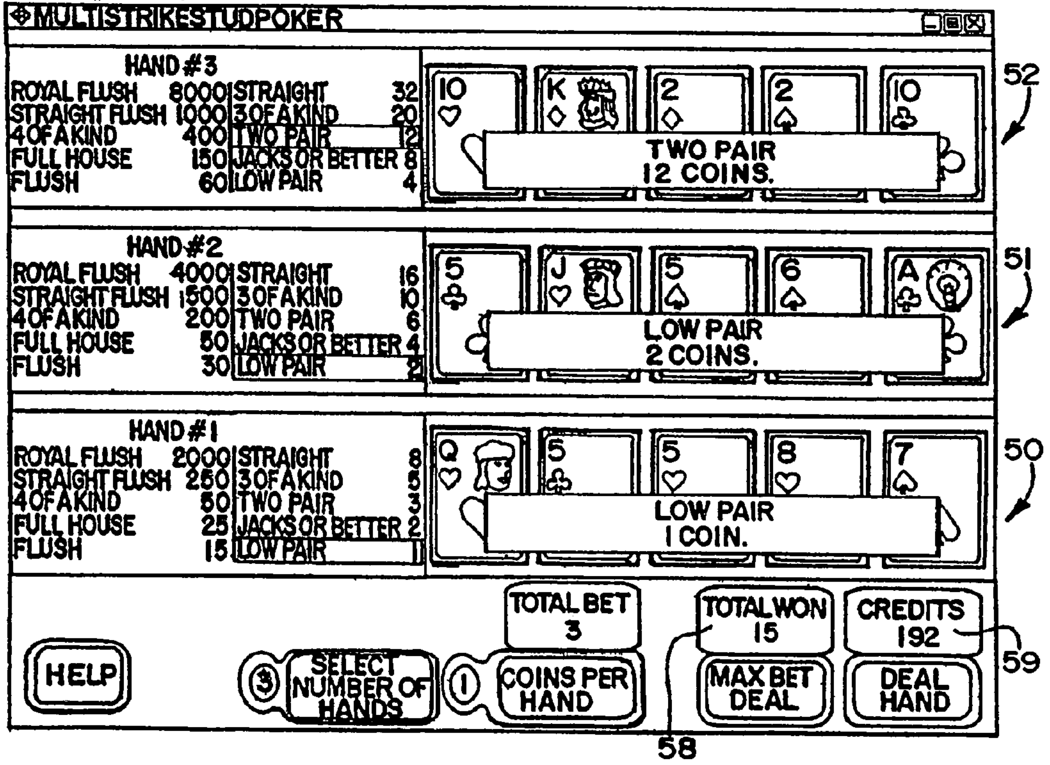
FIG. 16 is a video screen representation highlighting a third stage of the poker machine embodiment of FIG. 13.

The player once again presses the "Deal Hand" button 56 after success at stage two, and a third hand (52) is dealt as is shown in FIG. 16. This hand has a pair of tens and a pair of deuces for "Two Pair." The paytable shows that two pair pays twelve coins when achieved on Hand #3 (as opposed to six coins on hand #2 or three coins on hand #1). The "Total Won" meter 58 is updated to "15," and the game is over since all hands wagered on have been played. The total win of fifteen credits is added to the "Credits" meter 59, advancing the meter from "177" to "192" (from an arbitrary start of "180").

Analysis of Triple-Strike Stud Poker Game

Table 8 shows how the calculation of certain architecture of the payout percentage (expected return) of the first stage of this second embodiment is computed. This table is for a one coin bet. It is well known in the art how to expand this for a higher number of coins bet per hand, and for the inclusion of bonuses for a higher number of coins.

those skilled in the art, and may be derived by analyzing each of the 2,598,960 hands with a computer program, also well known. The fourth column shows the probability of playing Hand #1 when a bet is placed on this hand. For Hand #1 this probability is 1.0, since the first hand will always be played when it is bet on. The fifth column shows the probability of receiving the hand called out in the first column. This is computed by dividing the "Occurrences" (third column) by the 2,598,960 total number of possible hands.

The sixth column is the product of the fourth and fifth columns, which is the probability of getting a particular hand on this stage (for the first stage it is the same as the fifth column since the first stage is always played). The seventh column is the expected value contribution EV, which is the product of the second column pay and the sixth column probability of achieving the given hand on the current stage. The sum of all EV contributions provides the expected return of 0.916288 or 91.63%. This expected return may be modified by making modifications to the "Pay" values in the second column of Table 8, as is well known in the art.

TABLE 8

| | Pay | Occurrences | Probability of Playing This Stage | Probability of This Hand | Probability of This Hand on This Stage | EV |
|---|---|---|---|---|---|---|
| ROYAL FLUSH | 2000 | 4 | 1 | 1.5391E−06 | 1.53908E−06 | 0.003078 |
| STRAIGHT FLUSH | 250 | 36 | 1 | 1.3852E−05 | 1.38517E−05 | 0.003463 |
| FOUR OF A KIND | 50 | 624 | 1 | 0.0002401 | 0.000240096 | 0.012005 |
| FULL HOUSE | 25 | 3,744 | 1 | 0.00144058 | 0.001440576 | 0.036014 |
| FLUSH | 15 | 5,108 | 1 | 0.0019654 | 0.001965402 | 0.029481 |
| STRAIGHT | 8 | 10,200 | 1 | 0.00392465 | 0.003924647 | 0.031397 |
| THREE OF A KIND | 5 | 54,912 | 1 | 0.02112845 | 0.021128451 | 0.105642 |
| TWO PAIR | 3 | 123,552 | 1 | 0.04753902 | 0.047539016 | 0.142617 |
| JACKS OR BETTER | 2 | 337,920 | 1 | 0.13002124 | 0.130021239 | 0.260042 |
| LOW PAIR | 1 | 760,320 | 1 | 0.29254779 | 0.292547788 | 0.292548 |
| BUST | | 1,302,540 | 1 | 0.50117739 | 0.501177394 | 0 |
| | | 2,598,960 | | 1 | | 0.916288 |

The number of possible five card poker hands from a fifty-two card deck is known as "52 choose 5" and is computed with the following formula:

$$\frac{52!}{5!*(52-5)!} = 2{,}598{,}960$$

The first column of Table 8 shows the rank of all hands in this Five-Card Stud game. The second column shows the pay value for this ranking on Hand #1 (each hand 50, 51 and 52 having a separate paytable). The third column ("Occurrences") is the number of times a particular hand occurs in the 2,598,960 possible five card poker hands dealt from a standard deck. This "Occurrence" tabulation is well known to Table 9 shows a similar analysis for Hand #2 (51) (the second stage of this game). The second column now has the Hand #2 paytable showing all values doubled from the Hand #1 paytable with the Four of a Kind going from 50 to 200. The fourth column, "Probability of Playing This Stage" is the probability of getting any "hit" (one pair or higher) on the first stage. This is computed by adding up all of the fifth column values from Table 8 except for "Bust," or by subtracting the probability of a "Bust" (0.50117739) from 1.0, resulting in a first stage hit rate of 0.498822606 or 49.88%. The sum of the EV components on the second stage is 0.9261078, indicating a 92.61% expected return. This higher expected return than the first stage is a result of the 200 coin Four of a Kind value more than offsetting the "hit rate" which is slightly under 50%. This expected return may, again, be modified by making modifications to the "Pay" values.

TABLE 9

| | Pay | Occurrences | Probability of Playing This Stage | Probability of This Hand | Probability of This Hand on This Stage | EV |
|---|---|---|---|---|---|---|
| ROYAL FLUSH | 4000 | 4 | 0.498822606 | 1.5391E−06 | 7.67726E−07 | 0.003071 |
| STRAIGHT FLUSH | 500 | 36 | 0.498822606 | 1.3852E−05 | 6.90954E−06 | 0.003455 |
| FOUR OF A KIND | 200 | 624 | 0.498822606 | 0.0002401 | 0.000119765 | 0.023953 |

TABLE 9-continued

| | Pay | Occurrences | Probability of Playing This Stage | Probability of This Hand | Probability of This Hand on This Stage | EV |
|---|---|---|---|---|---|---|
| FULL HOUSE | 50 | 3,744 | 0.498822606 | 0.00144058 | 0.000718592 | 0.03593 |
| FLUSH | 30 | 5,108 | 0.498822606 | 0.0019654 | 0.000980387 | 0.029412 |
| STRAIGHT | 16 | 10,200 | 0.498822606 | 0.00392465 | 0.001957703 | 0.031323 |
| THREE OF A KIND | 10 | 54,912 | 0.498822606 | 0.02112845 | 0.010539349 | 0.105393 |
| TWO PAIR | 6 | 123,552 | 0.498822606 | 0.04753902 | 0.023713536 | 0.142281 |
| JACKS OR BETTER | 4 | 337,920 | 0.498822606 | 0.13002124 | 0.064857533 | 0.25943 |
| LOW PAIR | 2 | 760,320 | 0.498822606 | 0.29254779 | 0.14592945 | 0.291859 |
| BUST | | 1,302,540 | 0.498822606 | 0.50117739 | 0.249998614 | 0 |
| | | 2,598,960 | | 1 | | 0.926107 |

Table 10 shows a similar analysis for Hand #3 (52) (the third stage of this game). The second column now has the Hand #3 paytable showing all values doubled from the Hand #2 paytable with the Full House going from 50 to 150. The "Probability of Playing This Stage" is the probability of getting any "hit" (one pair or higher) on the first and second stages. This is the square of the 0.498822606 "hit rate" of the first stage since a "hit" is required on both the first and second stages in order to play the third stage. The fourth column value may also be computed by subtracting the probability of getting a "Bust" on the first stage (0.50117739) and the probability of getting a "Bust" on the second stage (0.249998614) from 1.0 (i.e., 1−0.50117739−0.249998614=0.248823992). The sum of the EV components on the third stage is 0.941849, indicating a 94.18% expected return. This higher expected return than the second stage likewise is a result of the 150 coin Full House value more than offsetting the second stage "hit rate" which is slightly under 50%. Once again, the expected return may be modified by making modifications to the "Pay" values.

TABLE 10

| | Pay | Occurrences | Probability of Playing This Stage | Probability of This Hand | Probability of This Hand on This Stage | EV |
|---|---|---|---|---|---|---|
| ROYAL FLUSH | 8000 | 4 | 0.248823992 | 1.5391E−06 | 3.82959E−07 | 0.003064 |
| STRAIGHT FLUSH | 1000 | 36 | 0.248823992 | 1.3852E−05 | 3.44663E−06 | 0.003447 |
| FOUR OF A KIND | 400 | 624 | 0.248823992 | 0.0002401 | 5.97417E−05 | 0.023897 |
| FULL HOUSE | 150 | 3,744 | 0.248823992 | 0.00144058 | 0.00035845 | 0.053767 |
| FLUSH | 60 | 5,108 | 0.248823992 | 0.0019654 | 0.000489039 | 0.029342 |
| STRAIGHT | 32 | 10,200 | 0.248823992 | 0.00392465 | 0.000976546 | 0.031249 |
| THREE OF A KIND | 20 | 54,912 | 0.248823992 | 0.02112845 | 0.005257266 | 0.105145 |
| TWO PAIR | 12 | 123,552 | 0.248823992 | 0.04753902 | 0.011828848 | 0.141946 |
| JACKS OR BETTER | 8 | 337,920 | 0.248823992 | 0.13002124 | 0.032352404 | 0.258819 |
| LOW PAIR | 4 | 760,320 | 0.248823992 | 0.29254779 | 0.072792909 | 0.291172 |
| BUST | | 1,302,540 | 0.248823992 | 0.50117739 | 0.12470496 | 0 |
| | | 2,598,960 | | 1 | | 0.941849 |

Table 11 shows the return of betting on one, two or three stages in this poker game of the second embodiment. For the "Stage" called out in the first column, the second column shows the EV for that stage taken from Tables 8, 9, and 10. The third column is the EV of an entire multi-stage game with a bet on the number of stages in the first column. This is the average of the selected second column level and all levels above (i.e., the average EV of all those stages in the multi-stage game). The expected return of the entire game when a player plays all three stages is 0.928081203 or 92.81%.

TABLE 11

| Stage | Total EV For Stage | EV of Game Playing this many stages |
|---|---|---|
| 1 | 0.91628805 | 0.916288054 |
| 2 | 0.92610692 | 0.921197488 |
| 3 | 0.94184863 | 0.928081203 |

A Variation on Triple-Strike Stud Poker

This modification of the Triple-Strike Stud poker game introduces a "Free Ride" feature. This feature is used to increase the "hit rate" of the basic game without making any other modifications to the game (such as which hands pay). This feature provides a greater flexibility in setting the "hit rate" than is available by simply setting which rank is the lowest pay. Using normal poker game construction techniques, one would typically have to include more paying hands to increase the "hit rate." In the game of the above second embodiment, the highest nonpaying hand to add would be "Ace High," which would add almost 20% to the hit rate as shown in Table 12. Paying on all hands that have an Ace (referred to as "Ace High") would bring the hit rate up from 49.88% to 69.23%, which is far beyond the goal of just over 50%. Another variance could require "Ace-King" high as the minimum hand, which would bring the hit rate to 56.32%, which is still a very large increase.

TABLE 12

| | Occurrences | Sum of Occurrences | Hit Rate at this rank |
|---|---|---|---|
| ROYAL FLUSH | 4 | 4 | 0.00% |
| STRAIGHT FLUSH | 36 | 40 | 0.00% |
| FOUR OF A KIND | 624 | 664 | 0.03% |
| FULL HOUSE | 3744 | 4408 | 0.17% |
| FLUSH | 5108 | 9516 | 0.37% |
| STRAIGHT | 10200 | 19716 | 0.76% |
| THREE OF A KIND | 54912 | 74628 | 2.87% |
| TWO PAIR | 123552 | 198180 | 7.63% |
| JACKS OR BETTER | 337920 | 536100 | 20.63% |
| LOW PAIR | 760320 | 1296420 | 49.88% |
| ACE-KING | 167280 | 1463700 | 56.32% |
| ACE HIGH | 335580 | 1799280 | 69.23% |
| BUST | 799680 | 2598960 | 100.00% |
| | 2,598,960 | | |

In this modified embodiment, a "Free Ride" feature is added to the game wherein in some of the hands, on a random basis, a "Free Ride" indicia will be displayed, advantageously with an accompanying sound. When the "Free Ride" is indicated, the hand will be dealt as usual and paid according to the paytable, but the game will automatically advance to the next hand that was wagered on, whether or not the player wins the current hand.

Using this feature, multiple stages of this game can be constructed with a natural hit rate under 50%, yet use the same paytable for all stages with multipliers for each stage.

Another advantage of the "Free Ride" feature is that it is not necessary to modify paytable values to increase the "hit rate." It is well known in the art that as additional "pays" are allowed to increase the "hit rate," other pay values or frequencies will need to be decreased to offset the amount paid out on the new values. The "Free Ride" introduces a method of raising the "hit rate" of a game without any other modification to the payout of the game through the use of "hits" that award no coins/credits. This is important for the purpose of adapting games with paytables that are already familiar to the players. It is also a valuable tool that gives the game designer more flexibility in the creation of a game.

Table 8 is still representative of the first stage of this "Free Ride" version. In this modified embodiment, the "Free Ride" is offered on sixteen of every one thousand hands (based on a random number for each hand), or 1.6% of the hands played. This will increase the "hit rate" of the stage. Using more than 1.6% "Free Rides" will provide a greater increase, while using less than 1.6% will provide a smaller increase in the "hit rate." Because the "Free Ride" offers no benefit when playing on the highest hand that has been wagered on (there being no "next hand" to advance to) it is not offered on the final hand.

Table 13 shows how the "hit rate" is determined for the first stage of Table 8 that includes a 1.6% "Free Ride." The first line shows the "hit rate" that is achieved for first stage hands, 0.4988. The second line shows the sixteen in one thousand probability of the "Free Ride" being offered. The third line shows the probability of losing on the first stage. This is the "Bust" probability taken from Table 8. The fourth line is the product of the second and third lines, showing the probability of getting a "Free Ride" on a "Busted" hand. This is the additional "hit rate" component, since winning hands that receive the Free Ride are already figured into the first line. The fifth line is the sum of the first and fourth lines and is the resulting "hit rate" for the first stage including the "Free Ride" feature which is 0.506841 or 50.68%.

TABLE 13

| | | |
|---|---|---|
| Hit Rate for Hands of First Stage | | 0.498823 |
| Free Ride Prob. | 0.016 | |
| First Stage Busts | 0.501177 | |
| Free Ride Hits | | 0.008019 |
| First Stage Hit Rate w/ Free Ride | | 0.506841 |

The second stage of the "Free Ride" variation is now represented by Table 14, which is similar to Table 9. The differences are in the "Pay" values, which are now exactly twice (2× multiplier) the "Pay" values from Table 8, and the fourth column "Probability of Playing This Stage", which is now the 0.506841 value, computed in Table 13.

TABLE 14

| | Pay | Occurrences | Probability of Playing This Stage | Probability of This Hand | Probability of This Hand on This Stage | EV |
|---|---|---|---|---|---|---|
| ROYAL FLUSH | 4000 | 4 | 0.506841444 | 1.5391E−06 | 7.80068E−07 | 0.00312 |
| STRAIGHT FLUSH | 500 | 36 | 0.506841444 | 1.3852E−05 | 7.02061E−06 | 0.00351 |
| FOUR OF A KIND | 100 | 624 | 0.506841444 | 0.0002401 | 0.000121691 | 0.012169 |
| FULL HOUSE | 50 | 3,744 | 0.506841444 | 0.00144058 | 0.000730144 | 0.036507 |
| FLUSH | 30 | 5,108 | 0.506841444 | 0.0019654 | 0.000996147 | 0.029884 |
| STRAIGHT | 16 | 10,200 | 0.506841444 | 0.00392465 | 0.001989174 | 0.031827 |
| THREE OF A KIND | 10 | 54,912 | 0.506841444 | 0.02112845 | 0.010708775 | 0.107088 |
| TWO PAIR | 6 | 123,552 | 0.506841444 | 0.04753902 | 0.024094743 | 0.144568 |
| JACKS OR BETTER | 4 | 337,920 | 0.506841444 | 0.13002124 | 0.065900153 | 0.263601 |
| LOW PAIR | 2 | 760,320 | 0.506841444 | 0.29254779 | 0.148275344 | 0.296551 |
| BUST | | 1,302,540 | 0.506841444 | 0.50117739 | 0.254017474 | 0 |
| | | 2,598,960 | | 1 | | 0.928826 |

The third stage for the "Free Ride" variation is represented by Table 15, which is similar to Table 10. Again, the differences are in the "Pay" values, which are now exactly twice (2× multiplier), the "Pay" values from Table 14, and the fourth column "Probability of Playing This Stage", which is now 0.25688825, which is the square of the 0.506841 "hit rate" of the first stage.

TABLE 15

| | Pay | Occurrences | Probability of Playing This Stage | Probability of This Hand | Probability of This Hand on This Stage | EV |
|---|---|---|---|---|---|---|
| ROYAL FLUSH | 8000 | 4 | 0.25688825 | 1.5391E−06 | 3.95371E−07 | 0.003163 |
| STRAIGHT FLUSH | 1000 | 36 | 0.25688825 | 1.3852E−05 | 3.55834E−06 | 0.003558 |
| FOUR OF A KIND | 200 | 624 | 0.25688825 | 0.0002401 | 6.16779E−05 | 0.012336 |
| FULL HOUSE | 100 | 3,744 | 0.25688825 | 0.00144058 | 0.000370067 | 0.037007 |
| FLUSH | 60 | 5,108 | 0.25688825 | 0.0019654 | 0.000504889 | 0.030293 |
| STRAIGHT | 32 | 10,200 | 0.25688825 | 0.00392465 | 0.001008196 | 0.032262 |
| THREE OF A KIND | 20 | 54,912 | 0.25688825 | 0.02112845 | 0.005427651 | 0.108553 |
| TWO PAIR | 12 | 123,552 | 0.25688825 | 0.04753902 | 0.012212215 | 0.146547 |
| JACKS OR BETTER | 8 | 337,920 | 0.25688825 | 0.13002124 | 0.033400929 | 0.267207 |
| LOW PAIR | 4 | 760,320 | 0.25688825 | 0.29254779 | 0.075152089 | 0.300608 |
| BUST | | 1,302,540 | 0.25688825 | 0.50117739 | 0.128746584 | 0 |
| | | 2,598,960 | | 1 | | 0.941535 |

Finally, Table 16 is a similar table to Table 11, showing the overall payout percentage of the one, two and three stage versions of this "Free Ride" game. The increase in overall payout is a little over 1.2% when going from one to three stages. This range may be increased using a higher "Free Ride" percentage, or decreased using a lower "Free Ride" percentage. One skilled in the art will appreciate that changing the payout range using this independent "Free Ride" percentage provides much better precision and flexibility for setting this range than the paytable modification method used in the unmodified second embodiment.

TABLE 16

| Stage | Total EV For Stage | EV of Game Playing this many stages |
|---|---|---|
| 1 | 0.91628805 | 0.916288054 |
| 2 | 0.92882552 | 0.922556787 |
| 3 | 0.94153454 | 0.928882704 |

Multi-Strike Five-Card Draw Poker

Five-Card Draw poker is a very popular casino game and is offered in many variations including Jacks or Better, Joker Poker, Deuces Wild and various "bonus" type Jacks or Better versions, among others. While it is within the scope of the invention to use any poker game with paytables and/or multipliers that provide the increased reward on the higher stages, or to use different variations of poker or even other games of chance on different levels, this third embodiment will use a well known game with its well known paytables. It will also use multipliers to increase the reward on the higher levels.

Many of the popular Five-Card Draw poker games have hit rates in the 40% to 50% range, including Jacks or Better, Deuces Wild and the many "bonus" poker variations that are popular today in the marketplace. Since most gaming jurisdictions require that video poker be played from a "fair" deck of cards, it has become widely known that a player can determine the payout percentage of a video poker machine by looking at its paytable. This has resulted in a growing popularity of this type of game. In this embodiment of the invention, a multiple stage Five-Card Draw poker game is constructed, also using the "Free Ride" feature previously discussed to maintain the familiar paytable. It will be shown that the frequency of the "Free Ride" feature can be used to achieve a similar payout percentage in the multi-stage game as the player may expect from the familiar paytable.

Figure 17:
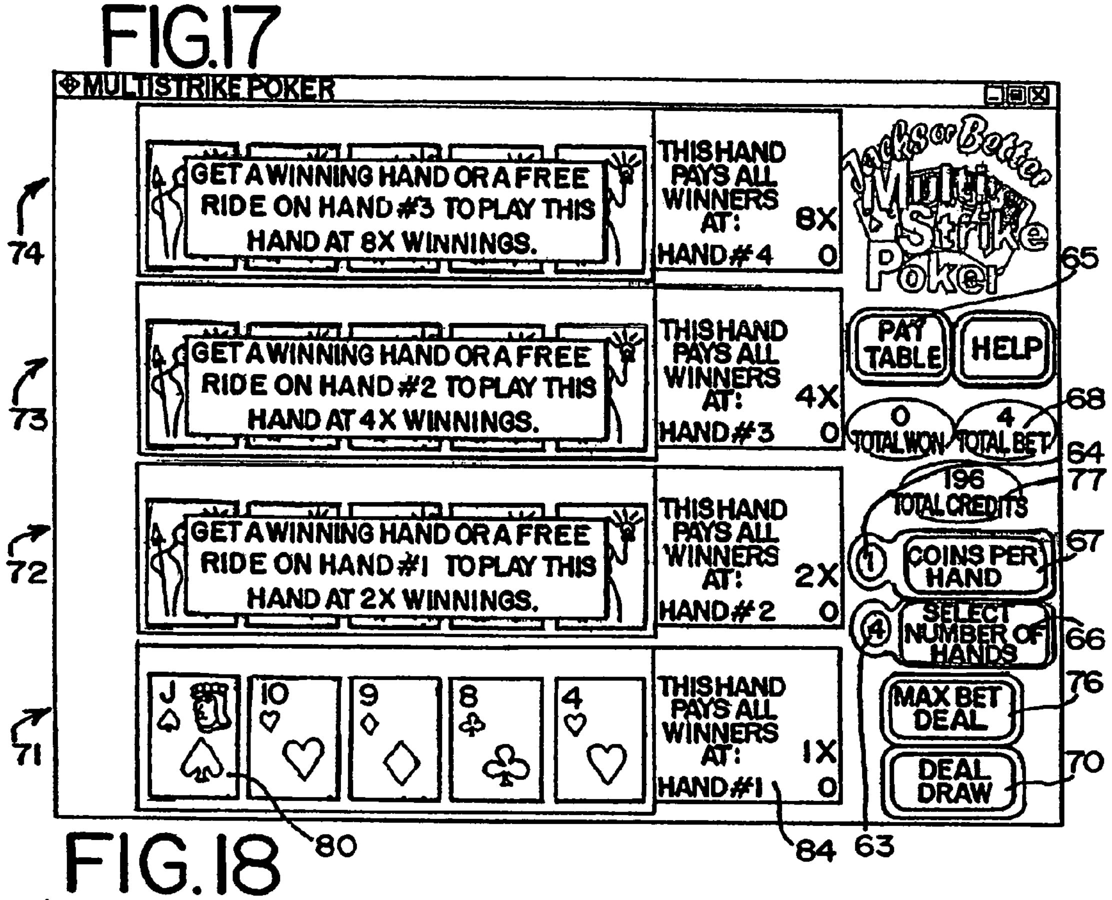
FIG. 17 is a video screen representation highlighting another multi-stage poker gaming machine embodiment of the present invention.

FIG. 17 shows the current (third) embodiment four-stage 9-6 Jacks or Better game. The game uses the familiar paytable shown in FIG. 18, which may be displayed by pressing the "Pay Table" button 65 shown in FIG. 17. The player presses the "Select Number of Hands" button 66 to designate a bet on one to four hands (stages) of this game. This third embodiment of course may be constructed with a lesser or greater number of stages than four, without departing from the invention.

The player presses the "Coins per Hand" button 67 to select a bet ranging from one to five coins per hand. Those skilled in the art understand how to allow the range of coins bet to be broader or narrower or how to add bonuses for higher bets.

The "Total Bet" is the product of the "Select Number of Hands" and "Coins per Hand" values, and is displayed in the "Total Bet" window 68. The player then presses the "Deal/Draw" button 70 to deal out a hand on the first stage 71. The buttons shown in FIG. 17 are video buttons for use with a touchscreen display. A pointing device such as a mouse or trackball, physical pushbutton switches and the like may be used in addition to or instead of the video buttons shown. If the player wishes to bet the maximum twenty coins on a game, he or she may press the "Max Bet Deal" button 76 which has the same result as pressing the "Select Number of Hands" button 66 until "4" is shown, followed by pressing the "Coins per Hand" button 67 until "5" is shown, followed by pressing the "Deaf/Draw" button 70.

Figure 19:
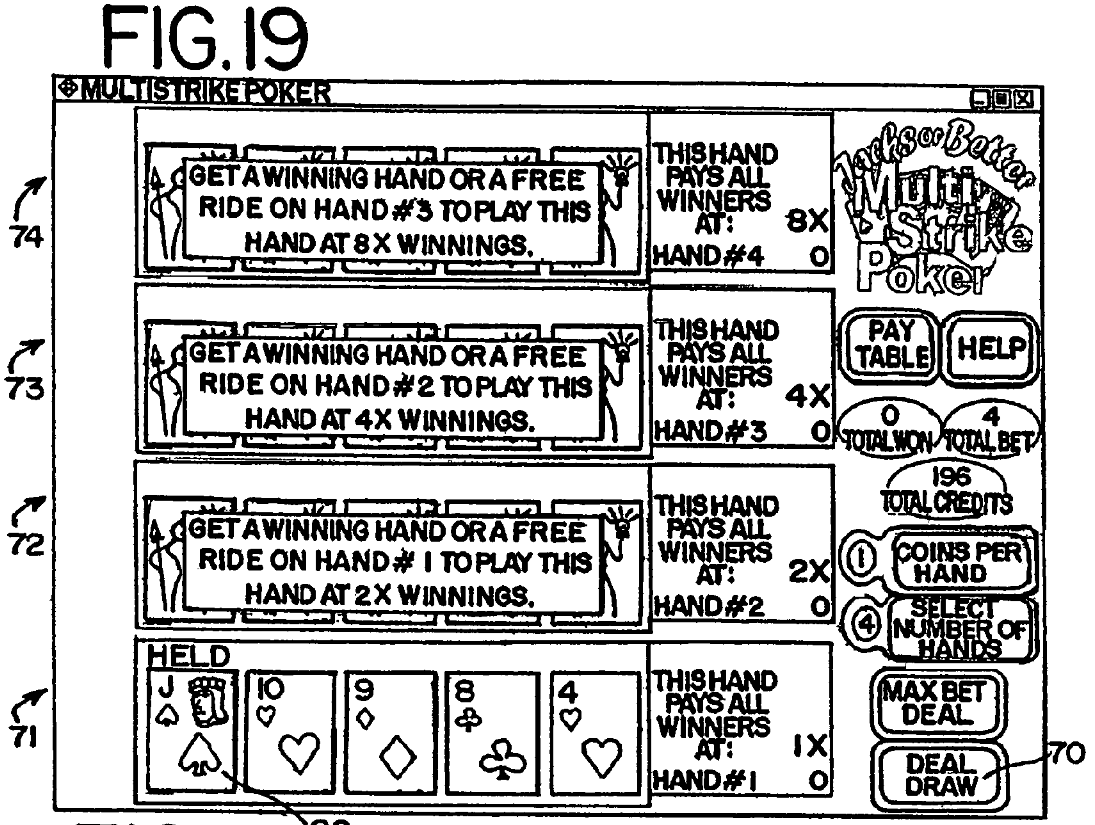
FIG. 19 is another video screen representation of the poker gaming machine embodiment of FIG. 17.

After receiving the initial hand, the player may hold one or more cards by using the touchscreen to indicate which cards are to be discarded. FIG. 19 shows the display after the player elects to hold only the Jack of Spades 80 from the hand dealt in FIG. 17. FIG. 19 shows the word "Held" above the Jack of Spades 80 that was selected to be held. The player then presses the "Deal/Draw" button 70 to replace the other four cards.

Figure 20:
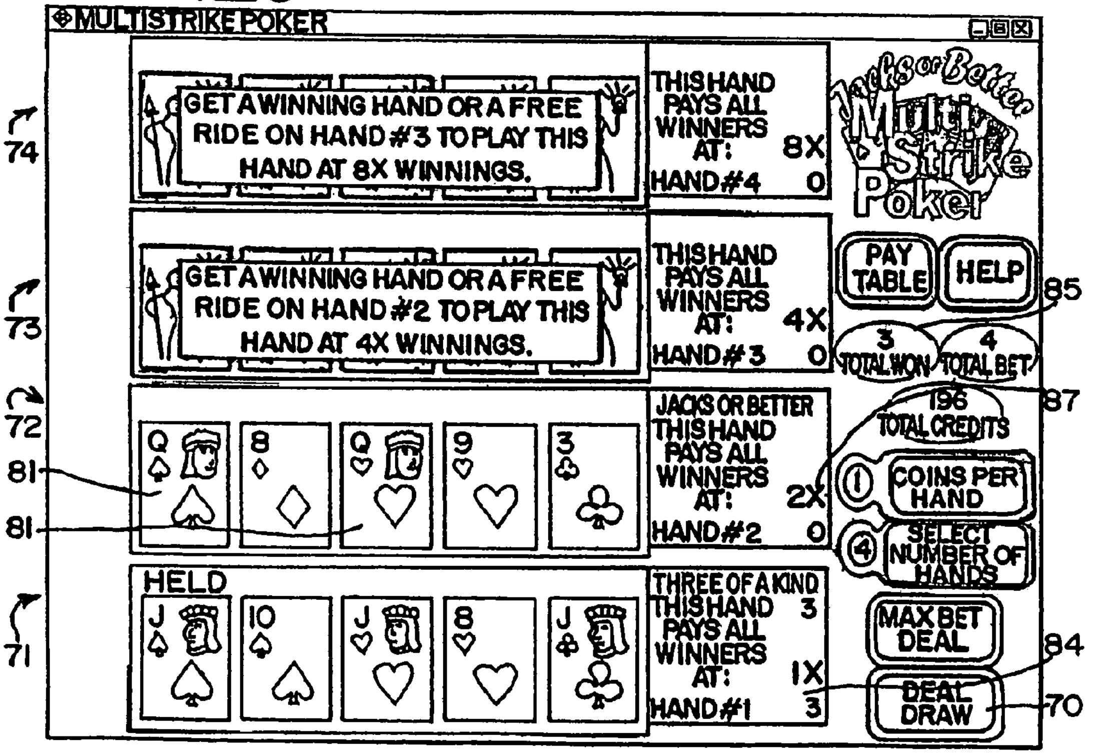
FIG. 20 is another video screen representation of the poker gaming machine embodiment of FIG. 17.

FIG. 20 shows a possible result of the draw. The draw results in a Three of a Kind. The Three of a Kind awards three coins as shown in the FIG. 18 paytable. The three coin award multiplied by the Hand #1 (71) multiplier of 1× is shown to total three coins in the first stage payout information window 84 to the right of Hand #1 in FIG. 20. This three coin sub-total is shown in the "Total Won" meter 85 of FIG. 20. If Hand #1 was a loser instead of getting "Jacks or Better" (as was accomplished with a hand of Three of a Kind), the game would be over and the bets on Hand #2 (72), Hand #3 (73) and Hand #4 (74) would be lost without playing those hands.

However, as a result of obtaining a winning hand, the bet made on Hand #2 (72) will now be played. Five cards are dealt randomly from a separate (new) deck of fifty-two cards in the Hand #2 position. FIG. 20 shows that the cards dealt to Hand

#2 (72) include a pair of Queens 81, which already ranks above the "Jacks or Better" level required to win. A skilled player would hold the pair of Queens, and press the "Deal/Draw" button 70.

Figure 21:
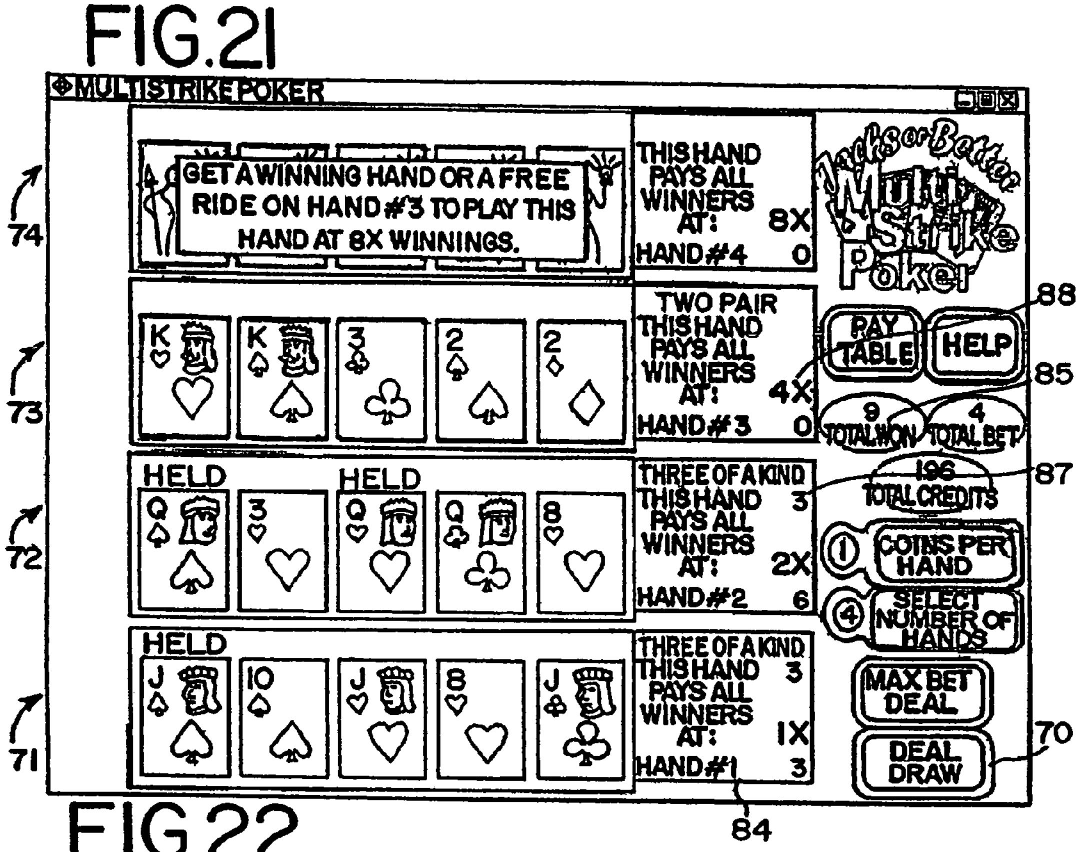
FIG. 21 is another video screen representation of the poker gaming machine embodiment of FIG. 17.

FIG. 21 shows one possible result of this second draw. In FIG. 21, a third Queen was drawn to Hand #2 resulting in Three of a Kind, which as seen on Hand #1, awards three coins. FIG. 21 shows that this three coin award is multiplied by the 2× multiplier for Hand #2, which results in a six coin total win from Hand #2. The coins awarded are shown in the second stage payout information window 87 to the right of Hand #2 (72). The "Total Won" meter 85 is now updated to show nine coins won, which is the sum of the three coins won on Hand #1 and the six coins won on Hand #2. If Hand #2 was a loser instead of getting "Jacks or Better" (as was accomplished with a hand of Three of a Kind), the game would be over and the bets on higher level hands would be lost.

Since a winning hand was achieved on Hand #2, the bet made on Hand #3 (73) will now be played. Five cards are again dealt randomly from a new deck in the Hand #3 position (73). FIG. 21 shows that the cards dealt to Hand #3 include two pair, which already is above the "Jacks or Better" level required to win. A skilled player would hold the two pair and press the "Deal/Draw" button 70.

Figure 22:
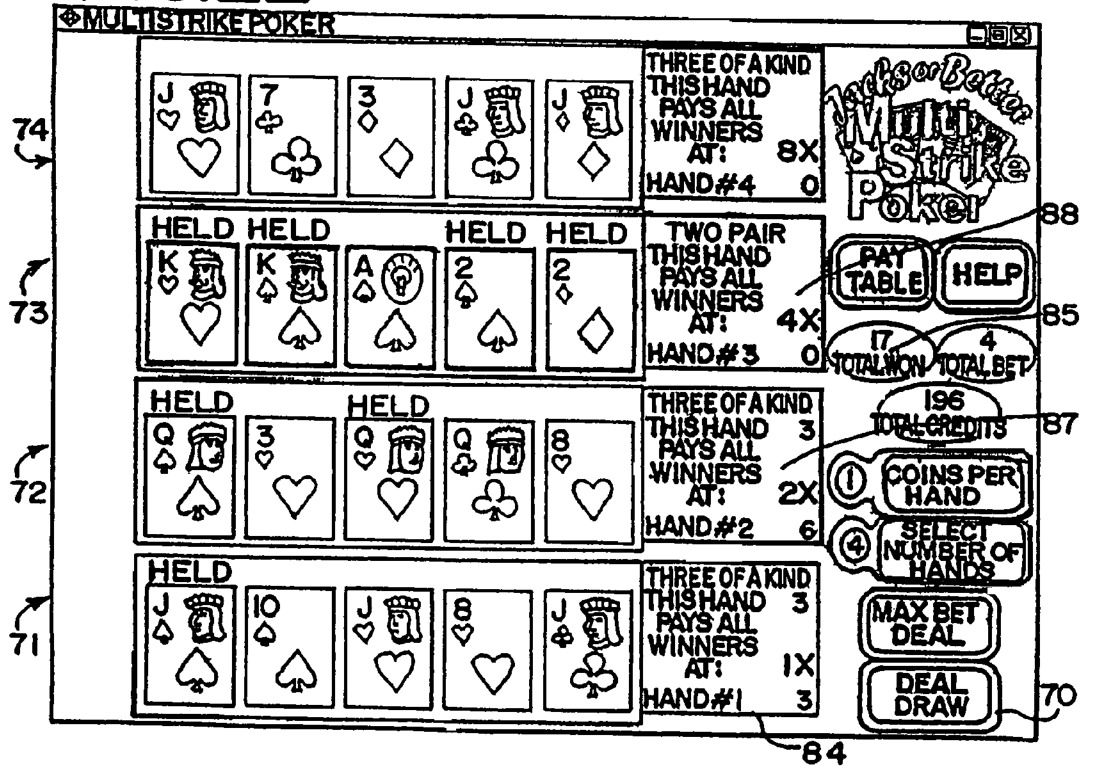
FIG. 22 is another video screen representation of the poker gaming machine embodiment of FIG. 17.

FIG. 22 shows one possible result of this third draw. In FIG. 22, Hand #3 was not improved, resulting in two pair which awards two coins. FIG. 22 shows that this two coin award is multiplied by the 4× multiplier for Hand #3, which results in an eight coin total win from Hand #3. These numbers are shown in the third stage payout information window 88 to the right of Hand #3 (73). The "Total Won" meter 85 is now updated to show seventeen coins won, which is the sum of the three coins won on Hand #1, the six coins won on Hand #2 and the eight coins won on Hand #3.

As a result of obtaining a winning hand on Hand #3, the bet made on Hand #4 (74) will now be played. Five cards are again dealt randomly from a new deck in the Hand #4 (74) position. FIG. 22 shows that the cards dealt to Hand #4 include three Jacks, which already is above the "Jacks or Better" level required to win. The three Jacks are held by the player and the "Deal/Draw" button 70 is again pressed.

Figure 18:
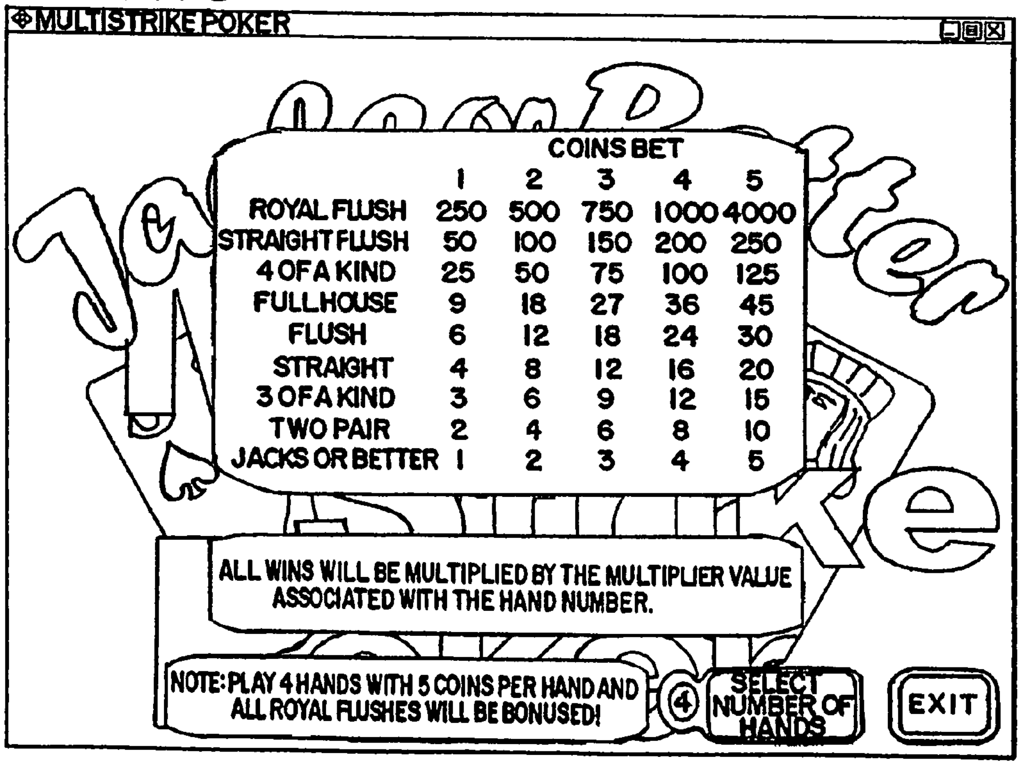
FIG. 18 is a representation of a paytable of winning combinations of the poker gaming machine embodiment of FIG. 17.
Figure 23:
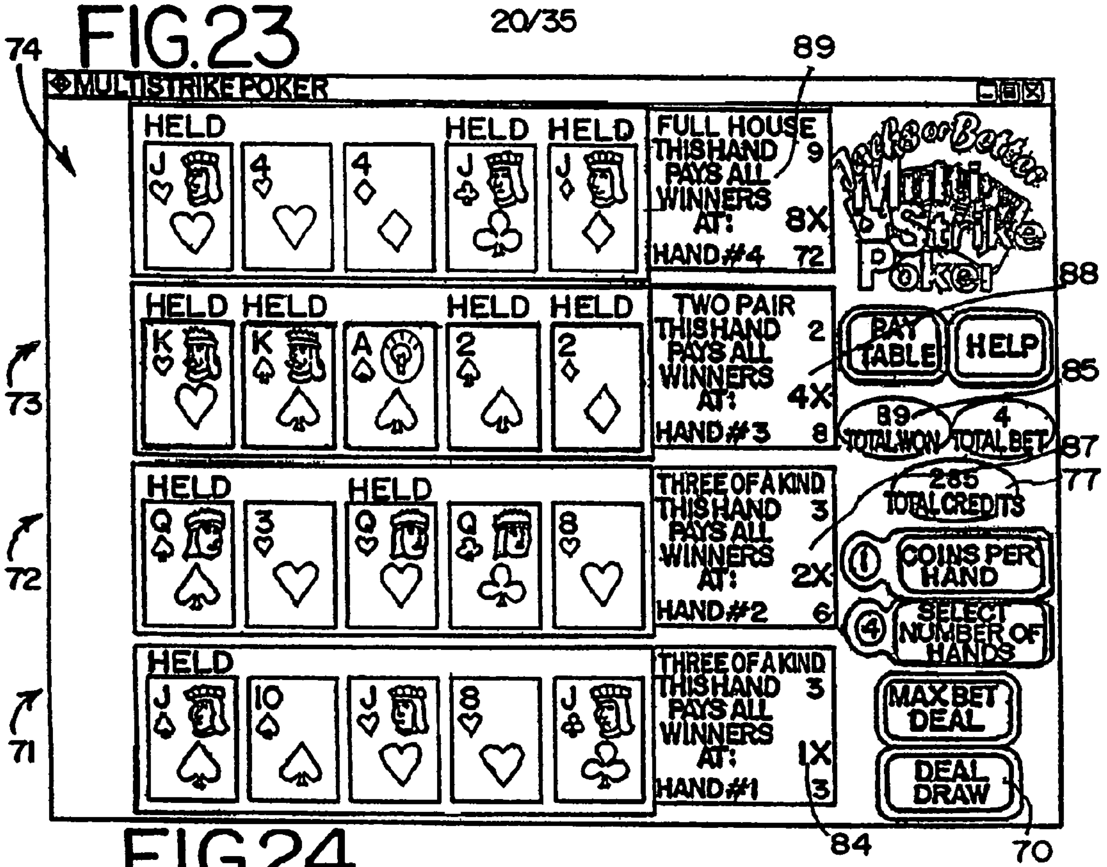
FIG. 23 is another video screen representation of the poker gaming machine embodiment of FIG. 17.

FIG. 23 shows one possible result of this fourth draw. In FIG. 23, Hand #4 (74) becomes a Full House as a result of drawing a pair of fours. A Full House awards nine coins as seen in FIG. 18. FIG. 23 shows that this nine coin award is multiplied by the 8× multiplier for Hand #4, which results in a seventy-two coin total win from Hand #4. These numbers are shown to the right of Hand #4 (74) in the fourth stage payout information window 89. The "Total Won" meter is now updated to show eighty-nine coins won which is the sum of coins won on all levels. The game is over as a result of playing all hands on which bets were placed. The credits shown in the "Total Won" meter 85 are added to the "Total Credits" window 77 taking this value to "285."

Multi-Strike Five-Card Draw Poker with "Free Ride"

Figure 24:
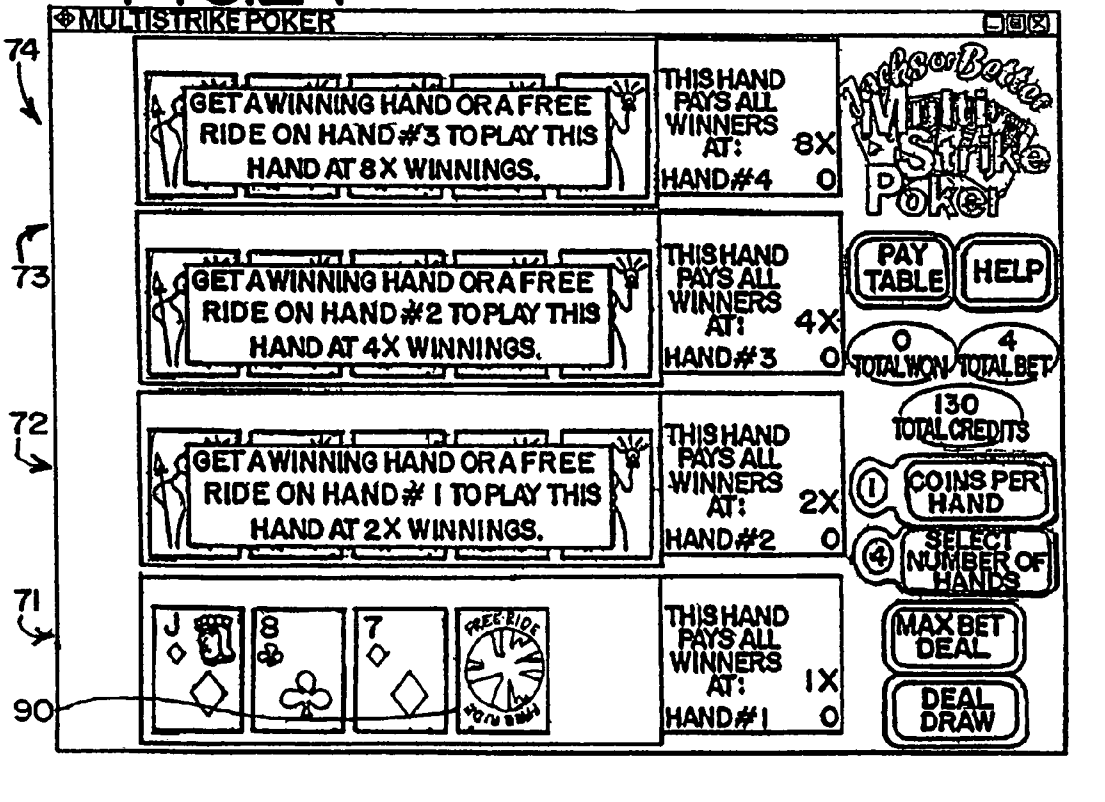
FIG. 24 is a video screen representation of the poker gaming machine embodiment of FIG. 17, but with a different opening hand shown using a "Free Ride" card.

In another example of the foregoing embodiment of Five-Card Draw poker, the same "Free Ride" feature that was described for Five-Card Stud poker is used to increase the hit rate without having to modify the popularly known paytable. FIG. 24 shows that the "Free Ride" card 90 was dealt to the player in Hand #1 (71). The game makes an exciting sound when the card is dealt to alert the player that Hand #2 (72) will be available whether or not a win is achieved on Hand #1. After showing the FIG. 24 display for a few seconds to allow the special sound to complete, the "Free Ride" card 90 is replaced by another randomly selected card and the remainder of the hand is dealt to the player in usual fashion.

Figure 25:
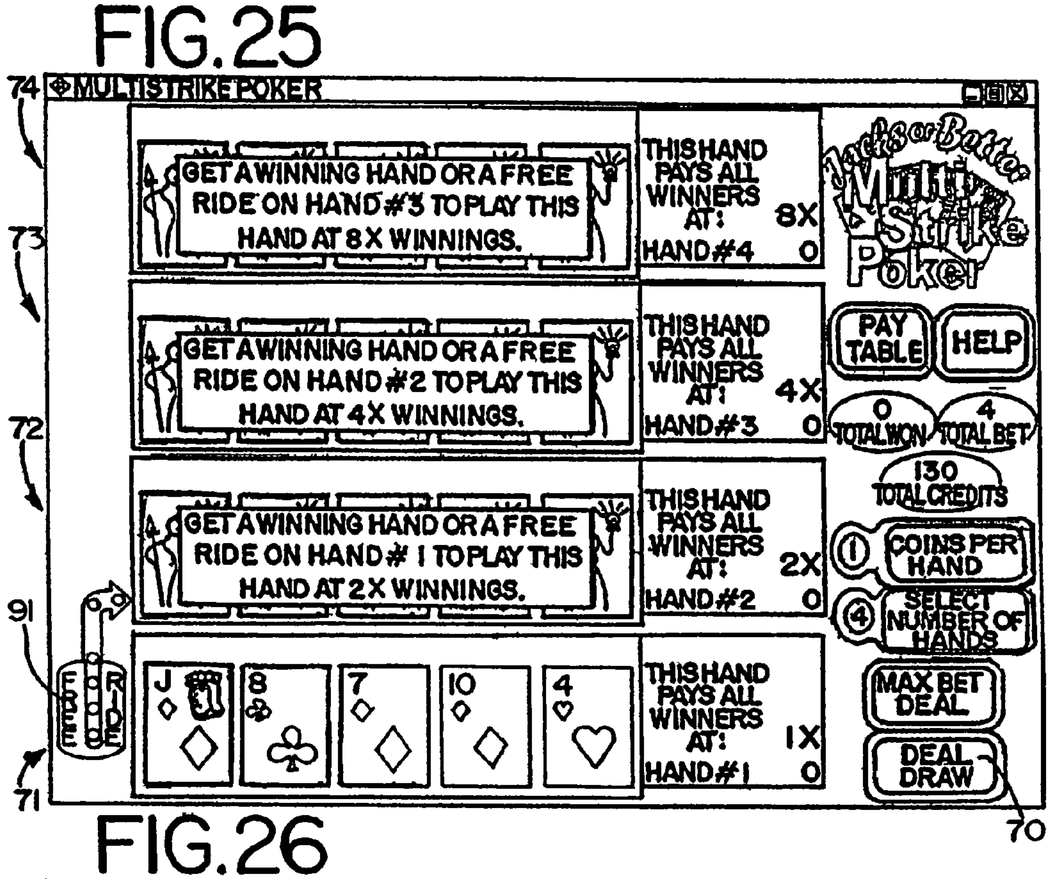
FIG. 25 is another video screen representation of the poker gaming machine embodiment of FIG. 24.

FIG. 25 shows this completed hand along with a "Free Ride" indicator 91 on the left edge of the screen. As in the previous example, the player will hold desired cards and draw replacements for those cards not held. A skilled player would hold the 7, 10 and Jack of Diamonds, and then press the "Deal/Draw" button 70.

Figure 26:
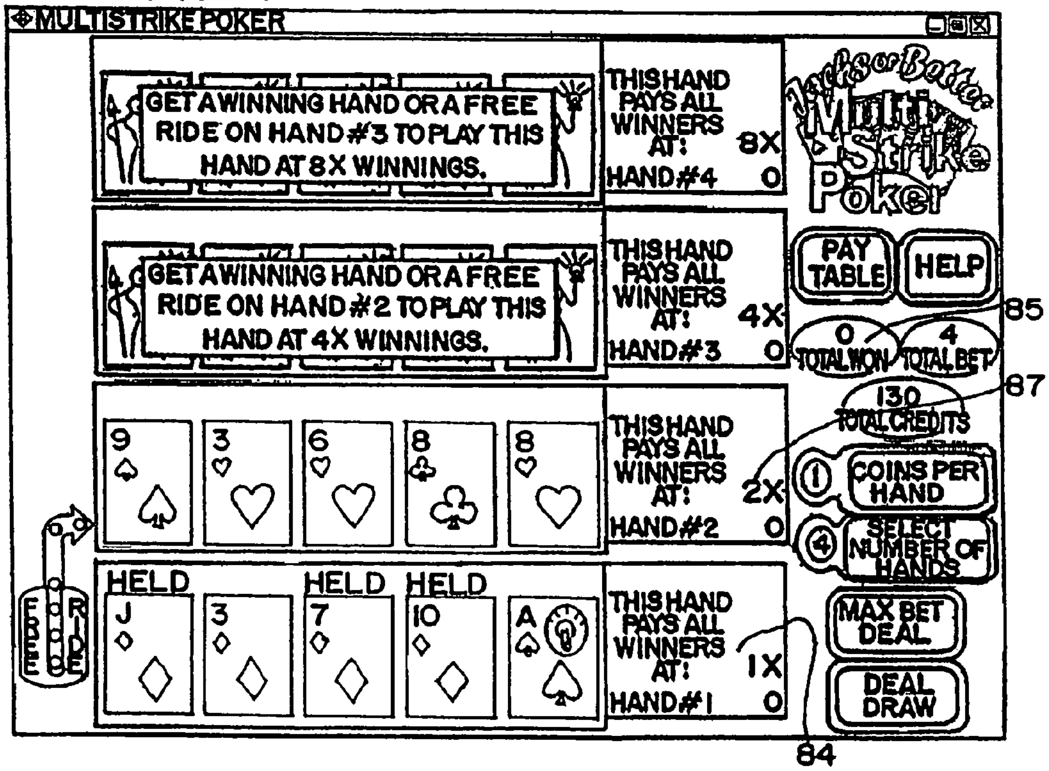
FIG. 26 is another video screen representation of the poker gaming machine embodiment of FIG. 24.

FIG. 26 shows that the cards drawn did not result in a win. The first stage payout information window 84 now shows a zero coin win with "Free Ride" being indicated as the reason for advance. As a result of the "Free Ride" on Hand #1 (71), five cards are now dealt for Hand #2 (72). Play would continue from level to level as long as there is a winning hand, or "Free Ride" on each level, as previously described.

Analysis of Certain Architecture of the Multi-Strike Five-Card Draw Poker Game

Part I—Review of "Standard Video Poker"

This analysis is of a "standard video Draw poker" game, which will then be related to Multi-Strike Five-Card Draw poker for a one coin wager per hand. It is well known by those skilled in the art how to expand this to more coins bet, and how to add bonuses for higher bets.

Those skilled in the art of video poker development know that a Five Card Draw poker game with the paytable shown in Table 17 has an expected return of 99.54398%. This payout percentage is what the game will return in the long run with "Optimal Play". This game is usually referred to as 9-6 Jacks or Better. This is because most Jacks or Better games (without Four-of-a-Kind bonuses) use the same paytable except for the Full House and Flush awards which are modified to change the payout percentage. It is well known that a 9-6 Jacks or Better (awarding nine coins for Full House and six coins for Flush) provides a 99.54% return.

TABLE 17

| Hand Rank | Pay | Occurrences | Probability | EV |
|---|---|---|---|---|
| Royal Flush | 800 | 64.3457483 | 2.47583E−05 | 0.019806614 |
| Straight Flush | 50 | 284.1410173 | 0.000109329 | 0.005466437 |
| Four of a Kind | 25 | 6140.161736 | 0.002362546 | 0.059063642 |
| Full House | 9 | 29919.76638 | 0.011512207 | 0.103609866 |
| Flush | 6 | 28626.22236 | 0.011014491 | 0.066086948 |
| Straight | 4 | 29184.62522 | 0.011229348 | 0.04491739 |
| Three of a Kind | 3 | 193489.1896 | 0.074448699 | 0.223346096 |
| Two Pair | 2 | 335990.6964 | 0.129278902 | 0.258557805 |
| Jacks or Better | 1 | 557697.9125 | 0.214585031 | 0.214585031 |
| Bust | 0 | 1417562.939 | 0.545434689 | 0 |
| | | 2598960 | 1 | 0.99543983 |

Unlike the previous embodiments, Draw poker has a skill element that requires decisions by the player on each hand. The game is designed such that the payout percentage will be reached over the long run when the game is played optimally. Each non-optimal play lowers the expected return (although it could result in a higher short term result). Each of the 2,598,960 possible hands may be played thirty-two ways by holding none, or any combination of the five initial cards dealt. Using expected value analysis of the thirty-two combinations can determine the best play for any given hand. One skilled in the art is readily able to construct the table in Table 17 by writing a computer program that performs this analysis on each of the 2,598,960 hands.

To further clarify this method, one of the possible 2,598,960 hands is examined, and in particular, the hand shown in FIG. 19: Jack of Spades, 10 of Hearts, 9 of Diamonds, 8 of Clubs and 4 of Hearts. To find the best way to play a hand, one computes the expected value of each of the thirty-two ways to play the hand. Here, two of the thirty-two ways to hold the hand of FIG. 19 are analyzed. In one case, the Jack-10-9-8 four card straight is held. The second case will be holding just the Jack of Spades.

Table 18 shows the expected return for holding the Jack-10-9-8 four card straight. The first two columns show all possible rankings and their pay value. The third column shows the number of occurrences of each of these possible ranks when drawing to this exact situation (i.e., given the initial five cards, the cards that were held and the suits and rank of the remaining forty-seven cards). The computation of this third column may be exhaustively determined by analyzing each possible resulting hand, but is usually done by an analysis of the combinations of the held and remaining cards, which may be computed more quickly. In this example of drawing one card, it is easy to see that any of the four outstanding Queens or 7's result in eight possible straights, and the three outstanding Jacks would result in a pair of Jacks. All other draw cards would result in a "Bust". The fourth column shows the "Probability" of drawing to the specified rank, which is computed by dividing the third column "Occurrences" count by the forty-seven total ways to draw this hold combination. The fifth column "EV" is the product of the "Pay" value of second column and the "Probability" value of fourth column. The sum of EV components results in a 0.744681 expected return for this play. That is, on average, this hold will yield 74.47% of the amount bet in the long run.

TABLE 18

(Expected Value of Holding Jack-10-9-8 from the FIG. 19 Hand)

| Hand Rank | Pay | Occurrences | Probability | EV |
|---|---|---|---|---|
| Royal Flush | 800 | 0 | 0 | 0 |
| Straight Flush | 50 | 0 | 0 | 0 |
| Four of a Kind | 25 | 0 | 0 | 0 |
| Full House | 9 | 0 | 0 | 0 |
| Flush | 6 | 0 | 0 | 0 |
| Straight | 4 | 8 | 0.17021277 | 0.680851 |
| Three of a Kind | 3 | 0 | 0 | 0 |
| Two Pair | 2 | 0 | 0 | 0 |
| Jacks or Better | 1 | 3 | 0.06382979 | 0.06383 |
| Bust | 0 | 36 | 0.76595745 | 0 |
| | | 47 | 1 | 0.744681 |

Table 19 shows a similar analysis for the case where just the Jack is held from the same hand shown in FIG. 19. The "Occurrences" column now, involves 178,365 different resulting hands when only 1 card is held. This number of combinations is "47 choose 4" which is stated by the formula:

$$\frac{47!}{4!*(47-4)!} = 178{,}365$$

This specifies the number of combinations of forty-seven cards taken four cards at a time. As stated above, these "Occurrences" are found by a well known/readily obtained computer program that either exhaustively analyzes each of the 178,365 draw combinations in conjunction with the Jack of Spades, or by an analysis of the combinations of the held and remaining cards. The expected return of holding the Jack of Spades is computed in Table 19 in a manner similar to that used in Table 18, resulting in a 47.93% expected return in the long run. Analyzing the other thirty ways to play this hand results in an even lower expected return than the "Jack Hold" of Table 19. Therefore, the best play for this particular hand is to hold the four card Straight analyzed in Table 18.

TABLE 19

(Expected Value of Holding Only the Jack in FIG. 19 Hand)

| Hand Rank | Pay | Occurrences | Probability | EV |
|---|---|---|---|---|
| Royal Flush | 800 | 1 | 5.60648E−06 | 0.004485 |
| Straight Flush | 50 | 3 | 1.68194E−05 | 0.000841 |
| Four of a Kind | 25 | 52 | 0.000291537 | 0.007288 |
| Full House | 9 | 288 | 0.001614667 | 0.014532 |
| Flush | 6 | 491 | 0.002752782 | 0.016517 |
| Straight | 4 | 548 | 0.003072352 | 0.012289 |
| Three of a Kind | 3 | 4102 | 0.022997785 | 0.068993 |
| Two Pair | 2 | 8874 | 0.049751913 | 0.099504 |
| Jacks or Better | 1 | 45456 | 0.254848205 | 0.254848 |
| Bust | 0 | 118550 | 0.664648333 | 0 |
| | | 178365 | 1 | 0.479298 |

The analysis program that iterates over each of the 2,598,960 hands finds the best of the thirty-two possible holds, and keeps a running sum of the expected return for these optimal holds (for the sample hand of FIG. 19, 0.744681 would be added to this sum). The sum of all optimal hold expected returns is then divided by 2,598,960 to determine the expected return for the game. The fifth column of Table 17 shows this result of 0.99543983 along with the contribution from each type of hand.

Part II—Modification of Analysis for Multi-Strike Game

In playing a multi-stage Draw Poker game of the present invention, the optimal hold is no longer necessarily the hold that will provide the highest expected return for the current hand, but is rather the hold that will provide the highest expected return on the remainder of the multi-stage game (including the current hand). As with standard Draw poker, the expected return of thirty-two hold combinations must be examined. The expected return of any hold combination now has two components. The first component is the expected return of the current hand (which is the expected return as calculated in Table 18, times the current stage multiplier). The second component is the expected return of the remainder of the game given that hold combination. The second component is the product of the "Probability" of any win on the current stage (for the current hold combination) and the expected return of remaining stages. This sum may be represented as:

$$EV_{ch}=(EV_{std}*\mathrm{MULT}_{stage})+(HR_{ch}*EV_{remain});\text{ where} \qquad \text{EQUATION 1}$$

$EV_{ch}$=Expected Value of current hold;

$EV_{std}$=Expected Value using standard analysis such as done in Table 18;

$MULT_{stage}$=Stage Multiplier, which is a constant for each stage;

$HR_{ch}$="Hit rate" (probability of any win) of current hold combination; and $EV_{remain}$=Combined expected return of all stages above the current level that have received a bet, which is a constant for each stage.

Simply stated, the second component is the value of "staying alive" by getting any win. For certain hands at certain stages, it will be advantageous to hold a combination with a lower $EV_{std}$ due to its higher $HR_{ch}$.

The $EV_{remain}$ component drives an analysis of the game from the "top down." That is, for games with four stages bet, the analysis is done for the fourth stage, then using the result from the fourth stage to set the $EV_{remain}$ value, the analysis may be done for the third stage and so on. For each stage, $EV_{remain}$ is a constant value determined from the analysis of the stage above it.

For the fourth stage, the second component of the Equation 1 sum drops out, because $EV_{remain}$ is zero since there are no subsequent stages. This means that the $EV_{ch}$ for any given hold is eight times $EV_{std}$, which means that standard 9-6 strategy is optimal, and will provide a return of 0.99543983*8=7.96351864.

Before looking at the third stage analysis, it is important to understand the effect of the "Free Ride" feature. For the examples given here, a "Free Ride" rate of seventy-three per one thousand hands is used, or 7.3%. This value was carefully selected to arrive at a total "hit rate" (natural plus "Free Ride") of slightly over 50%, as will be shown later. Those skilled in the art will see that this rate may be increased or decreased as desired to affect the "hit rate" and expected return. The "Free Ride" is randomly selected for 7.3% of the hands when there is a bet on a higher hand. On hands that receive a "Free Ride" card, the second component of the Equation 1 sum becomes a constant, since $HR_{ch}$ is 1.0 for all holds (i.e., one will "hit" or advance to the next level 100% of the time regardless of the hold combination). This means that the best hold combination for hands that have been given a "Free Ride" will match the standard strategy.

To analyze the first three stages, one looks at each of the 2,598,960 possible initial five card hands. For each hand, the thirty-two possible hold combinations will need to be analyzed to determine the best $EV_{ch}$ hold using Equation 1 and the best standard play hold using the method of Table 18 ($EV_{std}$). For many hands, the same hold will yield the highest $EV_{ch}$ and the highest $EV_{std}$. The expected return for a given initial hand is now given by Equation 2:

$$EV_{123}=(FR_{off}*EV_{chbest})+(FR_{on}*((EV_{stdbest}*\text{MULT}_{stage})+(1.0*EV_{remain}))); \text{ where} \quad \text{EQUATION 2}$$

$EV_{123}$=Expected return for a given initial hand on Levels 1, 2 or 3;

$FR_{off}$=Probability of not receiving "Free Ride" (0.927 for this example);

$EV_{chbest}$=$EV_{ch}$ from hold that yields highest value in Equation 1;

$FR_{on}$=Probability of receiving "Free Ride" (0.073 for this example);

$EV_{stdbest}$=EV of best hold combination using standard (Table 18) analysis;

$\text{MULT}_{stage}$=Stage Multiplier, which is a constant for each stage; and $EV_{remain}$=Combined expected return of all stages above the current level that have received a bet, which is a constant for each stage.

The first component of Equation 2 represents the hands that do not receive a "Free Ride." The "No Free Ride" probability of 0.927 is used to weight the expected return that is computed using the formula of Equation 1. The second component represents the hands that receive a "Free Ride. The "Free Ride" probability of 0.073 is used to weight the return that will result by using the standard 9-6 strategy when a "Free Ride" is awarded on this hand.

For Levels one through three, the expected return is computed by adding the $EV_{123}$ values for each of the 2,598,960 possible starting hands and dividing by 2,598,960. This expected return has the return of levels above it embedded within its value.

It is helpful to look at how $EV_{chbest}$ is found for a particular hand. For the hand shown in FIG. 19, we now use the data from Table 18 and Table 19 to compare the $Ev_{ch}$ for the hold of the four card Straight vs. holding the Jack on the third stage. To do this we use Equation 1:

$$EV_{ch}=(EV_{std}*\text{MULT}_{stage})+(HR_{ch}*EV_{remain}) \quad \text{[EQUATION 1]}$$

Taking the Hit Rate ($HR_{ch}$) for holding Jack-10-9-8=1−(36/47)=0.234043 (from Table 18):

$$\text{Hold Jack-10-9-8: } EV_{ch}=(0.744681*4)+(0.234043*7.96351864)=4.84253.$$

The Hit Rate ($HR_{ch}$) for Holding Jack=1−(118550/178365)=0.335352 (from Table 19).

$$\text{Hold Jack: } EV_{ch}=(0.479298*4)+(0.335352*7.96351864)=4.58777.$$

The $EV_{ch}$ for the other thirty hold combinations is lower than for holding just the Jack, therefore, $EV_{chbest}$=4.84253 resulting from holding the four card Straight. From Table 18 and Table 19 it can be seen that $EV_{stdbest}$=0.744681 for this hand (also hold the straight). Therefore, the expected return on the third stage of this initial five-card hand is:

$$EV_{123}=(FR_{off}*EV_{chbest})+(FR_{on}*((EV_{stdbest}*\text{MULT}_{stage})+(1.0*EV_{remain}))) \text{ [using EQUATION 2]}$$

$$EV_{123}=(0.927*4.84253)+(0.073*((0.744681*4)+(1.0*7.96351864)))=5.287809$$

The sum of all of the $EV_{123}$ values divided by 2,598,960 for the third stage results in an expected return of 7.95080267. This is the number of coins expected to be won in the remainder of any game that reaches the third stage (i.e. return of third and fourth stages combined).

The second stage is analyzed identically as the third stage, however $EV_{remain}$ is now 7.95080267 and $\text{MULT}_{stage}$ is now 2. Looking at the hand of FIG. 19, one now has the following calculations:

$$\text{Hold Jack-10-9-8: } EV_{ch}=(0.744681*2)+(0.234043*7.95080267)=3.3501917$$

$$\text{Hold Jack: } EV_{ch}=(0.479298*2)+(0.335352*7.95080267)=3.6249136$$

When the hand of FIG. 19 is analyzed on the second stage, it is now better to hold just the Jack rather than Jack-10-9-8, therefore $EV_{chbest}$ is 3.6249136. The $EV_{stdbest}$ is still 0.744681 as Jack-10-9-8 is the best standard play on any stage of the game. The expected return of this hand on the second level (including the expected return of levels three and four) $EV_{123}$ for this hand is computed as:

$$EV_{123}=(0.927*3.624914)+(0.073*((0.744681*2)+(1.0*7.95080267)))=4.049427$$

A computer program known to those of skill in the art is used to find that the sum of all of the $EV_{123}$ values divided by 2,598,960 for the second stage results in an expected return of 5.96916633. This is the number of coins a player is expected to win in the remainder of any game that reaches the second stage (i.e. return of second third and fourth stages combined).

The first stage is analyzed identically as the second and third stages, however $EV_{remain}$ is now 5.96916633 and $MULT_{stage}$ is now 1. Looking at the hand of FIG. 19, we now have the following calculations:

$$\text{Hold Jack-10-9-8: } EV_{ch}=(0.744681*1)+(0.234043*5.96916633)=2.141723$$

$$\text{Hold Jack: } EV_{ch}=(0.479298*1)+(0.335352*5.96916633)=2.481070$$

When the hand of FIG. 19 is analyzed on the first stage, it is again better to hold just the Jack rather than Jack-10-9-8, therefore $EV_{chbest}$ is 2.481070. The $EV_{stdbest}$ is still 0.744681 as Jack-10-9-8 is the best standard play on any stage of the game. The expected return of this hand on the first level (including the expected return of levels two, three and four) $EV_{123}$ for this hand is computed as:

$$EV_{123}=(0.927*2.481070)+(0.073*((0.744681*1)+(1.0*5.96916633)))=2.790063$$

The sum of all of the $EV_{123}$ values divided by 2,598,960 for the first stage results in an expected return of 3.995391. This is the number of coins a player is expected to win in a four stage game for which a four coin bet is made. Dividing this value by the four coin bet results in an expected return of 0.998848 or 99.88%. By setting the "Free Ride" percentage at 7.3% for the four stage game, the expected return of 99.54% of this standard game was increased to 99.88% to give a player an incentive to learn the modified optimal play strategy dictated by the EVCh analysis.

In order to determine the actual amount paid out on each level as well as the independent return of coins bet on that level, it is useful to maintain several running sums while working through each of the 2,598,960 possible hands. The following equation is calculated for each hand, and a sum of these values is maintained:

$$EV_{playedhand}=(FR_{off}*EVSTD_{chbest})+(FR_{on}*EV_{stdbest}) \quad \text{EQUATION 3}$$

$EV_{stdbest}$=EV of best hold combination using standard (Table 18) analysis $EVSTD_{chbest}$=Standard (Table 18) analysis EV of best hold for maximizing Equation 1.

For each hand, if there is no "Free Ride", it will be held to maximize $EV_{ch}$ using Equation 1. The $FR_{off}$ value is used to weight the standard (Table 18 method) EV of this best hold (called $EVSTD_{chbest}$)). If there is a "Free Ride", then the optimal play is to hold the combination that gives the highest standard EV. The $FR_{on}$ is used to weight this value. For the example hand of FIG. 19, on the first stage or second stage, this would give the following equation:

$$EV_{playedhand}(FR_{off}*EVSTD_{chbest})+(FR_{on}*EV_{stdbest}) \quad \text{[using EQUATION 3]}$$

$$EV_{playedhand}=(0.927*0.479298)+(0.073*0.744681)=0.498671$$

The $EVSTD_{chbest}$ and $EV_{stdbest}$ values come from Table 19 and Table 18, respectively.

For each stage, for each of the 2,598,960 hands, these $EV_{playedhand}$ components are added together and the sum is divided by 2,598,960. This indicates the payout of hands played on that level. These values are shown in the second column of Table 20.

In a manner similar to Equation 3, the $HR_{ch}$ hit rate components are weighted and added to result in the hit rate shown in the third column of Table 20. The fourth column of Table 20 shows the probability of playing a hand on a given level, which is 1.0 on the first level, and for the other levels, is the product of the third and fourth columns of the level below. The fifth column shows the stage multiplier for the given level. The sixth column is the actual return for a particular level, which is the product of the second, fourth and fifth columns. The seventh column is expected return for the rest of a game that has reached the current stage. For the fourth stage, this is the product of the second column (return) and fifth column (multiplier). For the lower levels, it is the product of the second and fifth columns (which represents the Expected Pay for playing the current level) plus the third column (hit rate on current level) times the seventh column of the next higher level. This seventh column value is the same as the sum of the $EV_{123}$ values previously discussed.

TABLE 20

| Level | Payout of Hands played on this Level | Hit Rate of Level | Probability of Playing Level | Multiplier | Return for Bets on this Level | $EV_{remain}$ |
|---|---|---|---|---|---|---|
| 4 | 0.99543983 | 0.45456531 | 0.128598042 | 8 | 1.024092903 | 7.96351864 |
| 3 | 0.99142626 | 0.5004192 | 0.256980631 | 4 | 1.019109383 | 7.950802667 |
| 2 | 0.97183568 | 0.50630045 | 0.50756548 | 2 | 0.986540487 | 5.969166328 |
| 1 | 0.96564822 | 0.50756548 | 1 | 1 | 0.96564822 | 3.995390993 |
| | | | | | 0.998847748 | |

It is easily seen in Table 20 that on lower levels some of the column 2 return is sacrificed to increase the column 3 hit rate to allow more frequent play of the lucrative upper levels as seen in column 6.

Finally, when only two or three stages are bet, the analysis must be done again from the beginning, starting with the top stage and working down. The results for two or three stages are not inferable from the Table 20 data, but need to be developed independently.

It should be clear that a single stage game (i.e., a bet on only the first level) is no different than the standard 9-6 Jacks or Better game.

Figure 27A:
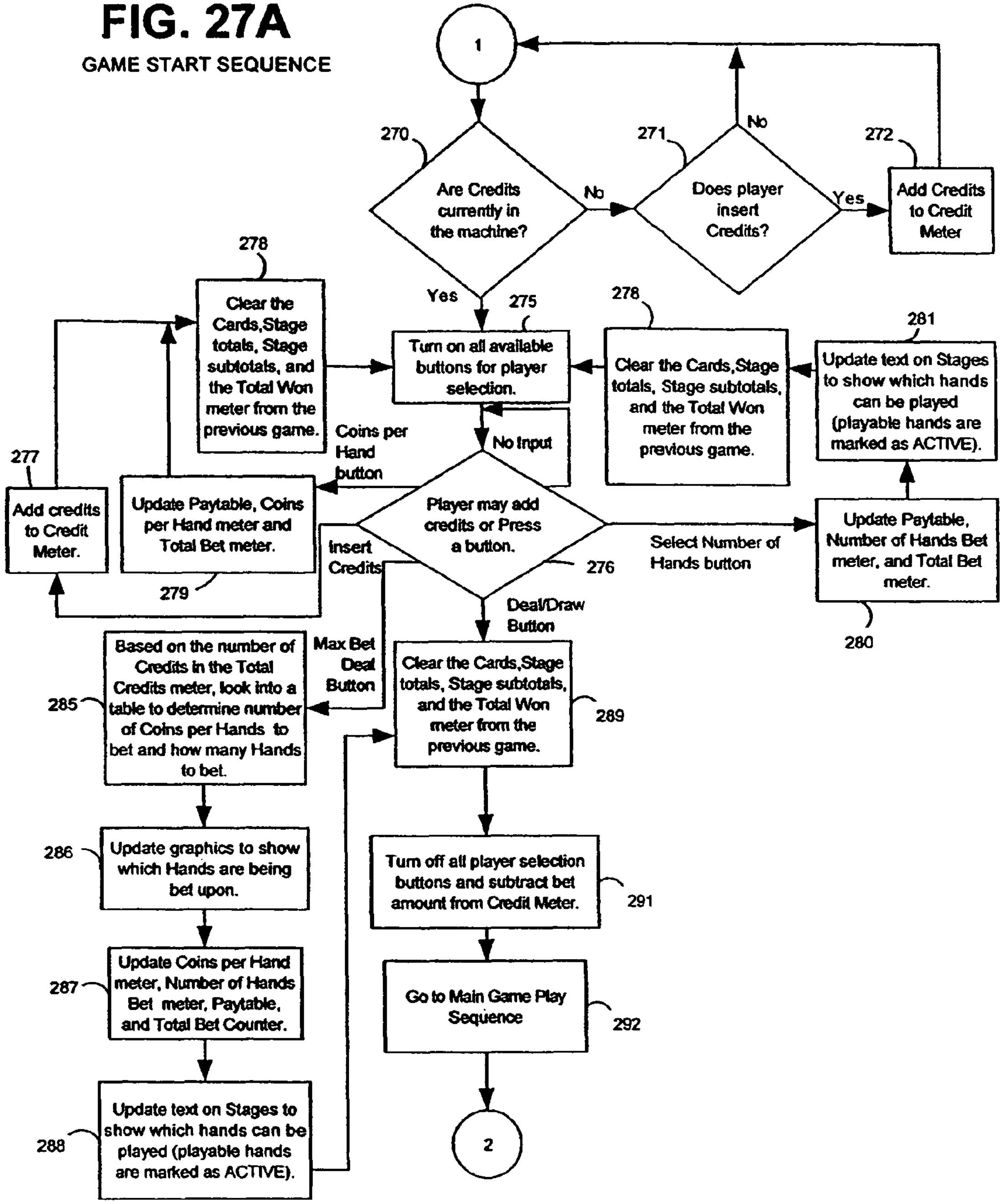
FIGS. 27*a*-27*f* present a flow chart of a method of operating a draw poker video gaming machine of the present invention.

This third embodiment of a multi-stage draw poker gaming machine is operationally summarized in the flow charts of FIGS. 27A-27F. FIG. 27A generally describes the start-up of the Multi-Strike Five-Card Draw Poker game embodiment, which is initially quite similar to that of the first (slots) embodiment. First, an assessment of whether credit(s) are present is undertaken beginning at step 270. If none is present, then a check is made as to whether the player has inserted the relevant coin, credit card, etc., for the necessary credit(s) at step 271. If so, then at step 272 the credit(s) are registered and displayed at the "Total Credits" meter 77 (e.g., FIG. 17). All available player buttons are then activated for initiation of play at 275.

At this stage, the player enters a set-up loop where the player may choose to add more credits or proceed with play at step 276. If credits are added, these are registered on the meter display 77 at step 277. The cards displayed from a previous hand, along with any stage total(s) and subtotal(s) reflected in the payout information window(s), and "Total Won" meter 85 are all cleared for the new game (step 278). The program loops back to step 276.

The "Coins per Hand" button 67 can alternatively be engaged from step 276, causing the coins-per-hand setting to be modified (as indicated at meter 64, FIG. 17), as well as updating the value of the "Total Bet" window 68, as indicated at step 279. Once again, the program loops back to step 276 through steps 278 and 275.

Back at step 276, the player then can choose the "Select Number of Hands" button 66 to input this aspect of his or her wager. This likewise causes the "Total Bet" to be so modified, as well as displaying the number of hands bet at meter 63, all as indicated at step 280. Graphics are also updated at step 281 to highlight the hands which are now "active" (i.e., potentially playable). Steps 278 and 275 then follow in the loop back to step 276.

Once the player has input the parameters of the wager, then the "Deal Draw" button 70 is engaged. It should be noted that the foregoing selection sequence as to coins and hands to bet need not follow the order indicated.

The player has the option of skipping all of the hands and coins per hand selections, through resort to the "Max Bet Deal" button 76. A subroutine will then execute at step 285 to assess the total credits the player has provided, and then determine the maximum number of coins per hand and the maximum number of hands (per an embedded look-up table) which can be played for that credit quantity, up to a fixed maximum for the game. The graphics are updated accordingly at steps 286 and 287 to show the hands being bet, coins-per-hand and total bet (as at steps 279 and 280). Steps 288 and 289 then follow, and are the same as steps 281 and 278, respectively.

From either the actuation of the "Deal Draw" button 70 or the "Max Bet Deal button 76, the selection buttons for player input are then deactivated and the amount bet is subtracted at step 291, with the remaining credits updated on the "Total Credits" meter 77. The main game play sequence is then begun (step 292).

Figure 27B:
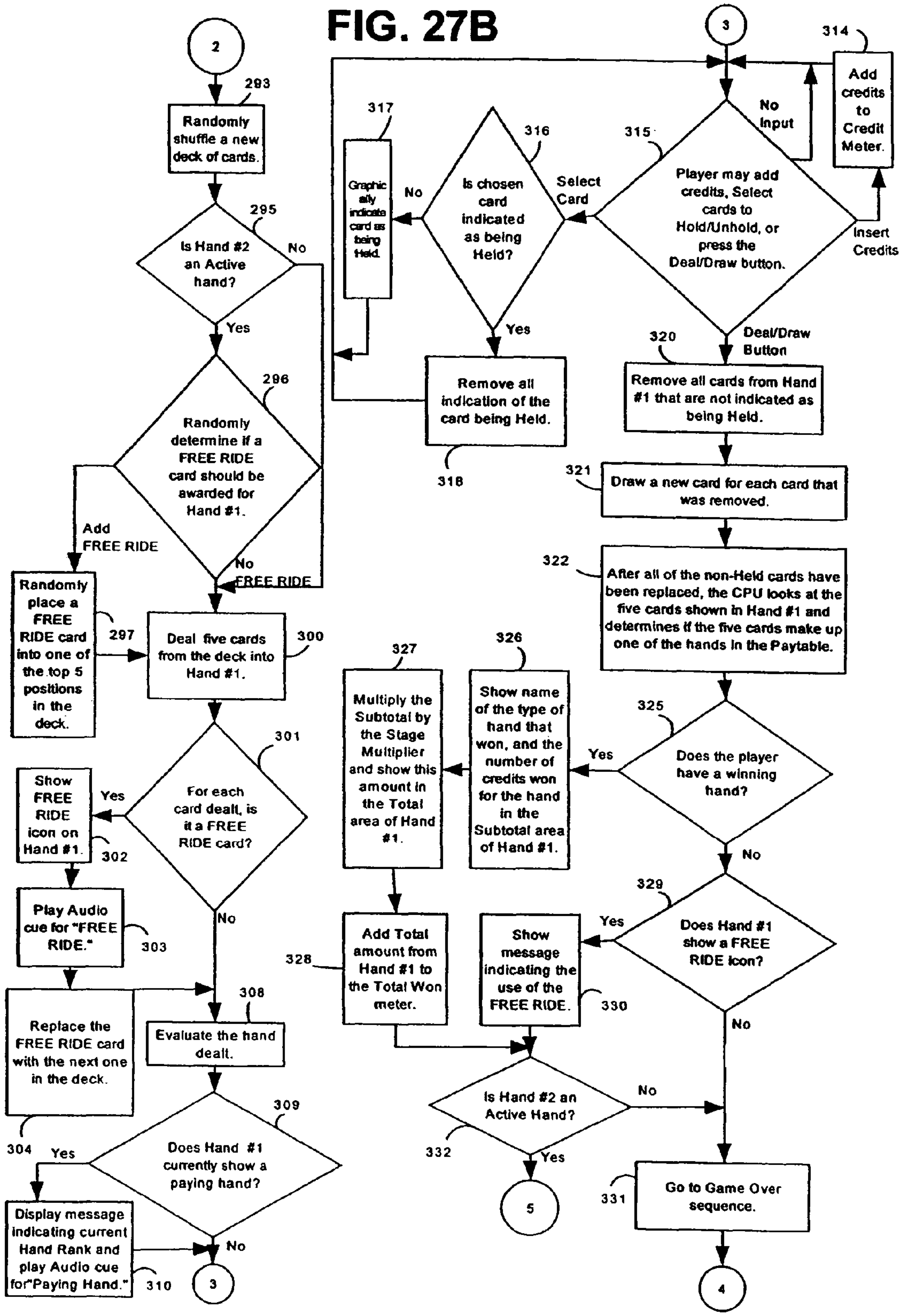

The program randomly "shuffles" the deck to establish a playing order for the fifty-two regular playing cards (used in this version) at step 293 (FIG. 27B). A determination is made as to whether the second stage/level/hand is "active" (bet upon) at step 295. If it is not, the program proceeds to step 300 described below. If it is, then a subroutine is engaged for a "Free Ride" card (this version including this added feature). Beginning at step 296, a random selection process (discussed above) determines whether the "Free Ride" is available or not. If it is, then the "Free Ride" card is caused to be registered in one of the first five positions representing the order of the cards in the shuffled deck for the cards of the first hand (step 297), and the "Free Ride" feature will be available (as described hereafter). If it is not, then no "Free Ride" card is displayed, and the "Free Ride" feature is not available.

From either step 296 or 297, the program then "deals" (step 300) the cards for the hand, displaying the cards graphically in the five spaces allotted in the first hand 71. A check is made in the course of the foregoing deal to determine if one of the dealt cards is a "Free Ride" card at step 301. If it is (i.e., the "Free Ride" feature is available), then the "Free Ride" card is caused to be displayed in the space corresponding to its placement in the order, as indicated at step 302. Whereupon there is an audio cue also provided, and much rejoicing is heard throughout the land (step 303). After a suitable interval, the "Free Ride" card is caused to be replaced by the next regular playing card in the deck order (step 304), and a "Free Ride" icon is displayed next to the level (as seen at 91 in FIG. 25).

From step 304, or step 301 if no "Free Ride" is detected, the program then performs an evaluation of the dealt hand (step 308) to determine if a winning hand is presented, using the paytable hierarchy discussed with regard to FIG. 18, or more simply, is a pair of "Jacks or Better" presented (step 309)? If a winning hand is presented, then from step 309 a message is graphically displayed indicating the hand "rank" along with an audio sound acknowledging to the player that a winner is already in hand (with or without rejoicing, as desired, rejoicing being player dependent), as set forth in step 310. From either step 309 or 310, the program then advances to step 315.

Step 315 provides multiple options to the player at this juncture. The player may choose to add more credits, for example, which if elected results in an update to the "Total Credits" meter 77 at step 314, then looping back to step 315.

The player can also choose which cards to hold/discard at this point. A card that is to be held is selected (step 316) and then tagged as "held" (step 317) (e.g., see FIG. 19 and related discussion). Cards previously selected for being held can likewise be de-selected (step 318). From either step 317 or 318, the process loops back to step 315.

When the player has exercised whatever of the foregoing options are desired, if any, from step 315, the "Deal/Draw" button 70 is again actuated. This results in the removal from the graphic display of any card not designated as "held" (step 320). Each card removed is replaced with the next card in the deck order, as indicated at step 321. A re-evaluation of the hand now presented takes place at steps 322 and 325, similar to that of steps 308 and 309. If a winning hand is presented (again with reference to the paytable of FIG. 18), the type of winner is identified (e.g., "Three Of A Kind,") graphically for the player in the payout information window 84, along with the number of coins/credits won as a sub-total, all as indicated in step 326. That sub-total is increased by the stage multiplier (which in the case of the first level, is 1×) and displayed as a "total" for the first hand, at step 327. From here, the first hand total is added to the "Total Won" meter amount at 85 (e.g., FIG. 20) (step 328).

If a winning hand is not presented at step 325, then a check is made as to whether the "Free Ride" icon is registered for the level at step 329. If it is, a message is displayed in payout information window 84 that the "Free Ride" feature is being employed to advance to the next stage/level/hand (step 330). If the "Free Ride" is not registered, then the game is over, and progresses to a "Game Over" sequence 331.

Out of steps 328 or 330, the program determines if the second stage/level/hand is "active," i.e., bet upon (step 332). If it is not, the player is sent to the "Game Over" sequence (step 331). If it is active, however, then it is on to the next level.

Figure 27C:
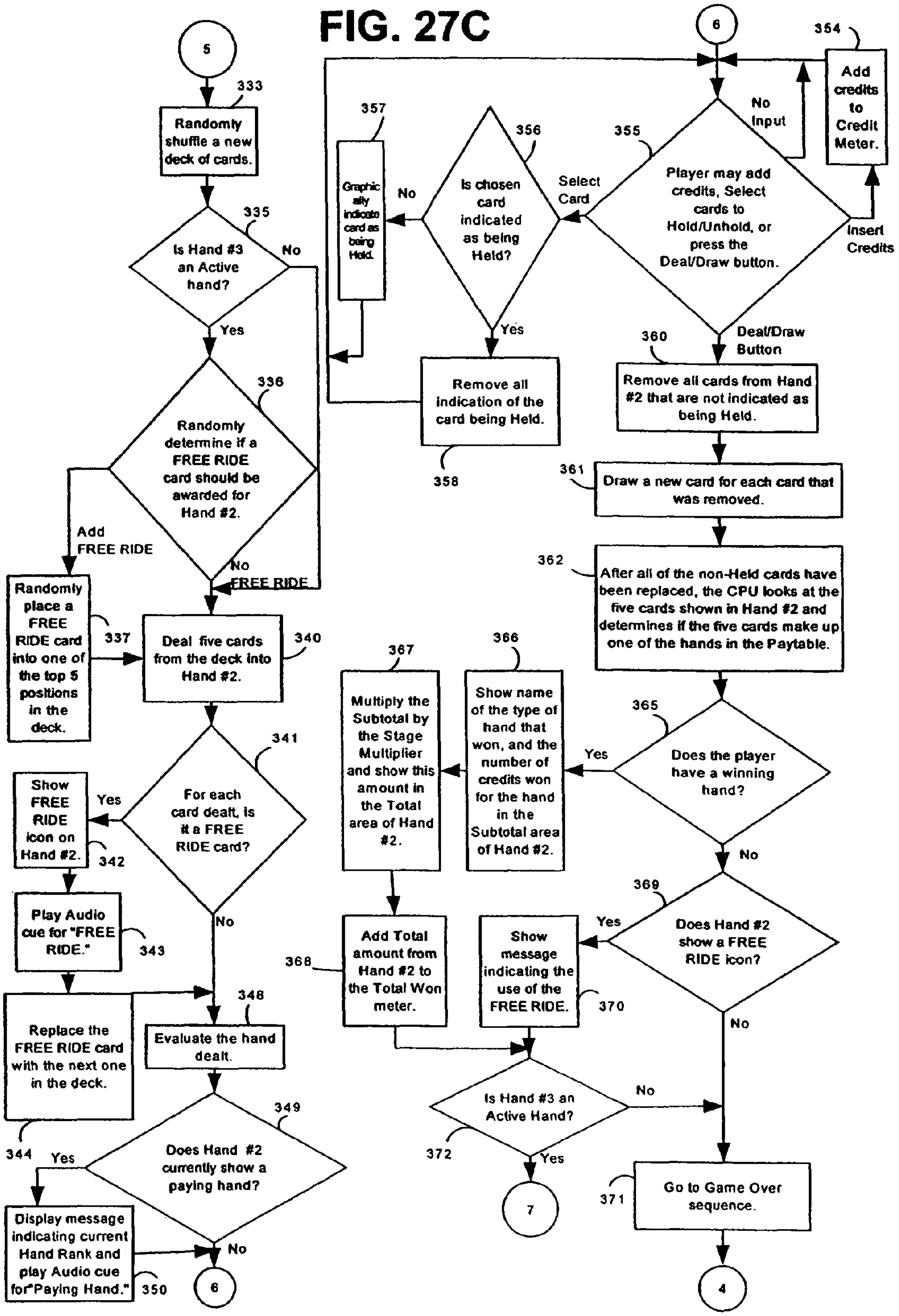

Referring to FIG. 27C, play and operation continue substantially similar to that described with respect to that of the first level. A "new" deck is "shuffled," (step 333). As in the first level, a determination is then made as to whether the third stage/level/hand is "active" (bet upon) at step 335. Steps 335 through 337, 340 through 344 and 348 through 350 are the same as their respective counterpart steps (295 et seq.) discussed with regard to the play of the first hand, albeit now in view of second level play.

From step 349 or step 350, a "draw" sequence is again executed as described with respect to the first hand, beginning at step 355. This includes the option of adding more credits (update of credit meter at step 354), and the selection of cards to be "held" via steps 356 through 358 (corresponding to steps 316 through 318, respectively, described above). Once card selection is completed at step 355, previously described steps 320 through 322, and 325 through 332 are repeated, but for this second stage/level/hand, through respective steps 360 through 362, and 365 through 372. At this point, either the game is over, and the player is routed to the "Game Over" sequence (step 371), or the player advances to another hand that has been bet upon, and play advances to the third stage/level/hand out of step 372, shown in FIG. 27D.

Figure 27D:
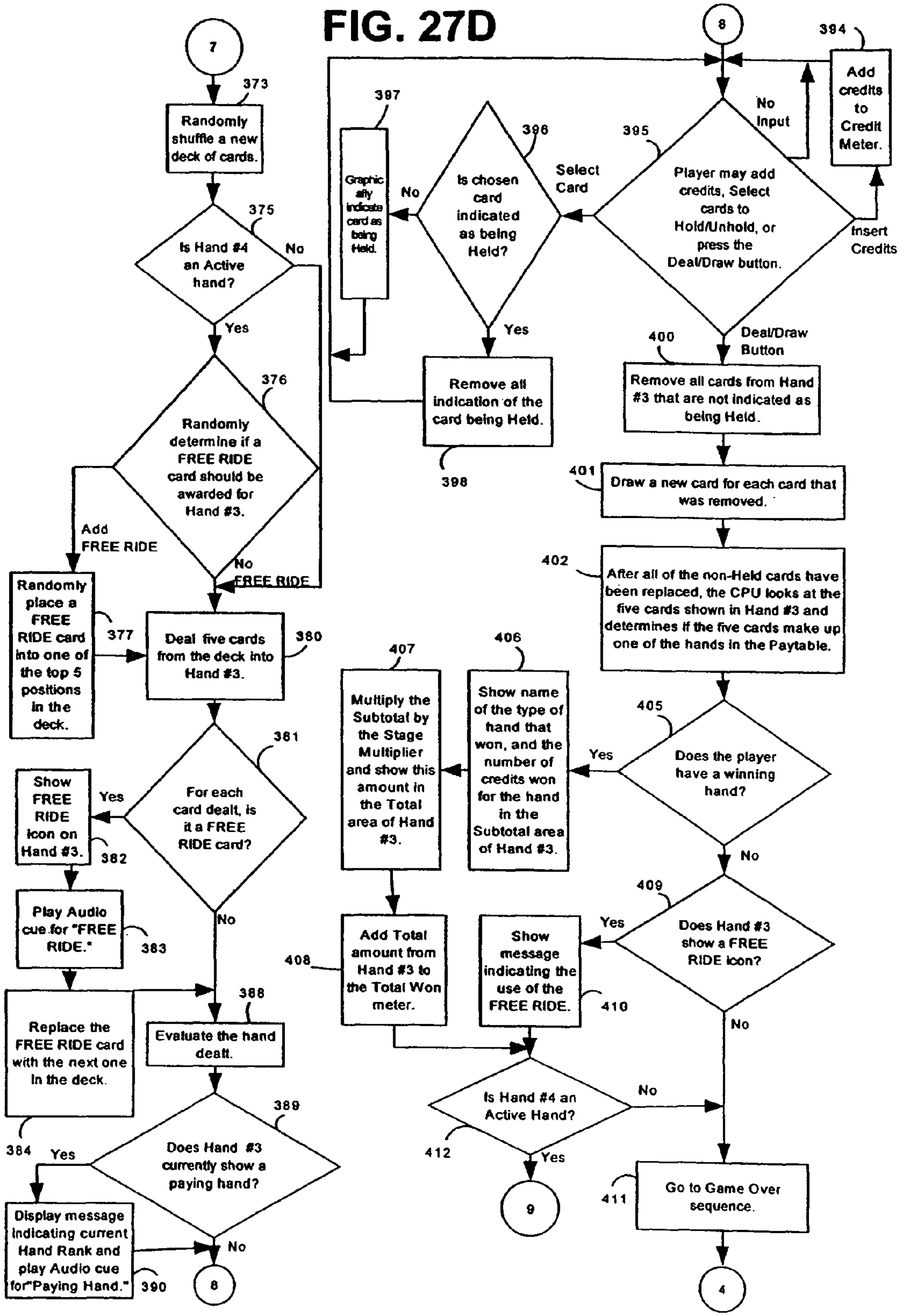
Figure 27E:
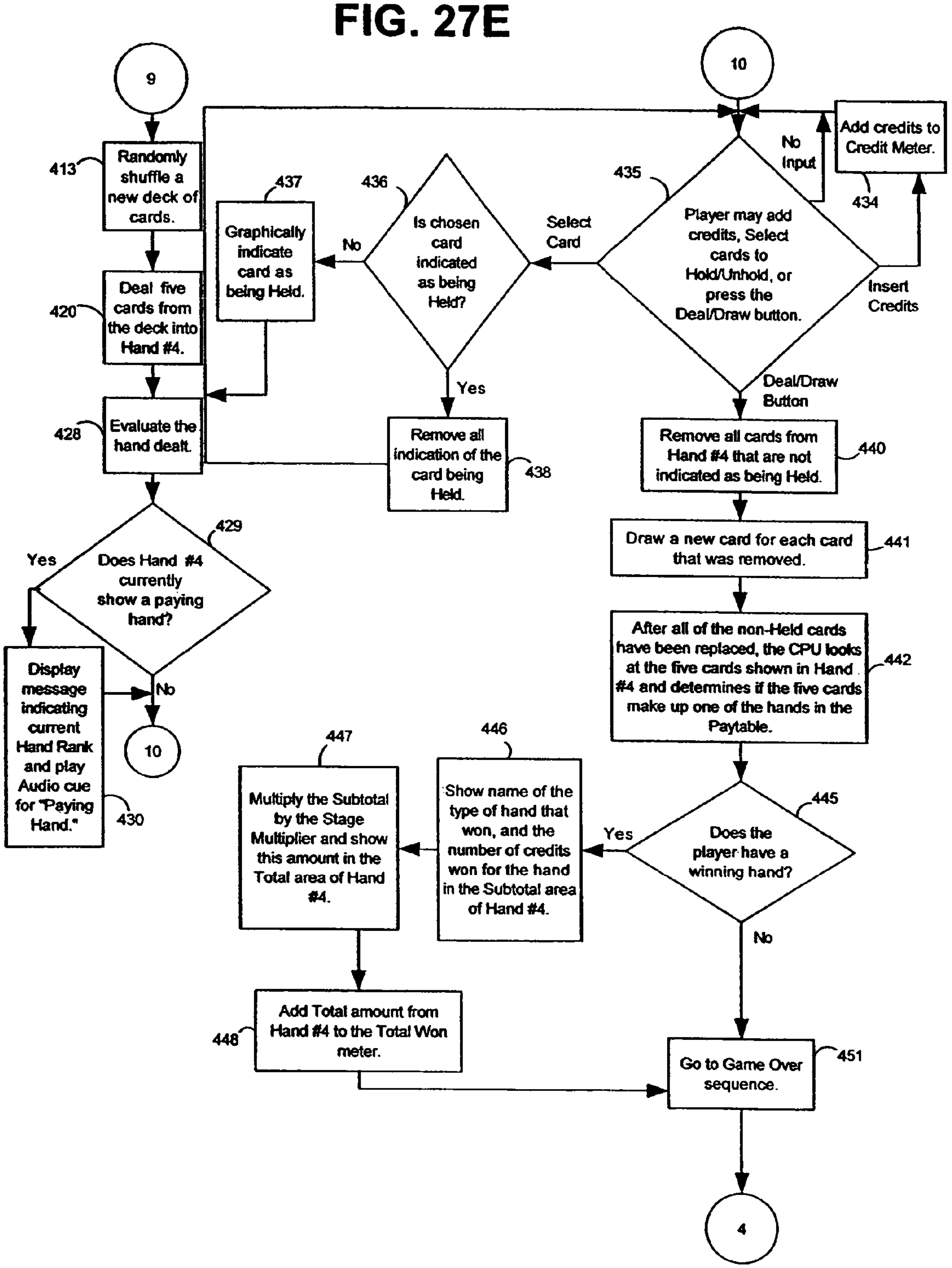

Referring now to FIG. 27D (and, e.g., FIG. 21), play continues for the third hand in the same manner as that described for the first and second hands, albeit now in view of third level play. Accordingly, and for ease of description, steps described as to the first level are related to their corresponding steps in the third level by grouping the respective steps as follows: 293/373, 295-297/375-377, 300-304/380-384, 308-310/388-390, 314-318/394-398, 320-322/400-402, 325-332/405-412. At this point, either the game is over, and the player is routed to the "Game Over" sequence (step 411), or the player advances to another hand that has been bet upon, and play advances to the fourth stage/level/hand out of step 412, shown in FIG. 27E.

Play of the fourth hand is similar to that described above, except that no "Free Ride" is available (this being the last hand in this particular embodiment of the game). Accordingly (and using the same convention for grouping like steps of the first and fourth levels for ease of description), cards are "shuffled" at step 413/293, dealt at step 420/300, and the hand is evaluated at step 428/308. If a winning hand is present (step 429/309), then a message is displayed at step 430/310.

Beginning with step 435, a "draw" sequence is again executed as described with respect to the first hand. In this fourth level, steps described for the first level draw sequence correspond to their fourth level counterparts as follows: 314-318/434-438, 320-322/440-442, and 325-328/445-448. Since there is no fifth level, the game proceeds to the "Game Over" sequence out of step 448 or step 445 at step 451.

Figure 27F:
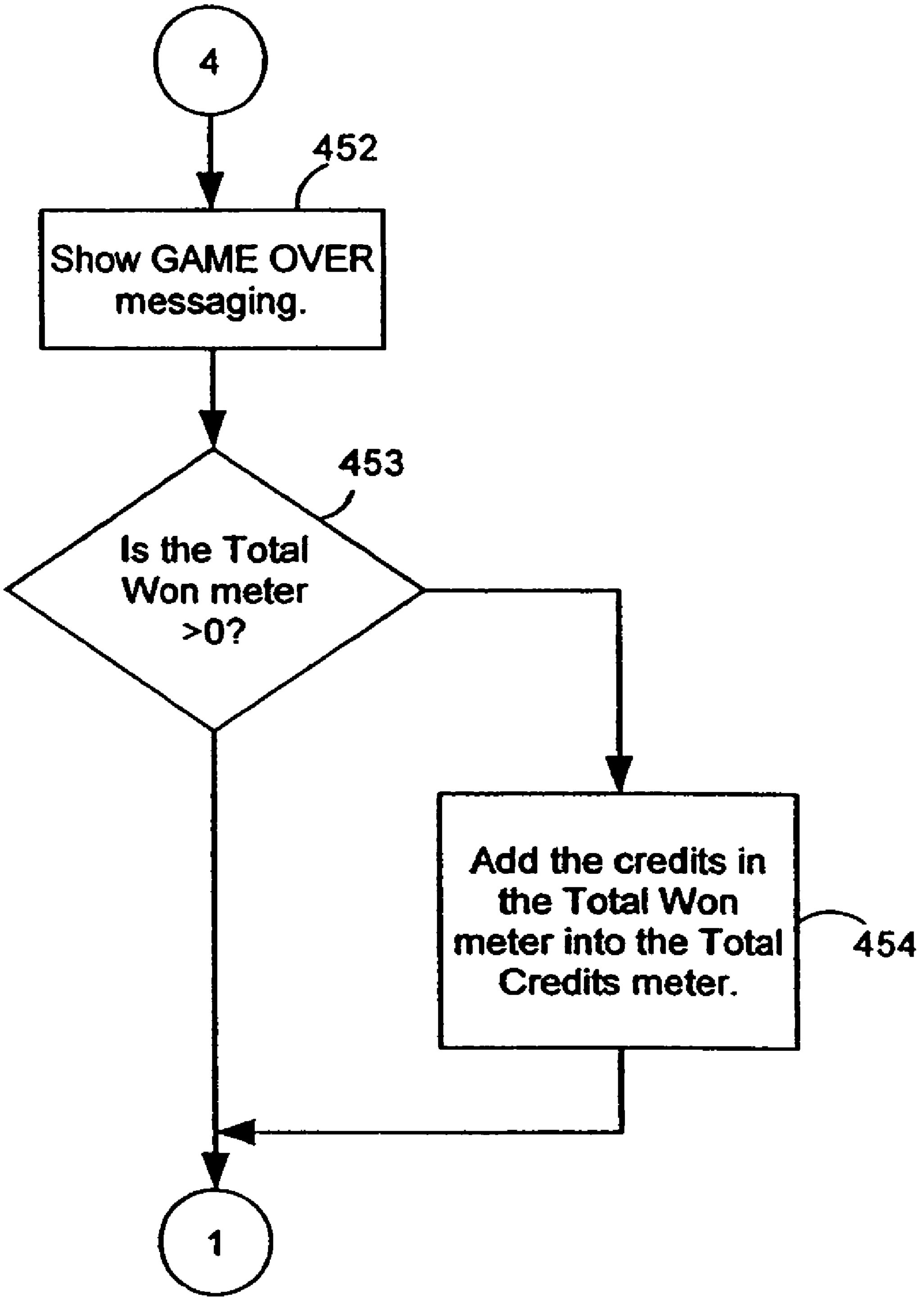

The "Game Over" sequence is set forth in FIG. 27F. A "GAME OVER" message is displayed by the graphics (step 452). The "Total Won" amount (meter 85 in FIG. 20) is checked, and if greater than zero (step 453), the credit(s) amassed as represented on the meter 85 are added to the "Total Credits" meter 87 at step 454. The player, and the game, are both returned to the game start up sequence out of step 453 (if nothing won) or step 454.

Bunco

Bunco, sometimes called Bunko, Bonko or Bonco, is a dice game that dates back to the mid 1800's in the United States. While there are many variations that are currently played, what follows is what appear to be very popular rules of the game.

Bunco is typically played in groups of eight to twenty players, usually women and occasionally couples as a social event. A group typically meets once a month, and plays at multiple tables of four players. Players seated across from each other are partners although it is typical to change partners for each game played. Each table has three dice that are passed around from player to player.

The game is played in "rounds". The first round starts with all tables rolling for a "point" of one. The dice move clockwise to each person at the table who gets to roll the dice. A team scores one point for each die that matches the current point (one in this case). Each time one or more dice match the current point, the player's team scores and the player continues to roll. If the player gets all three dice to match on a number other than the current point then that team scores five points and the player continues to roll. If the player gets all three dice to match the current point they yell out "Bunco" and the team is awarded twenty-one points.

Once a player rolls the dice showing no points, the turn ends. Each round continues with the dice going from player to player around the table. The game ends when a player at the first or head table reaches twenty-one points, which is usually indicated by ringing a hand-bell to signal all the tables that the round is over. At this point the players change partners and rotate through the tables based on the winners and losers, and the next game would play with a "point" of two.

This fourth embodiment of the current invention consists of a dice game that is loosely based on an individual player's turn during a round of Bunco. While this game may be played in a casino with live dealers (as is done with the casino game of Craps) or on a gaming machine that propels real physical dice, the preferred embodiment is on a video gaming machine.

Unlike the version of Bunco described above, in this fourth embodiment there may be up to three points which the player is trying to roll. Instead of being a single number, any number that has been rolled on every stage of the current game is an active point. On the first roll, each number that appears on a die becomes a point, for a possible total of three points if all three dice are different (that is, all six possible numbers are points for the first roll). On the second roll, the player must roll one or more points matching the first roll to keep the game going. Any numbers that were rolled on both the first and second rolls remain points for the third roll. The player continues to roll until no dice match a number found in all previous rolls, or until the highest stage upon which a bet has been placed is rolled.

Figure 28:
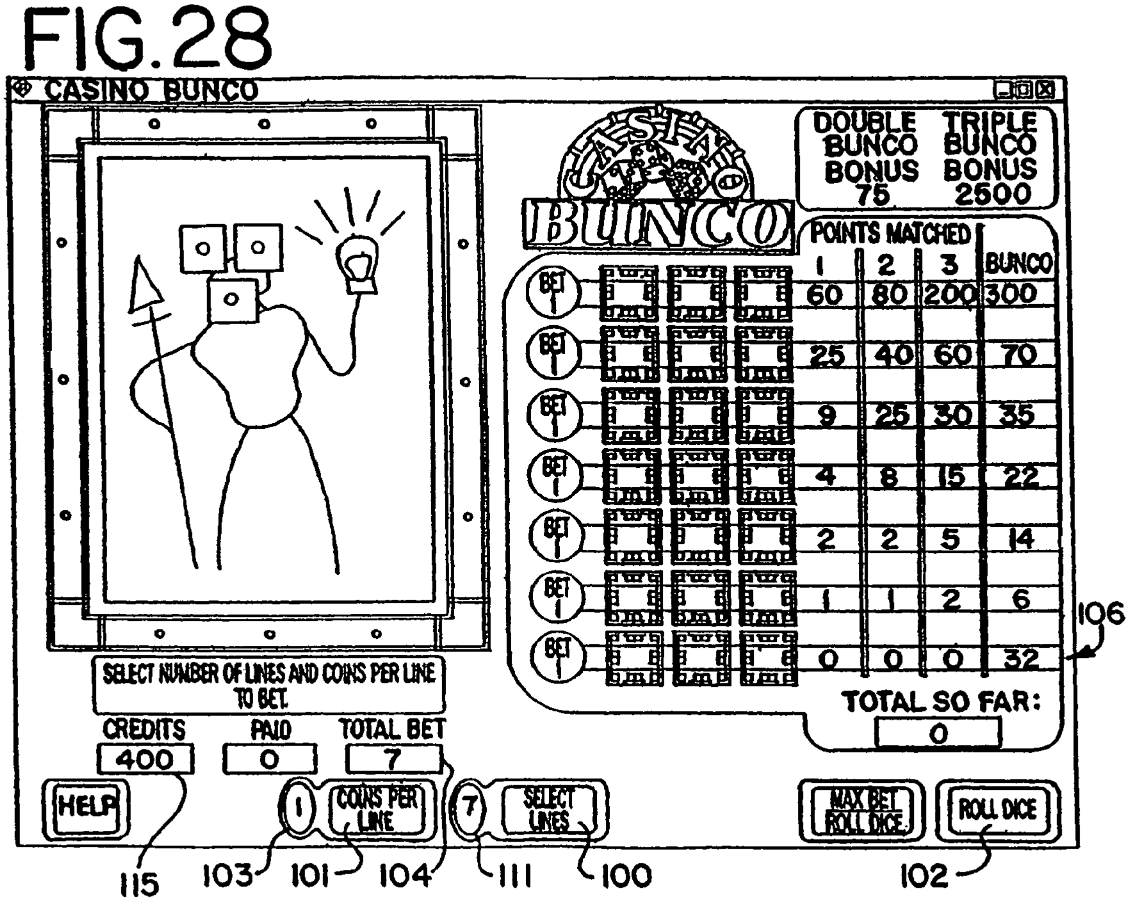
FIG. 28 is a video screen representation of a multi-stage video dice gaming machine embodiment of the present invention.

FIG. 28 shows a display of this fourth embodiment. A maximum of seven stages or rolls of the dice per game is provided. The game may allow more or fewer stages without departing from the invention. Each stage (level) of the game represents a roll of the dice as described above. The player may place a bet on from one to seven stages or lines. The player may bet from one to five coins per stage in this version. Of course, it is anticipated that different numbers of coins per stage could be allowed. Also, the player could be allowed to place bets on different stages at random, rather than from the bottom up. For that matter, the player could be allowed to make different size wagers on different stages at will, without departing from the invention.

Referring to FIG. 28, the "Select Lines" button 100 is pressed to select from one to seven stages to bet on. The "Coins per Line" button 101 is pressed to indicate the number of coins to bet on each line. The player then presses the "Roll Dice" button 102 to roll the dice for the first stage.

Figure 29:
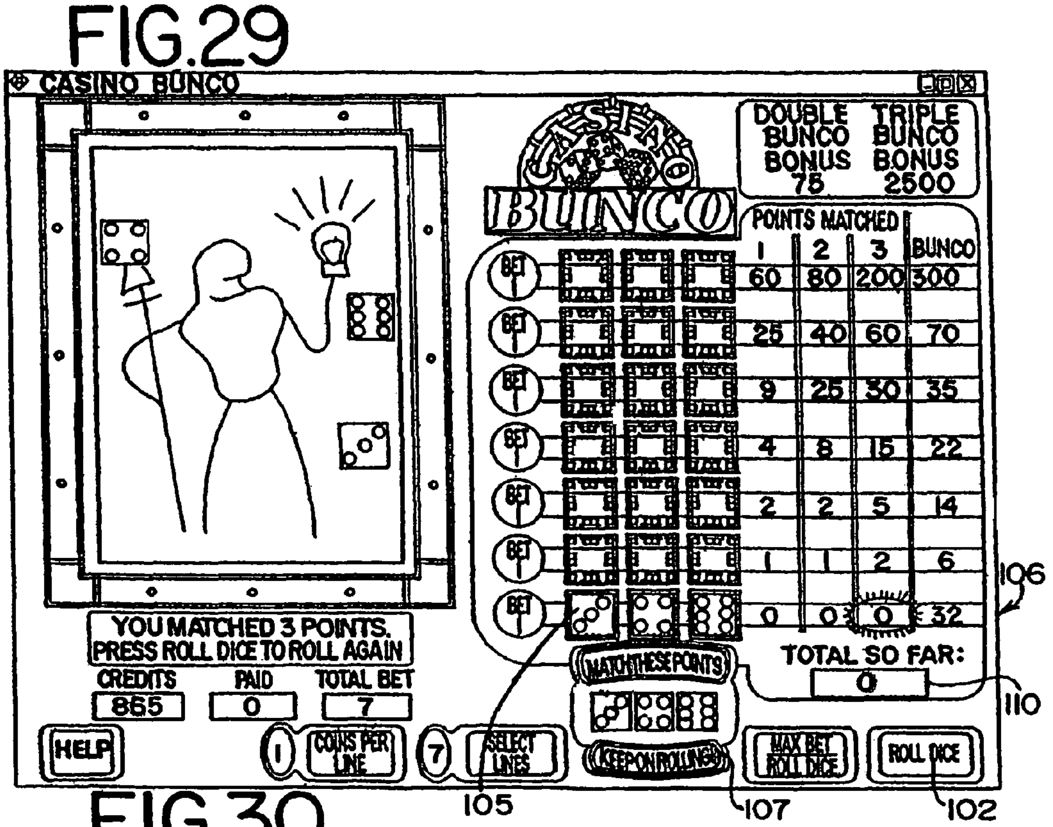
FIG. 29 is a video screen representation highlighting a first stage or roll of the dice of the dice gaming machine embodiment of FIG. 28.

FIG. 29 shows a game in progress after the first roll. This roll of 3-4-6 is placed in the first stage area 105 next to the applicable line of the paytable 106 for that stage (0,0,0,32). For each stage there are four paytable values. These values are for rolling one, two or three points or for rolling "Bunco," which is achieved when all three dice match one number which is an active point. Only the highest value is paid at each stage, so a "Bunco" does not also pay for three points matched. For the first roll (with all six numbers active) any combination of three matching dice is a "Bunco." Scoring a "Bunco" is the only way to win the first level bet, although in this game the player automatically advances to the second stage. It is envisioned that other embodiments could set the active points in advance of the first roll which would then require a match on the first roll to continue. A first stage "Bunco" awards thirty-two coins. The machine highlights the appropriate paytable value in the "3 points matched" column for this roll and shows the remaining points under the first stage line (107).

Figure 30:
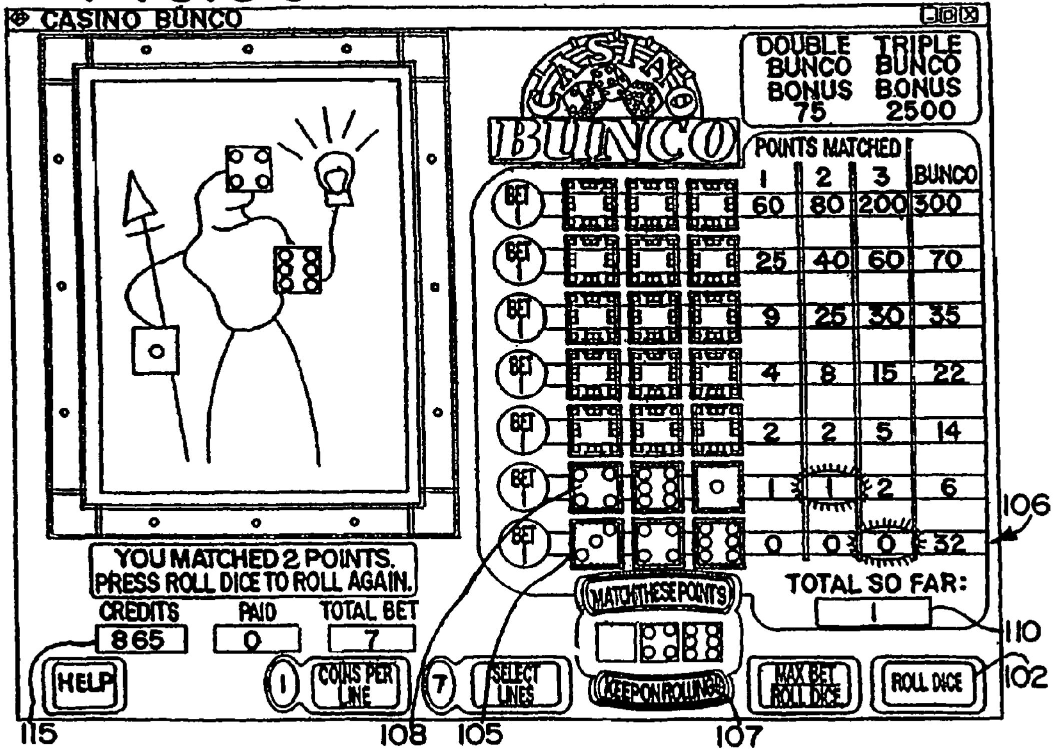
FIG. 30 is a video screen representation of a second stage of the play of the dice gaming machine embodiments of FIG. 28.

The player presses the "Roll Dice" button 102 for the second stage, and a possible result is shown in FIG. 30. The roll of 1-4-6 matches two of the three points that were established in the first roll. Thus, the points "4" and "6" remain "alive," i.e., in play (107). The point of "3" from the first roll is no longer alive because it does not appear in the second roll. The three dice are placed on the second stage line 108 next to the applicable paytable 106 values for that stage. The game highlights the "2 points matched" value in the paytable indicating that one coin is awarded for matching two points on the second stage. The "Total So Far" meter 110 is updated to show the total of one coin won at this point (zero coins on the first stage and one coin on the second stage). The window 107 under the first stage now shows that only the "4" and the "6" remain as active points.

Figure 31:
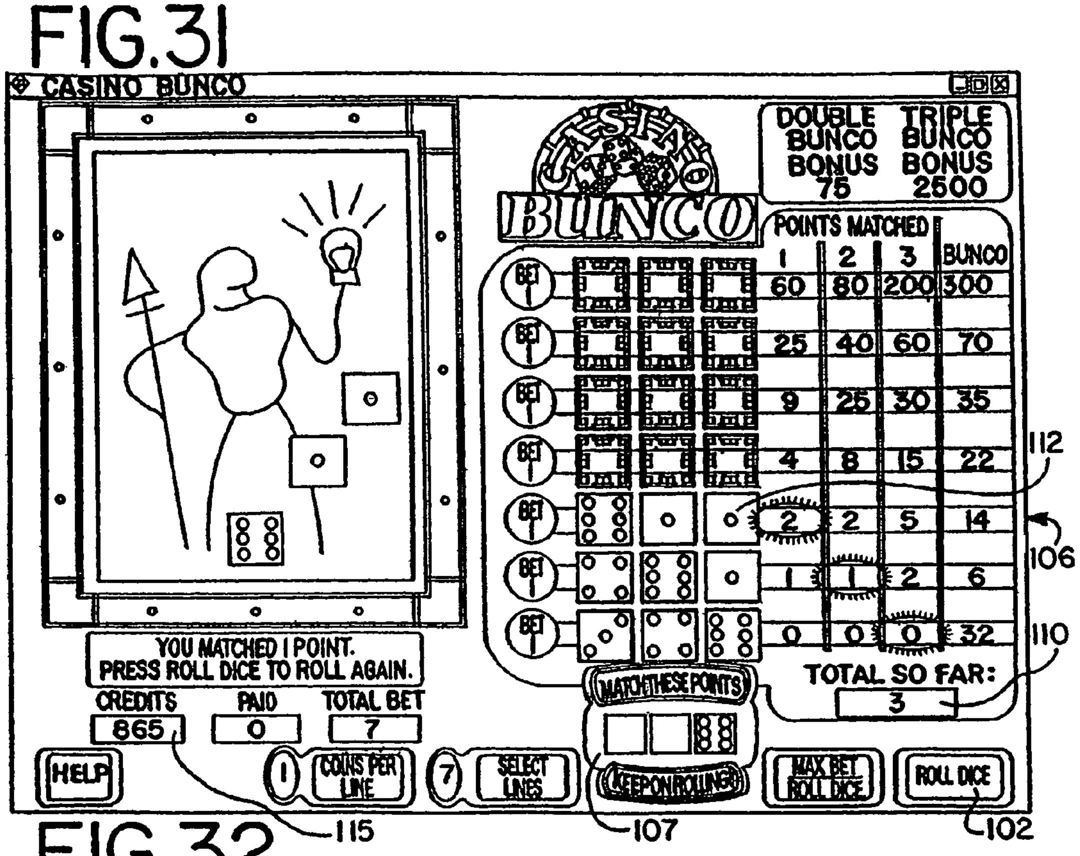
FIG. 31 is a video screen representation of a third stage of the play of the dice gaming machine embodiment of FIG. 28.

The player presses the "Roll Dice" button 102 for the third stage and a possible result is shown in FIG. 31. The roll of 1-1-6 matches one of the two points that were alive after the second roll. Thus, only the point "6" remains alive (107). The point of "4" from the first two rolls is no longer alive because it does not appear in the third roll. The three dice are placed on the third stage line 112 next to the paytable values for that stage. The game highlights the "1 point matched" value in the paytable indicating that two coins are awarded for matching one point on the third stage. The "Total So Far" meter 110 is updated to show the total of three coins won at this point (zero coins on the first stage, one coin on the second stage and two coins on the third stage). The window 107 under the first stage now shows that only the "6" remains as an active point.

Figure 32:
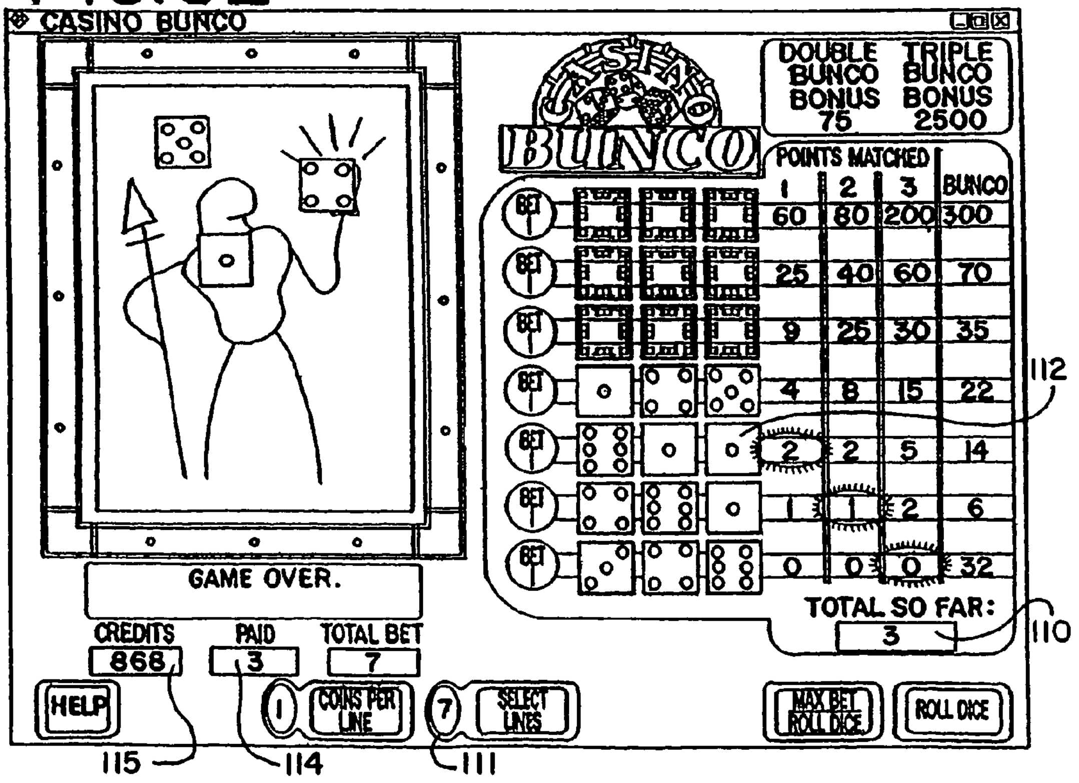
FIG. 32 is a video screen representation of a fourth stage of the play of the dice gaming machine embodiment of FIG. 28.

The player presses the "Roll Dice" button 102 for the fourth stage and a possible result is shown in FIG. 32. The roll of 1-4-5 does not match the point of "6," which was the only point left alive. While "4" was an active point after the first two rolls, the absence of a "4" on the third roll took it out of play as a point, and thus was of no value in the fourth roll. As a result of matching no points the game is over. The "Total So Far" meter 110 value of three coins is copied to the "Paid" window 114, and this is added to the credits counter II 5 taking it from an arbitrary "865" to "868" credits.

It should be noted that in the example shown, the bets for levels above the fourth level were lost without those levels being played. As is intuitive and will be shown in the following analysis, the higher the level, the less often it will be played. This is offset by offering the player very large awards for very modest events on these higher levels when they are played.

It should also be noted that while the slot machine and poker embodiments previously discussed have stages that are independent games that allow advancing to the next stage upon winning, this fourth Bunco embodiment is an ongoing game with stages that, as a result of the nature of the game, also involve multi-stage betting working with an evolving game. This game is not limited to advancing to the next stage only with a win, since the game will always play the second stage if two or more stages have been bet upon, even though, except for a first stage "Bunco", the player will not win on the first stage.

Figure 33:
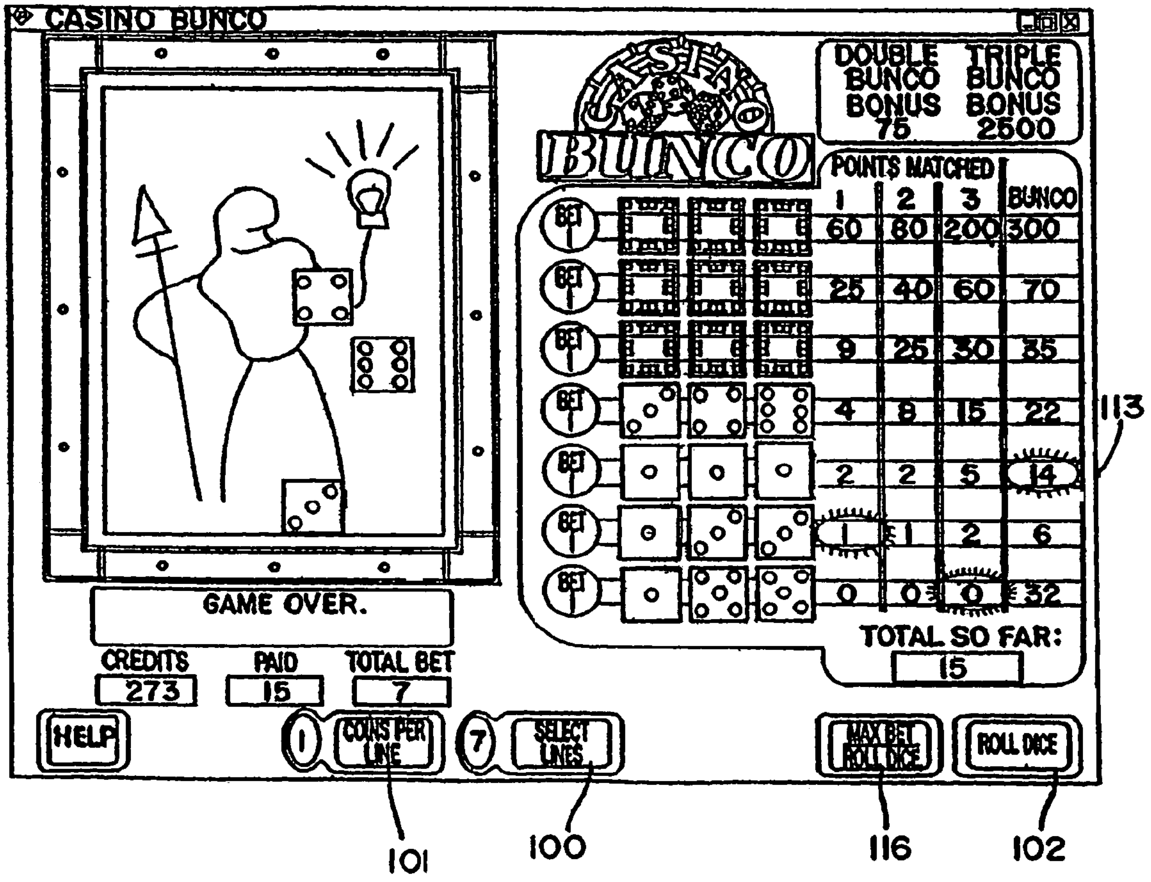
FIG. 33 is another video screen representation of the dice gaming machine embodiment of FIG. 28.

FIG. 33 shows another Bunco game at its conclusion. The first roll of 1-5-5 established only two points as a result of the duplicate 5's. The second roll of 1-3-3 kept only the point of "1" alive. The third roll of 1-1-1 is "Bunco" scoring fourteen coins. The fourth roll of 3-4-6 does not match the point of "1", and thus ends the game. A total of fifteen coins were won on this game (one for matching one point on the second stage and fourteen for "Bunco" on the third stage).

Looking at FIG. 33, the "Max Bet/Roll Dice" button 116 is also seen. This button 116 establishes the maximum bet, which in this embodiment is thirty-five coins, (seven stages times five coins per stage) and then rolls the dice for the first stage. Pressing this button 116 is the same as pressing the "Select Lines" button 100 until seven lines are selected, and then pressing the "Coins per Line" button 101 until five coins per line are selected, and then finally pressing the "Roll Dice" button 102 to roll the dice for the first stage.

Shown in the upper right section of FIG. 33 are the bonuses for games that achieve two "Buncos" and three "Buncos": "75" coins and "2500" coins respectively. These bonuses add excitement to the game, as well as the opportunity to win a more sizable award than is available from the seven stages of the game.

Figure 34A:
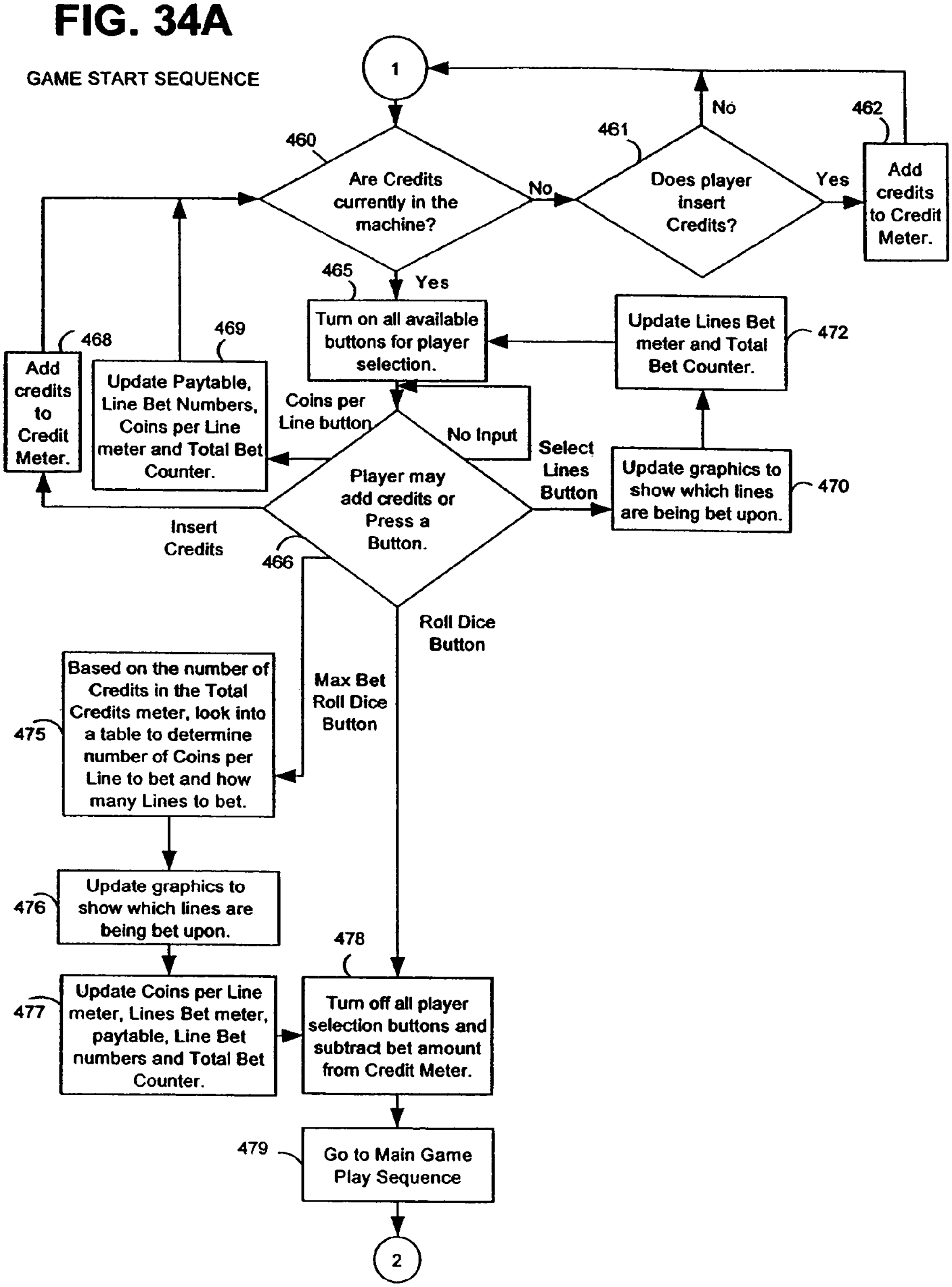
FIGS. 34*a*-34*d* present flow charts for a method of operating a video dice gaming machine of the present invention.

The foregoing Bunco gaming machine is operationally summarized in the flow charts of FIGS. 34A through 34D. FIG. 34A generally describes the start-up of the Multi-Strike BUNCO game embodiment, which is initially quite similar to that of the first (slots) embodiment. First, an assessment of whether credit(s) are present is undertaken beginning at step 460. If none is present, then a check is made as to whether the player has inserted the relevant coin, credit card, etc., for the necessary credit(s) at step 461. If so, then at step 462 the credit(s) are registered and displayed at the "Credits" meter 115 (e.g., FIG. 28). All available player buttons are then activated for initiation of play at 465.

At this stage, the player enters a set-up loop where the player may choose to add more credits or proceed with play at step 466. If credits are added, these are registered on the meter display (115) at step 468. The program loops back to step 466.

The "Coins per Line" button 101 can alternatively be engaged from step 466, causing the coins-per-line setting to be modified (as indicated at meter 103, FIG. 28), as well as updating the value of the "Total Bet" window 104, and the paytable information window 106, all as indicated at step 469. Once again, the program loops back to step 466.

Back at step 466, the player can choose the "Select Lines" button 100 to input this aspect of his or her wager. Graphics are updated at step 470 to highlight the lines which are now "active" (i.e., potentially playable). This likewise causes the lines bet meter 111 and "Total Bet" 104 to be so modified, all as indicated at step 472. The program once again loops back to step 466.

Once the player has input the parameters of the wager, then the "Roll Dice" button 102 is engaged. It should be noted that the foregoing selection sequence as to coins and lines to bet need not follow the order indicated.

The player has the option of skipping all of the lines and coins-per-line selections, through resort to the "Max Bet Roll Dice" button 116 (FIG. 33). A subroutine will then execute at step 475 to assess the total credits the player has provided, and determine the maximum number of coins per line and the maximum number of lines (per an embedded look-up table) which can be played for that credit quantity, up to a fixed maximum for the game. The graphics are updated accordingly at steps 476 and 477 to show the lines being bet, coins-per-lines and total bet (as at steps 469, 470 and 472). Either out of step 477 or after actuation of the "Roll Dice" button 102, the player selection buttons are deactivated (step 478), the sum of the wager is subtracted from the "Credits" meter 115 and the new amount is displayed. The game then progresses to a main play sequence (step 479).

Figure 34B:
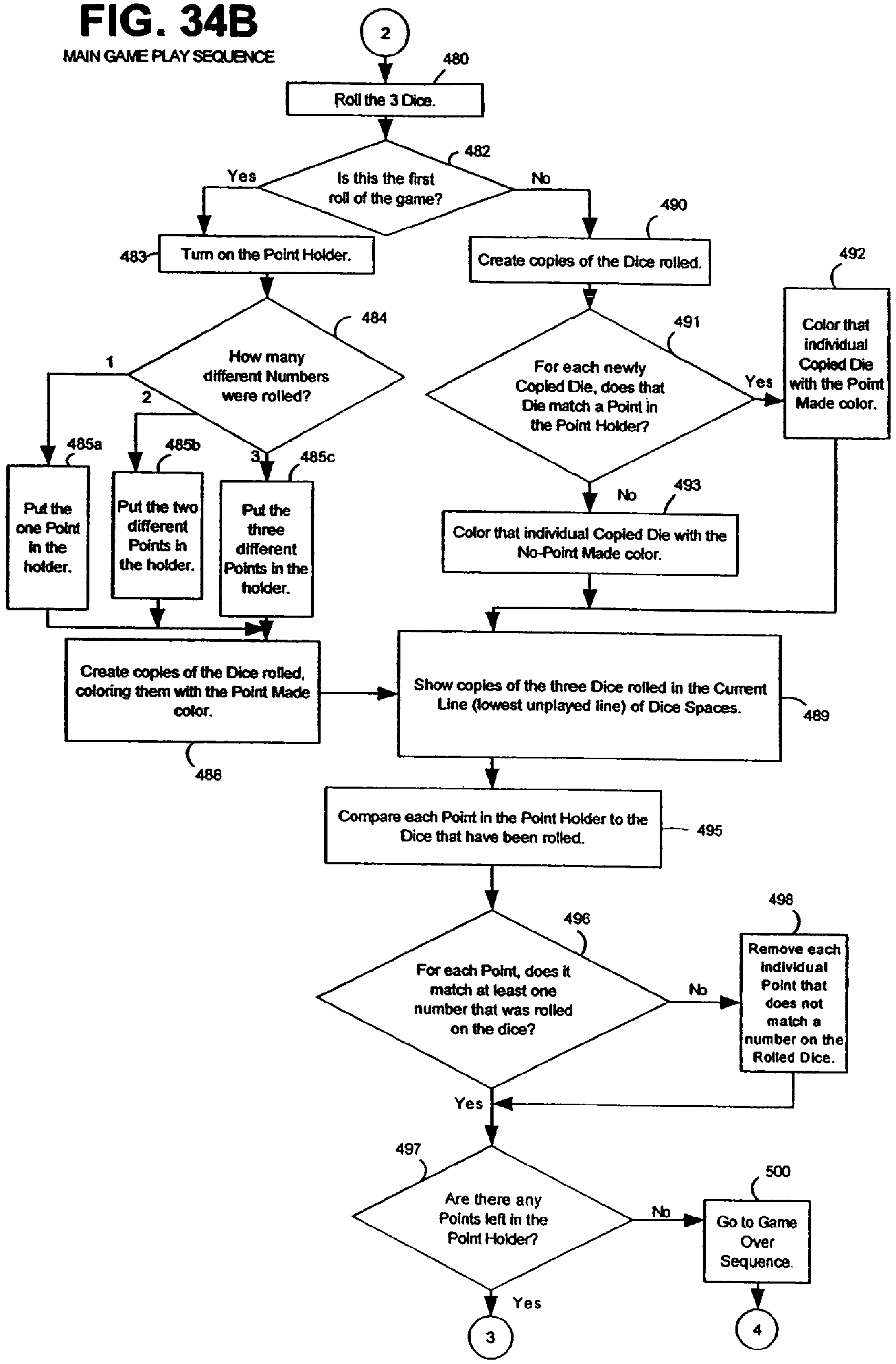

The dice are rolled at step 480, as shown in FIG. 34B. The program assesses whether this is the first roll of the game (step 482). If it is the first roll, then "Match these POINTS" window 107 (e.g., see FIG. 29) is activated at step 483, and a determination is made as to how many different numbers are presented by the rolled dice (step 484). The different "Points"

are then displayed in the window 107, depending on whether there are one, two or three different numbers (steps 485*a* through 485*c*). The graphics of the program generates copies of the dice rolled, with a color hue to indicate a "Point Made" at step 488, and the dice are displayed in the current stage/level/roll (step 489), which here is the first level 105.

If this is not the first roll of the game (step 482), then copies of the dice just rolled are generated at step 490. The program executes a comparison of the numbers (dice) in the window 107 (which are the Points to match), with the dice just rolled at step 491. If there is a match, the graphics of the program colors a copy (or copies) of the matching die rolled with a hue to indicate a "Point Made" at step 492. For each match not made, the die (dice) is colored with a hue to indicate that no match/Point was made (step 493), and the dice are displayed as so hued in the current stage/level/roll (step 489).

From step 489, another comparison is then made at step 495 between the current roll and the Point(s) to be matched/made. Each Point in the window 107 is assessed as to a match on a die (number) of the current roll at step 496. If at step 496 there is no match for a Point, it is removed from the game and the graphics of window 107 are updated accordingly, at step 498. The program then assesses whether there is any Point remaining (step 497), and the game proceeds to a "Bunco" determination if the answer to the foregoing is positive. If there are no Points remaining (window 107), the player is passed to a "Game Over" sequence at step 500.

Figure 34C:
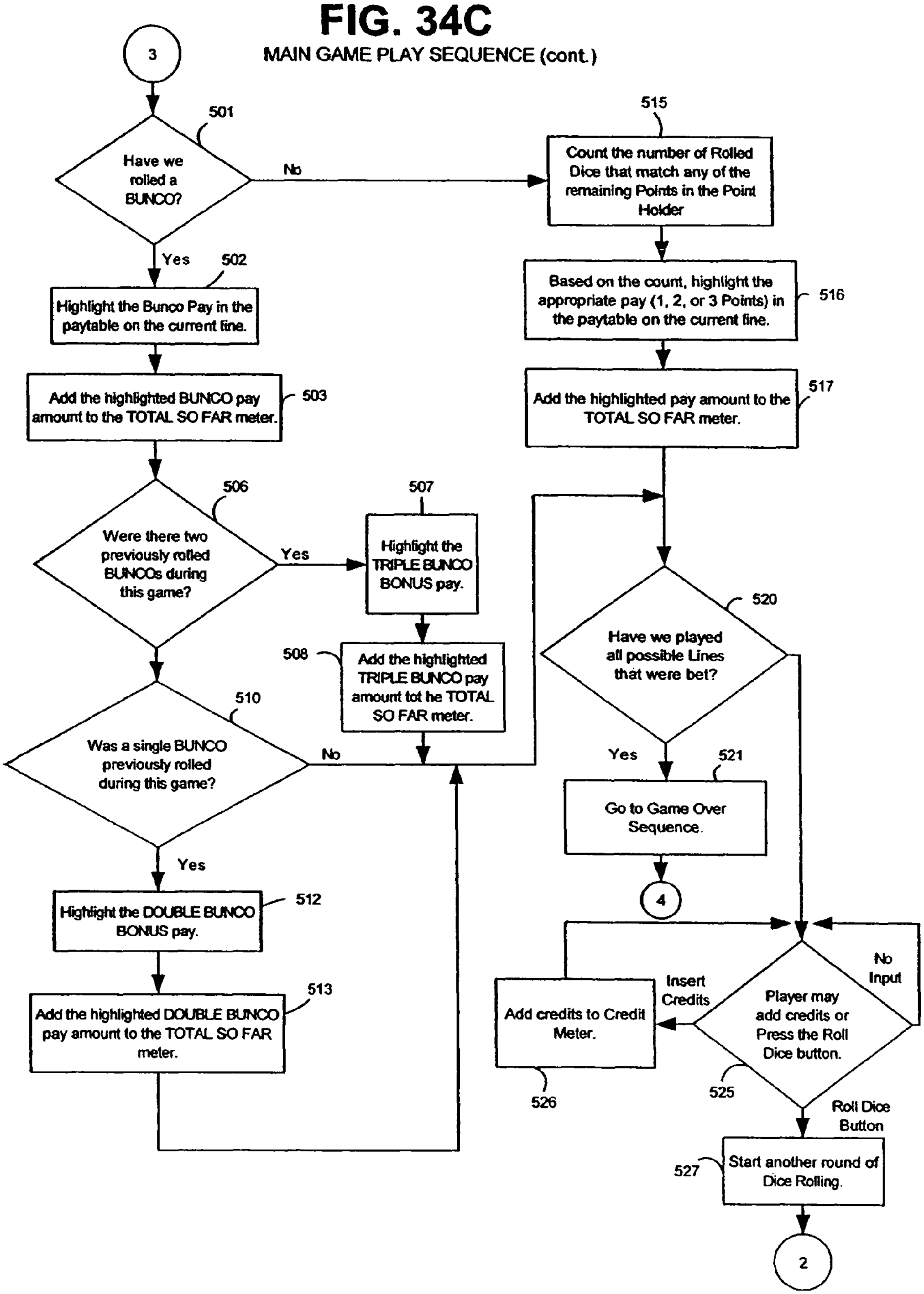

The "Bunco" assessment is set forth in FIG. 34C. The program first assesses whether a "Bunco" has been rolled at step 501. If the evaluation is positive, then the graphics highlight the "BUNCO" pay (see, e.g., 113 in FIG. 33) for the current level (step 502). That "BUNCO" pay amount is added to the "Total So Far" meter 110 at step 503.

The program then determines whether two "Bunco's" had previously been rolled in the same game at step 506. If "yes," then the "Triple BUNCO BONUS" is highlighted on the screen (step 507), and the predetermined amount for that bonus is added to the "Total So Far" meter 110 at step 508.

If two "Bunco's" have not been registered at step 506, the program makes a determination as to whether one "Bunco" had previously been scored at step 510. If "yes," then the "Double BUNCO BONUS" is highlighted on the screen (step 512), and the predetermined amount for that bonus is added to the "Total So Far" meter 110 at step 513.

Back at step 501, if a "Bunco" has not been rolled, then a count is made of the number of rolled dice that match any of the remaining Points in the window 107 (step 515). That count is used to highlight the appropriate pay for that level for that number of points in the paytable information window as indicated at step 516. That amount is added to the meter 110 at step 517.

Out of either step 508, 513 or 517, the player then advances to step 520, which is a program assessment as to whether all lines that have been bet on have been played. If all have been played, then the game is over and the "Game Over" sequence is engaged out of step 521.

If all possible lines have not been played, then the player is given the option of adding more credits and/or continuing through actuation of the "Roll Dice" button 102 at step 525. If the choice is to add credits, then the "Credits" meter is so updated at step 526, and the player is looped back to step 525. If the choice is to roll, then another round is started (step 527) upon actuation of the button 102, whereupon the sequence of events beginning at step 480 recommences.

Figure 34D:
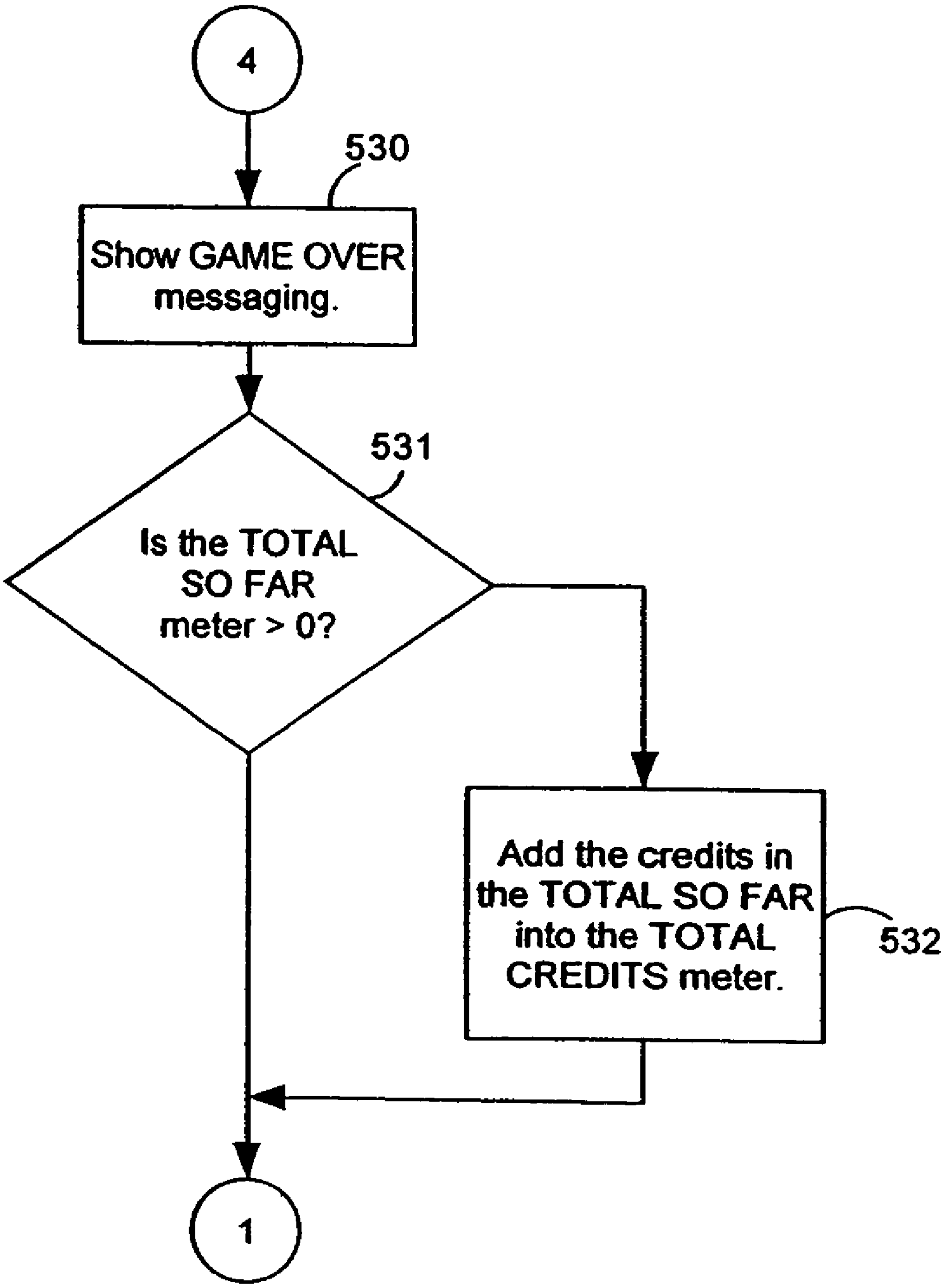

Once all lines have been played or there are no Points left in the window 107 (i.e., no match at a level), then the "Game Over" sequence of FIG. 34D is engaged. A "GAME OVER" message is displayed at step 530, and a determination is made as to whether the "Total So Far" meter 110 shows any credits (i.e., any winnings for the game) at step 531. Any winnings as shown in meter 110 are then added to the total "Credits" meter 115 (step 532), and the player and the program are returned to the game start sequence at step 460.

Analysis of Certain Architecture of the Bunco Embodiment

The mathematical payout percentage of this fourth embodiment is determined by breaking down the different possible combinations for each of the seven stages. This will be done for one coin per line only, as it is well known by those skilled in the art how to expand this result for multiple coins per line, as well as the inclusion of bonus values, if desired. The first stage is fairly easy to analyze. There are three possible types of outcome of the first roll: "Bunco" (equivalent to one point established), two points established or three points established. There are two hundred and sixteen possible combinations of three dice computed by multiplying the possible combinations of each die: 6×6×6=216. The number of occurrences of "Bunco" or three dice that match are six. This is computed as 6×1×1 because the first die can take any of the six numbers, then the second die must match that number and the third die must also match that number. Three points are established when all three of the dice have a different number showing, and is computed by 6×5×4=120 because the first die can take on any value while the second die can take on any of the five remaining values that don't match the first die, and the third die can then take on any of the remaining values that don't match the first two dice.

This leaves ninety occurrences of a combination that results in two points (216−6−120=90). The ninety occurrences of two points can also be computed directly as follows: There are three forms that a roll resulting in two points may take: XYX, XXY or YXX. The combinations for these are as follows:

XYX=6×5×1=30 First can be any, second must not match first, third must match first.

XXY=6×1×5=30 First can be any, second must match first, third must not match first.

YXX=5×6×1=30 First can be any but X, second can be any, third must match second.

Table 21 organizes the data described above. The first column indicates the number of points established by the first roll. The second column shows the value paid for that result. The third column shows the "Occurrences" of that result which was determined above. The fourth column is the probability of that result, which is the occurrence count divided by 216, the number of possible outcomes. The fifth column is the Expected Value component from each pay, which is the product of the paytable value times the probability of receiving that value. The sum of all EV components is the expected return of the stage, which is 88.89%. If only stage one was played, then the expected return to the player would be 88.89%. The payout percentage may be modified by making a change to the second column "Pay" value, which would also change in the paytable. For example, changing the pay for "Bunco" (one point established) from "32" to "33" would result in a 91.67% expected return. Unlike the slot machine example, the "Occurrence" data is locked into the rules of the game, and any change to the payout will be apparent to the player. It must be done by modifying the paytable as described above, or by changing the rules of the game.

TABLE 21

| Number of Points | Pay | Occurrences | Probability | EV |
|---|---|---|---|---|
| 1 | 32 | 6 | 0.027777778 | 0.888889 |
| 2 | 0 | 90 | 0.416666667 | 0 |
| 3 | 0 | 120 | 0.555555556 | 0 |
| | | 216 | 1 | 0.888889 |

The second stage of the game has three separate analyses based on the number of points established in the first stage of the game. The "Occurrences" for each row in Table 22 (the fourth column) are calculated in the same manner as shown for the first stage and will not be elaborated on further. The first column of Table 22 states the number of points alive at the start of the second stage. This table has three separate analyses based on whether one, two or three points were alive at the start of the second stage.

The second column shows the combination being enumerated. The three possible points are called "A", "B" and "C". "x" indicates a die that matches no point. The "Comb. Column" shows the makeup of the dice for that line of the table. For example, AAA is three dice matching point "A". The BBA is two dice matching point "B" and one die matching point "A", and this can occur in any order. The third column indicates the amount paid for the specified combination. This is based on the second stage paytable line of 1,1,2,6 (e.g., FIG. 30) awarding one coin for matching one or two points, two coins for matching three points in a non-"Bunco" combination and six coins for all three dice matching the same point ("Bunco"). The fourth column indicates the number of occurrences of the specified combination out of the possible two hundred and sixteen combinations. The fifth column is the probability of that occurrence and is the quotient of the occurrences and the two hundred and sixteen possible combinations. The sixth column is called "Probability of Start Condition". This is the probability of starting the second stage with the number of points shown in the first column. This number is taken directly from Table 21.

The seventh column is the probability of the specified "Result" occurring, which is the product of the fifth and sixth columns. This result is due to the need for the probability of the sixth column to start the stage with the number of points specified in the first column, as well as the need for the probability of the combination, which is given in the fifth column.

The eighth column is the expected value contribution from this combination which is computed as the product of the "Pay" value times the seventh column "Probability of this Result". The sum of all values in the eighth column provides the expected return which is 92.28%.

The ninth column is the number of points still alive after the roll. This is represented by the number of unique capitalized letters in the second column combination.

The last four columns are used to determine the probability of the number of points alive at the end of the stage. The seventh column "Probability of This Result" value is copied to the column that corresponds to the ninth column "Points Alive" number. For example, for AAA there is one point alive which results in the 0.00013 value to be copied from the seventh column to the eleventh column, which is the column that calculates the "Probability that Points Left=1".

The bolded numbers at the bottom of the last four columns of Table 22 tally the probability of ending the second round with the number of Points specified at the head of the column. For example, of the games that play a second stage (which is all games in this embodiment), 24.31% will finish the second stage with two points active.

TABLE 22

| Points Alive at Round Start | Comb. | Pay | Occur. | Probability of Occurrence | Probability of Start Condition | Prob. Of This Result | EV | Points Alive After Roll | Prob. That Points Left = 0 | Prob. That Points Left = 1 | Prob. That Points Left = 2 | Prob. That Points Left = 3 |
|---|---|---|---|---|---|---|---|---|---|---|---|---|
| 1 | AAA | 6 | 1 | 0.00462963 | 0.02777778 | 0.000129 | 0.000772 | 1 | | 0.00013 | | |
| 1 | AAx | 1 | 15 | 0.06944444 | 0.02777778 | 0.001929 | 0.001929 | 1 | | 0.00193 | | |
| 1 | Axx | 1 | 75 | 0.34722222 | 0.02777778 | 0.009645 | 0.009645 | 1 | | 0.00965 | | |
| 1 | xxx | 0 | 125 | 0.5787037 | 0.02777778 | 0.016075 | 0 | 0 | 0.01608 | | | |
| | | | 216 | 1 | | | | | | | | |
| 2 | AAA | 6 | 1 | 0.00462963 | 0.41666667 | 0.001929 | 0.011574 | 1 | | 0.00193 | | |
| 2 | BBB | 6 | 1 | 0.00462963 | 0.41666667 | 0.001929 | 0.011574 | 1 | | 0.00193 | | |
| 2 | AAB | 2 | 3 | 0.01388889 | 0.41666667 | 0.005787 | 0.011574 | 2 | | | 0.00579 | |
| 2 | BBA | 2 | 3 | 0.01388889 | 0.41666667 | 0.005787 | 0.011574 | 2 | | | 0.00579 | |
| 2 | AAx | 1 | 12 | 0.05555556 | 0.41666667 | 0.023148 | 0.023148 | 1 | | 0.02315 | | |
| 2 | BBx | 1 | 12 | 0.05555556 | 0.41666667 | 0.023148 | 0.023148 | 1 | | 0.02315 | | |
| 2 | ABx | 1 | 24 | 0.11111111 | 0.41666667 | 0.046296 | 0.046296 | 2 | | | 0.0463 | |
| 2 | Axx | 1 | 48 | 0.22222222 | 0.41666667 | 0.092593 | 0.092593 | 1 | | 0.09259 | | |
| 2 | Bxx | 1 | 48 | 0.22222222 | 0.41666667 | 0.092593 | 0.092593 | 1 | | 0.09259 | | |
| 2 | xxx | 0 | 64 | 0.2962963 | 0.41666667 | 0.123457 | 0 | 0 | 0.12346 | | | |
| | | | 216 | 1 | | | | | | | | |
| 3 | AAA | 6 | 1 | 0.00462963 | 0.55555556 | 0.002572 | 0.015432 | 1 | | 0.00257 | | |
| 3 | BBB | 6 | 1 | 0.00462963 | 0.55555556 | 0.002572 | 0.015432 | 1 | | 0.00257 | | |
| 3 | CCC | 6 | 1 | 0.00462963 | 0.55555556 | 0.002572 | 0.015432 | 1 | | 0.00257 | | |
| 3 | AAB | 2 | 3 | 0.01388889 | 0.55555556 | 0.007716 | 0.015432 | 2 | | | 0.00772 | |
| 3 | AAC | 2 | 3 | 0.01388889 | 0.55555556 | 0.007716 | 0.015432 | 2 | | | 0.00772 | |
| 3 | BBA | 2 | 3 | 0.01388889 | 0.55555556 | 0.007716 | 0.015432 | 2 | | | 0.00772 | |
| 3 | BBC | 2 | 3 | 0.01388889 | 0.55555556 | 0.007716 | 0.015432 | 2 | | | 0.00772 | |
| 3 | CCA | 2 | 3 | 0.01388889 | 0.55555556 | 0.007716 | 0.015432 | 2 | | | 0.00772 | |
| 3 | CCB | 2 | 3 | 0.01388889 | 0.55555556 | 0.007716 | 0.015432 | 2 | | | 0.00772 | |
| 3 | ABC | 2 | 6 | 0.02777778 | 0.55555556 | 0.015432 | 0.030864 | 3 | | | | 0.01543 |

TABLE 22-continued

| Points Alive at Round Start | Comb. | Pay | Occur. | Probability of Occurrence | Probability of Start Condition | Prob. Of This Result | EV | Points Alive After Roll | Prob. That Points Left = 0 | Prob. That Points Left = 1 | Prob. That Points Left = 2 | Prob. That Points Left = 3 |
|---|---|---|---|---|---|---|---|---|---|---|---|---|
| 3 | ABx | 1 | 18 | 0.08333333 | 0.55555556 | 0.046296 | 0.046296 | 2 | | | 0.0463 | |
| 3 | ACx | 1 | 18 | 0.08333333 | 0.55555556 | 0.046296 | 0.046296 | 2 | | | 0.0463 | |
| 3 | BCx | 1 | 18 | 0.08333333 | 0.55555556 | 0.046296 | 0.046296 | 2 | | | 0.0463 | |
| 3 | AAx | 1 | 9 | 0.04166667 | 0.55555556 | 0.023148 | 0.023148 | 1 | | 0.02315 | | |
| 3 | BBx | 1 | 9 | 0.04166667 | 0.55555556 | 0.023148 | 0.023148 | 1 | | 0.02315 | | |
| 3 | CCx | 1 | 9 | 0.04166667 | 0.55555556 | 0.023148 | 0.023148 | 1 | | 0.02315 | | |
| 3 | Axx | 1 | 27 | 0.125 | 0.55555556 | 0.069444 | 0.069444 | 1 | | 0.06944 | | |
| 3 | Bxx | 1 | 27 | 0.125 | 0.55555556 | 0.069444 | 0.069444 | 1 | | 0.06944 | | |
| 3 | Cxx | 1 | 27 | 0.125 | 0.55555556 | 0.069444 | 0.069444 | 1 | | 0.06944 | | |
| 3 | xxx | 0 | 27 | 0.125 | 0.55555556 | 0.069444 | 0 | 0 | 0.06944 | | | |
| | | | 216 | 1 | | | | | | | | |
| | | | | | EV of second Stage: | | 0.92284 | | | | | |
| | | | | | Prob. Of Start Cond. For Next Stage | | | | 0.20898 | 0.53254 | 0.24306 | 0.01543 |
| | | | | | Total of 4 probability values above | | | | | | | 1 |

Table 23 provides a similar analysis for the third stage of the game. The first two columns are the same. The third column has been modified to reflect the 2-2-5-14 (e.g., FIG. 31) paytable values for the third stage. The fourth column is the same as Table 22.

The fifth column uses the "Probability of Start Condition" for the specified number of points taken from the bottom of Table 22. Those numbers at the bottom of Table 22 show the probability of ending the second stage with zero, one, two or three points. The values in the rest of the columns are calculated in the same manner as was described for Table 22.

Looking at the sum of the "EV" column, it is clear that the expected return for the third stage of the game is 90.24%. The right four columns are used to compute the probability of zero, one, two or three points remain alive after the third stage. Note that the sum of these probability values does not total 1.0, but rather 0.79102. The additional component is the 0.20898 found at the bottom of Table 22 under "Probability that Points Left=0". This represents games that ended after two stages and thus are not reflected in the stage three ending breakdown. In the same manner, the 0.3821 probability of ending the game in the third stage will not be included in the stage four ending breakdown.

The analysis for stages four through seven is done in a manner identical to stage three. The comparable tables for these stages are therefore not shown.

TABLE 23

| Points Alive at Round Start | Comb. | Pay | Occur. | Probability of Occurrence | Probability of Start Condition | Prob. Of This Result | EV | Points Alive After Roll | Prob. That Points Left = 0 | Prob. That Points Left = 1 | Prob. That Points Left = 2 | Prob. That Points Left = 3 |
|---|---|---|---|---|---|---|---|---|---|---|---|---|
| 1 | AAA | 14 | 1 | 0.00462963 | 0.532536 | 0.0024654 | 0.0345162 | 1 | | 0.0025 | | |
| 1 | AAx | 2 | 15 | 0.06944444 | 0.532536 | 0.0369817 | 0.0739633 | 1 | | 0.037 | | |
| 1 | Axx | 2 | 75 | 0.34722222 | 0.532536 | 0.1849083 | 0.3698167 | 1 | | 0.1849 | | |
| 1 | xxx | 0 | 125 | 0.5787037 | 0.532536 | 0.3081806 | 0 | 0 | 0.3082 | | | |
| | | | 216 | 1 | | | | | | | | |
| 2 | AAA | 14 | 1 | 0.00462963 | 0.2430556 | 0.0011253 | 0.0157536 | 1 | | 0.0011 | | |
| 2 | BBB | 14 | 1 | 0.00462963 | 0.2430556 | 0.0011253 | 0.0157536 | 1 | | 0.0011 | | |
| 2 | AAB | 5 | 3 | 0.01388889 | 0.2430556 | 0.0033758 | 0.0168789 | 2 | | | 0.0034 | |
| 2 | BBA | 5 | 3 | 0.01388889 | 0.2430556 | 0.0033758 | 0.0168789 | 2 | | | 0.0034 | |
| 2 | AAx | 2 | 12 | 0.05555556 | 0.2430556 | 0.0135031 | 0.0270062 | 1 | | 0.0135 | | |
| 2 | BBx | 2 | 12 | 0.05555556 | 0.2430556 | 0.0135031 | 0.0270062 | 1 | | 0.0135 | | |
| 2 | ABx | 2 | 24 | 0.11111111 | 0.2430556 | 0.0270062 | 0.0540123 | 2 | | | 0.027 | |
| 2 | Axx | 2 | 48 | 0.22222222 | 0.2430556 | 0.0540123 | 0.1080247 | 1 | | 0.054 | | |
| 2 | Bxx | 2 | 48 | 0.22222222 | 0.2430556 | 0.0540123 | 0.1080247 | 1 | | 0.054 | | |
| 2 | xxx | 0 | 64 | 0.2962963 | 0.2430556 | 0.0720165 | 0 | 0 | 0.072 | | | |
| | | | 216 | 1 | | | | | | | | |
| 3 | AAA | 14 | 1 | 0.00462963 | 0.0154321 | 7.144E−05 | 0.0010002 | 1 | | 7E−05 | | |
| 3 | BBB | 14 | 1 | 0.00462963 | 0.0154321 | 7.144E−05 | 0.0010002 | 1 | | 7E−05 | | |
| 3 | CCC | 14 | 1 | 0.00462963 | 0.0154321 | 7.144E−05 | 0.0010002 | 1 | | 7E−05 | | |
| 3 | AAB | 5 | 3 | 0.01388889 | 0.0154321 | 0.0002143 | 0.0010717 | 2 | | | 0.0002 | |
| 3 | AAC | 5 | 3 | 0.01388889 | 0.0154321 | 0.0002143 | 0.0010717 | 2 | | | 0.0002 | |
| 3 | BBA | 5 | 3 | 0.01388889 | 0.0154321 | 0.0002143 | 0.0010717 | 2 | | | 0.0002 | |
| 3 | BBC | 5 | 3 | 0.01388889 | 0.0154321 | 0.0002143 | 0.0010717 | 2 | | | 0.0002 | |
| 3 | CCA | 5 | 3 | 0.01388889 | 0.0154321 | 0.0002143 | 0.0010717 | 2 | | | 0.0002 | |

TABLE 23-continued

| Points Alive at Round Start | Comb. | Pay | Occur. | Probability of Occurrence | Probability of Start Condition | Prob. Of This Result | EV | Points Alive After Roll | Prob. That Points Left = 0 | Prob. That Points Left = 1 | Prob. That Points Left = 2 | Prob. That Points Left = 3 |
|---|---|---|---|---|---|---|---|---|---|---|---|---|
| 3 | CCB | 5 | 3 | 0.01388889 | 0.0154321 | 0.0002143 | 0.0010717 | 2 | | | 0.0002 | |
| 3 | ABC | 5 | 6 | 0.02777778 | 0.0154321 | 0.0004287 | 0.0021433 | 3 | | | | 0.00043 |
| 3 | ABx | 2 | 18 | 0.08333333 | 0.0154321 | 0.001286 | 0.002572 | 2 | | | 0.0013 | |
| 3 | ACx | 2 | 18 | 0.08333333 | 0.0154321 | 0.001286 | 0.002572 | 2 | | | 0.0013 | |
| 3 | BCx | 2 | 18 | 0.08333333 | 0.0154321 | 0.001286 | 0.002572 | 2 | | | 0.0013 | |
| 3 | AAx | 2 | 9 | 0.04166667 | 0.0154321 | 0.000643 | 0.001286 | 1 | | 0.0006 | | |
| 3 | BBx | 2 | 9 | 0.04166667 | 0.0154321 | 0.000643 | 0.001286 | 1 | | 0.0006 | | |
| 3 | CCx | 2 | 9 | 0.04166667 | 0.0154321 | 0.000643 | 0.001286 | 1 | | 0.0006 | | |
| 3 | Axx | 2 | 27 | 0.125 | 0.0154321 | 0.001929 | 0.003858 | 1 | | 0.0019 | | |
| 3 | Bxx | 2 | 27 | 0.125 | 0.0154321 | 0.001929 | 0.003858 | 1 | | 0.0019 | | |
| 3 | Cxx | 2 | 27 | 0.125 | 0.0154321 | 0.001929 | 0.003858 | 1 | | 0.0019 | | |
| 3 | xxx | 0 | 27 | 0.125 | 0.0154321 | 0.001929 | 0 | 0 | 0.0019 | | | |
| | | | 216 | 1 | | | | | | | | |
| | | | | | EV of third Stage: | | 0.9023574 | | | | | |
| | | | | | Prob. Of Start Cond. For Next Stage | | | | 0.3821 | 0.3696 | 0.0389 | 0.00043 |
| | | | | | Total of 4 probability values above | | | | | | | 0.79102 |

The analysis provided thus far does not include the bonuses for two "Buncos" and three "Buncos" occurring in the same game. The probability of getting a second or third "Bunco" in a game must be analyzed on a stage by stage basis, with the expected value of such awards added to the EV of the stage in which the bonus occurs.

A double "Bunco" award is given on a particular stage when the second "Bunco" in a game is achieved in that stage. It is not possible to get a double "Bunco" in the first stage. In the second stage, the only way to achieve a double "Bunco" bonus is to roll a "Bunco" on each of the first two stages. On the third stage, one could get "Bunco" on the first and third stage, or the second and third stage (the first and second stage is the case noted above of getting a double "Bunco" on the second stage). The shorthand xBB is used to indicate no "Bunco" on the first stage followed by "Bunco" on the second and third stages, while similarly BxB indicates "Bunco" on the first and third stages with no "Bunco" on the second stage.

Table 24 shows the combinations that will result in a double "Bunco" on the seventh stage. Note that all combinations must have the second "Bunco" occur as the seventh stage because if the second "Bunco" occurred earlier then it would be attributed to the earlier stage.

TABLE 24

| |
|---|
| BxxxxxB |
| xBxxxxB |
| xxBxxxB |
| xxxBxxB |
| xxxxBxB |
| xxxxxBB |

Working through the cases in Table 24, it is found that as a result of symmetry, the probability of each of these components to a seventh level double "Bunco" is identical. Likewise, there are five ways of identical probability to achieve a sixth level double "Bunco" bonus and the two ways mentioned above to achieve a third level double "Bunco" bonus have identical probability.

In order to compute the probability of the required components, there is a need to use three values that were computed earlier. In Table 21, the probability of a "Bunco" on the first roll is shown to be 0.027777778. The "x" components in the first line of Table 24 is the probability of staying alive in a game that has established one point, by rolling anything but a "Bunco". This is found by taking the second and third lines of Table 22 (AAx and Axx) and adding the probability of those rolls (fourth column), which results in a total of 0.416666667. Finally, there is the probability of rolling a "Bunco" while one point is alive. This is shown in the first line of Table 22 (AAA) as 0.00462963. Using these values, one may construct the double "Bunco" probability table of Table 25.

The first column of Table 25 shows the game "Stage" for which the probability of double "Bunco" is being computed. The second column is the "Number of Forms" a double "Bunco" may take on that stage (such as the six forms shown for the seventh stage a Table 24). The third column shows the "Sample Form" being computed for the stage. The fourth through tenth columns are the probability components matching the respective letters in the third column forms. The eleventh column is the "Probability" of getting a double "Bunco" on that level which is the product of the second column form count and all probability components ("Comp." 1 through 7).

TABLE 25

| Stage | Number of Forms | Sample Form | Comp. 1 | Comp. 2 | Comp. 3 | Comp. 4 | Comp. 5 | Comp. 6 | Comp. 7 | Double Bunco Probability |
|---|---|---|---|---|---|---|---|---|---|---|
| 1 | 0 | | | | | | | | | 0 |
| 2 | 1 | BB | 0.027778 | 0.00463 | | | | | | 0.000128601 |

TABLE 25-continued

| Stage | Number of Forms | Sample Form | Comp. 1 | Comp. 2 | Comp. 3 | Comp. 4 | Comp. 5 | Comp. 6 | Comp. 7 | Double Bunco Probability |
|---|---|---|---|---|---|---|---|---|---|---|
| 3 | 2 | BxB | 0.027778 | 0.416667 | 0.00463 | | | | | 0.000107167 |
| 4 | 3 | BxxB | 0.027778 | 0.416667 | 0.416667 | 0.00463 | | | | 6.69796E−05 |
| 5 | 4 | BxxxB | 0.027778 | 0.416667 | 0.416667 | 0.416667 | 0.00463 | | | 3.72109E−05 |
| 6 | 5 | BxxxxB | 0.027778 | 0.416667 | 0.416667 | 0.416667 | 0.416667 | 0.00463 | | 1.93807E−05 |
| 7 | 6 | BxxxxxB | 0.027778 | 0.416667 | 0.416667 | 0.416667 | 0.416667 | 0.416667 | 0.00463 | 9.69033E−06 |

The analysis for the "Triple Bunco Bonus" is similar to the "Double Bunco Bonus." Table 26 shows all of the possible forms of a seventh level "Triple Bunco Bonus."

TABLE 26

| |
|---|
| BBxxxxB |
| BxBxxxB |
| BxxBxxB |
| BxxxBxB |
| BxxxxBB |
| xBBxxxB |
| xBxBxxB |
| xBxxBxB |
| xBxxxBB |
| xxBBxxB |
| xxBxBxB |
| xxBxxBB |
| xxxBBxB |
| xxxBxBB |
| xxxxBBB |

Using the same symmetry that was used for the double "Bunco" calculation, one arrives at Table 27.

TABLE 27

| Stage | Number of Forms | Sample Form | Comp. 1 | Comp. 2 | Comp. 3 | Comp. 4 | Comp. 5 | Comp. 6 | Comp. 7 | Triple Bunco Probability |
|---|---|---|---|---|---|---|---|---|---|---|
| 1 | 0 | | | | | | | | | 0 |
| 2 | 0 | | | | | | | | | 0 |
| 3 | 1 | BBB | 0.027778 | 0.00463 | 0.00463 | | | | | 5.95374E−07 |
| 4 | 3 | BBxB | 0.027778 | 0.00463 | 0.416667 | 0.00463 | | | | 7.44218E−07 |
| 5 | 6 | BBxxB | 0.027778 | 0.00463 | 0.416667 | 0.416667 | 0.00463 | | | 6.20181E−07 |
| 6 | 10 | BBxxxB | 0.027778 | 0.00463 | 0.416667 | 0.416667 | 0.416667 | 0.00463 | | 4.30682E−07 |
| 7 | 15 | BBxxxxB | 0.027778 | 0.00463 | 0.416667 | 0.416667 | 0.416667 | 0.416667 | 0.00463 | 2.69176E−07 |

Table 28 shows the expected return from the double "Bunco" and triple "Bunco" awards. The first column shows the game "Stage". The second column shows the "75" coin pay for the "Double Bunco Bonus". The third column shows the "Double Bunco Probability" computed in Table 25 for each stage. The fourth column computes the expected return" (EV) for double "Buncos" on the given stage by multiplying the "Pay" (second column) times the "Probability" (third column). The fifth through seventh columns compute the triple "Bunco" expected return in the same manner as was used for "Double Bunco" in the second through fourth columns.

TABLE 28

| Stage | Double Bunco Pay | Double Bunco Prob. | Double Bunco EV | Triple Bunco Pay | Triple Bunco Prob. | Triple Bunco EV |
|---|---|---|---|---|---|---|
| 1 | 75 | 0 | 0 | 2500 | 0 | 0 |
| 2 | 75 | 0.000129 | 0.009645 | 2500 | 0 | 0 |
| 3 | 75 | 0.000107 | 0.008038 | 2500 | 5.95E−07 | 0.001488 |
| 4 | 75 | 6.7E−05 | 0.005023 | 2500 | 7.44E−07 | 0.001861 |
| 5 | 75 | 3.72E−05 | 0.002791 | 2500 | 6.2E−07 | 0.00155 |
| 6 | 75 | 1.94E−05 | 0.001454 | 2500 | 4.31E−07 | 0.001077 |
| 7 | 75 | 9.69E−06 | 0.000727 | 2500 | 2.69E−07 | 0.000673 |

Finally, the overall EV of each stage and the overall EV of multi-stage games is shown in Table 29. The first column indicates the "Stage" number. The second column shows the expected return for the base game stage which was generated for the first three stages in Table 21, Table 22, and Table 23. The third and fourth column show the "Double" and "Triple Bunco" bonus EV components generated in Table 28. The fifth column is the total EV for the stage, which is created by adding the EV components in the second, third and fourth columns. The sixth column is the EV of an entire multi-stage game that bet on the number of stages in the first column. This is the average of the fifth column in the current row and all rows above (i.e., the average EV of all stages in the multi-stage game). The expected return of the entire game when a player plays all seven stages is 0.927423292 or 92.74%.

TABLE 29

| Stage | Base Game EV | Double Bunco EV | Triple Bunco EV | Total EV For Stage | EV of Game Playing this many stages |
|---|---|---|---|---|---|
| 1 | 0.888889 | 0 | 0 | 0.888889 | 0.888888889 |
| 2 | 0.92284 | 0.009645 | 0 | 0.932485 | 0.910686728 |
| 3 | 0.902357 | 0.008038 | 0.001488 | 0.911883 | 0.911085629 |
| 4 | 0.921469 | 0.005023 | 0.001861 | 0.928353 | 0.915402545 |
| 5 | 0.953178 | 0.002791 | 0.00155 | 0.957519 | 0.923825811 |
| 6 | 0.937292 | 0.001454 | 0.001077 | 0.939822 | 0.92649184 |
| 7 | 0.931612 | 0.000727 | 0.000673 | 0.933012 | 0.927423292 |

It will additionally be noted that the invention further contemplates a training program for players of these games, particularly in the video game versions. Such training programs are designed to teach players not only the fundamentals of game play, but to optimize game playing strategy, as with visual and aural cues for the player, replay options, and the like. Representative training programs are disclosed in applicants' co-pending patent application Ser. No. 09/539,286, filed Mar. 30, 2000, and that disclosure is hereby incorporated by reference.

Thus, while the invention has been disclosed and described with respect to certain embodiments, those of skill in the art will recognize modifications, changes, other applications and the like which will nonetheless fall within the spirit and ambit of the invention, and the following claims are intended to capture such variations.

What is claimed is:

1. A method of playing a video dice game having a plurality of stages to be wagered against, each stage representing a roll of the dice, comprising:

the video dice game receiving a wager input at the outset of the game according to a number of stages desired to be played, wherein a wager on a stage creates an eligibility for playing that stage;

the video dice game initiating play of a first stage of the game by rolling plural dice, wherein each different number appearing on each of the die becomes a respective point-to-match that is stored and displayed, wherein if all die numbers match, a win is experienced and a payout is earned, and wherein play advances to a second stage if the video dice game received a second stage wager input at the outset of the game, independent of whether a win was experienced;

the video dice game initiating play of a second stage by rolling the dice;

the video dice game determining whether any of the numbers appearing on a die from the second roll match the point(s)-to-match, wherein at least one match is considered a win and play advances to a third stage if the video dice game received a third stage wager input at the outset of the game, but the game is over and any remaining wagers are lost if there is no match, and further wherein for a point matched, a payout is earned, each point-to-match that matches at least one of the dice for the second stage remaining for a third stage, if the video dice game received a third stage wager input at the outset of the game;

the video dice game initiating play of a third stage by rolling the dice;

the video dice game determining whether any numbers appearing on a die from the third roll match the point(s)-to-match left from the second stage, wherein at least one match is considered a win and play advances to a fourth stage if the video dice game received a fourth stage wager input at the outset of the game, but the game is over and any remaining wagers are lost if there is no match, and further wherein for a point matched, another payout is earned, each point-to-match that matches at least one of the dice for the third stage remaining for a fourth stage if the video dice game received a fourth stage wager input at the outset of the game;

the video dice game initiating play of a fourth through $n^{th}$ stage by rolling the dice in each respective stage; and the video dice game making an identical determination for each respective fourth through $n^{th}$ stage as performed for the second and third stages in order to continue play up to the $n^{th}$ stage, or to end the game when no point(s)-to-match remaining from a preceding stage can be matched to the numbers appearing on the dice of a current stage.

2. The method of claim 1, wherein a "Bunco" bonus is awarded when a roll of the dice results with all numbers of the dice matching and further matching a point-to-match.

3. A video dice game comprising:

a video display device;

a cpu having a program operating a dice game;

a wager input mechanism which registers a wager placed by a player, said wager including an ability to register stage-specific bets at the outset of the game upon successive stages of play of the game, wherein each stage-specific bet is associated with a respective stage;

a set of differing gameplay element indicia, and a subset established from said set of gameplay element indicia of at least one match indicia against which representations of dice are to be matched in the course of play, said dice having a plurality of said gameplay element indicia thereon as facets of each die;

said program establishing a first stage dice toss, and determining whether said first stage toss presents an advancement condition based upon a match of at least one die indicium with a match indicium;

said program establishing a second stage toss if a stage-specific bet had been registered for said second stage toss at the outset of the game and a predetermined stage advancement condition is presented by said first stage toss, but if a stage advancement condition is not presented by said first stage toss, the game is over and at least a portion of said stage-specific bets on said first and second stage tosses are lost; and said program including a payout output based upon said wager and predetermined values for said first and second stage tosses according to a preset table.

4. The video game of claim 3 wherein beginning with at least said second stage game, said advancement condition is any match between said match indicia and said die indicia, with at least one match comprising a winning condition for a stage being played, and said program establishes a successive stage toss provided a stage-specific bet had been registered for a respective successive stage toss at the outset of the game and a winning condition is presented by a next preceding stage toss, up to a predetermined $n^{th}$ stage toss.

5. The video game of claim 4 wherein said program displays said first, second and successive stages up to said $n^{th}$ stage together as discrete arrays on the visual display, and generates a visual representation of die indicia resulting from a respective toss on a respective array of said visual display.

6. The video game of claim 5 wherein said program removes from further play any match indicium which is not matched at a stage, and provides a visual representation of any said match indicia remaining in play.

7. A video dice game comprising:

a video display device;

a cpu having a program operating a dice game;

a wager input mechanism which registers a wager placed by a player, said wager including an ability to register stage-specific bets at the outset of the game upon successive stages of play of the game, wherein each stage-specific bet is associated with a respective stage;

a set of differing gameplay element indicia;

representations of dice having a plurality of said gameplay element indicia thereon as facets of each die;

said program establishing a first stage dice toss, and determining whether said first stage toss presents an advancement condition based upon a predetermined game format;

said program establishing a second stage toss if a stage-specific bet had been registered for said second stage toss at the outset of the game and an advancement condition is presented by said first stage toss, but if an advancement condition is not presented by said first stage toss, the game is over and at least a portion of said stage-specific bets on said first and second stage tosses are lost; and said program including a payout output based upon said wager and predetermined values for said first and second stage tosses according to a preset table.

8. The video game of claim 7 wherein said program establishes a successive stage toss provided a stage-specific bet had been registered for a respective successive stage toss at the outset of the game and an advancement condition is presented by a next preceding stage toss, up to a predetermined $n^{th}$ stage toss.

9. A method for playing a video dice game comprising:

the video dice game providing a set of dice having a plurality of differing indicia thereon as facets of each die;

the video dice game establishing a subset from said indicia of at least one match indicia against which said dice are to be matched in the course of play;

the video dice game receiving at least two stage-specific bet inputs at the outset of the game upon at least of two of a plurality of stages of the game, with each stage comprising a toss of the dice, wherein each stage-specific bet input is associated with a respective stage;

the video dice game making a first stage dice toss, and determining whether said first stage toss presents an advancement condition based upon a predetermined game format;

the video dice game making a second stage toss if a stage-specific bet input had been registered for said second stage toss at the outset of the game and said predetermined advancement condition is presented by said first stage toss, but if an advancement condition is not presented by said first stage toss, the game is over and at least a portion of said stage-specific bet inputs on said first and second stage tosses are lost; and the video dice game providing a payout output based upon said stage-specific bet inputs and predetermined values for said first and second stage tosses according to a preset schedule.

10. The dice game method of claim 9 wherein beginning with at least said second stage game, said advancement condition comprises determining any match between said match indicia and said die indicia, with at least one match comprising an advancement condition for a stage being played, and a successive stage toss is made provided a stage-specific bet input had been registered for a respective successive stage toss at the outset of the game and an advancement condition is presented by a next preceding stage toss, up to a predetermined $n^{th}$ stage toss.

* * * * *